United States Patent
Chinta et al.

(10) Patent No.: US 8,090,797 B2
(45) Date of Patent: Jan. 3, 2012

(54) METHODS AND SYSTEMS FOR LAUNCHING APPLICATIONS INTO EXISTING ISOLATION ENVIRONMENTS

(75) Inventors: Madhav Chinta, Pompano Beach, FL (US); SamArun Raj, Karnataka (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 248 days.

(21) Appl. No.: 12/434,629

(22) Filed: May 2, 2009

(65) Prior Publication Data

US 2010/0281102 A1 Nov. 4, 2010

(51) Int. Cl.
G06F 15/16 (2006.01)
G06F 9/455 (2006.01)

(52) U.S. Cl. .............................. 709/217; 709/203; 718/1

(58) Field of Classification Search .......... 709/213–229, 709/204–205, 201, 203; 718/1, 100–104
See application file for complete search history.

(56) References Cited

U.S. PATENT DOCUMENTS

| | | |
|---|---|---|
| 4,253,145 A | 2/1981 | Goldberg |
| 4,779,189 A | 10/1988 | Legvold et al. |
| 5,057,996 A | 10/1991 | Cutler et al. |
| 5,067,072 A | 11/1991 | Talati et al. |
| 5,129,084 A | 7/1992 | Kelly et al. |
| 5,175,852 A | 12/1992 | Johnson et al. |
| 5,187,790 A | 2/1993 | East et al. |
| 5,201,049 A * | 4/1993 | Shorter ............................. 718/1 |
| 5,202,971 A | 4/1993 | Henson et al. |
| 5,249,290 A | 9/1993 | Heizer |
| 5,297,283 A | 3/1994 | Kelly et al. |
| 5,321,841 A | 6/1994 | East et al. |
| 5,341,478 A | 8/1994 | Travis et al. |
| 5,384,911 A | 1/1995 | Bloomfield |
| 5,418,964 A | 5/1995 | Conner et al. |
| 5,430,878 A | 7/1995 | Straub et al. |
| 5,437,025 A | 7/1995 | Bale et al. |
| 5,461,608 A | 10/1995 | Yoshiyama |
| 5,499,343 A | 3/1996 | Pettus |
| 5,504,677 A | 4/1996 | Pollin |

(Continued)

FOREIGN PATENT DOCUMENTS

AU  2329797 A  10/1997

(Continued)

OTHER PUBLICATIONS

"Deploying Internet Information Services (IIS) 6.0", Microsoft Windows Server 2003 Development Kit, p. 69, line 25—p. 71, line 8.

(Continued)

*Primary Examiner* — Brendan Higa
(74) *Attorney, Agent, or Firm* — Foley and Lardner LLP; John D. Lanza

(57) ABSTRACT

Methods and systems that can launch applications into existing isolation environments do so by executing a run module on a computing machine to intercept requests to execute an application. A client communicating with the computing machine generates requests to execute an application on the computing machine. A run module identifies a profile associated with the requested application and queries an application delivery service to identify at least one isolation environment that corresponds to the profile. The run module receives from the application delivery service a response that identifies a first isolation environment associated with the application, and issues a command to a launch module to launch the application into the first isolation environment.

16 Claims, 29 Drawing Sheets

U.S. PATENT DOCUMENTS

| | | | |
|---|---|---|---|
| 5,515,495 | A | 5/1996 | Ikemoto |
| 5,515,508 | A | 5/1996 | Pettus et al. |
| 5,553,242 | A | 9/1996 | Russell et al. |
| 5,557,346 | A | 9/1996 | Lipner et al. |
| 5,557,748 | A | 9/1996 | Norris |
| 5,557,765 | A | 9/1996 | Lipner et al. |
| 5,561,769 | A | 10/1996 | Kumar et al. |
| 5,586,312 | A | 12/1996 | Johnson et al. |
| 5,596,745 | A | 1/1997 | Lai et al. |
| 5,632,002 | A | 5/1997 | Hashimoto et al. |
| 5,640,454 | A | 6/1997 | Lipner et al. |
| 5,668,958 | A | 9/1997 | Bendert et al. |
| 5,696,975 | A * | 12/1997 | Moore et al. ............... 717/168 |
| 5,701,484 | A | 12/1997 | Artsy |
| 5,706,437 | A | 1/1998 | Kirchner et al. |
| 5,727,249 | A | 3/1998 | Pollin |
| 5,729,734 | A | 3/1998 | Parker et al. |
| 5,734,865 | A | 3/1998 | Yu |
| 5,737,622 | A | 4/1998 | Rogers et al. |
| 5,745,573 | A | 4/1998 | Lipner et al. |
| 5,761,431 | A | 6/1998 | Gross et al. |
| 5,761,662 | A | 6/1998 | Dasan |
| 5,764,915 | A | 6/1998 | Heimsoth et al. |
| 5,765,192 | A | 6/1998 | Berliner |
| 5,781,720 | A | 7/1998 | Parker et al. |
| 5,784,057 | A | 7/1998 | Alimpich et al. |
| 5,794,207 | A | 8/1998 | Walker et al. |
| 5,802,306 | A | 9/1998 | Hunt |
| 5,819,034 | A | 10/1998 | Joseph et al. |
| 5,819,044 | A | 10/1998 | Kawabe et al. |
| 5,828,840 | A | 10/1998 | Cowan et al. |
| 5,838,910 | A | 11/1998 | Domenikos et al. |
| 5,838,916 | A | 11/1998 | Domenikos et al. |
| 5,844,553 | A | 12/1998 | Hao et al. |
| 5,848,410 | A | 12/1998 | Walls et al. |
| 5,856,826 | A | 1/1999 | Craycroft |
| 5,860,068 | A | 1/1999 | Cook |
| 5,884,046 | A | 3/1999 | Antonov |
| 5,915,085 | A | 6/1999 | Koved |
| 5,938,733 | A | 8/1999 | Heimsoth et al. |
| 5,951,694 | A | 9/1999 | Choquier et al. |
| 5,956,403 | A | 9/1999 | Lipner et al. |
| 5,983,190 | A | 11/1999 | Trower et al. |
| 5,983,268 | A | 11/1999 | Freivald et al. |
| 5,991,406 | A | 11/1999 | Lipner et al. |
| 5,999,179 | A | 12/1999 | Kekic et al. |
| 6,023,721 | A | 2/2000 | Cummings |
| 6,026,440 | A | 2/2000 | Shrader et al. |
| 6,047,312 | A | 4/2000 | Brooks et al. |
| 6,065,043 | A | 5/2000 | Domenikos et al. |
| 6,073,076 | A | 6/2000 | Crowley et al. |
| 6,088,515 | A | 7/2000 | Muir et al. |
| 6,108,712 | A | 8/2000 | Hayes, Jr. |
| 6,115,741 | A | 9/2000 | Domenikos et al. |
| 6,144,377 | A | 11/2000 | Oppermann et al. |
| 6,144,992 | A | 11/2000 | Turpin et al. |
| 6,157,953 | A | 12/2000 | Chang et al. |
| 6,158,007 | A | 12/2000 | Moreh et al. |
| 6,161,126 | A | 12/2000 | Wies et al. |
| 6,161,139 | A | 12/2000 | Win et al. |
| 6,199,753 | B1 | 3/2001 | Tracy et al. |
| 6,240,442 | B1 | 5/2001 | Domenikos et al. |
| 6,262,726 | B1 | 7/2001 | Stedman et al. |
| 6,272,556 | B1 | 8/2001 | Gish |
| 6,272,632 | B1 | 8/2001 | Carman et al. |
| 6,275,942 | B1 | 8/2001 | Bernhard et al. |
| 6,282,602 | B1 | 8/2001 | Blumenau et al. |
| 6,292,827 | B1 | 9/2001 | Raz |
| 6,304,893 | B1 | 10/2001 | Gish |
| 6,311,221 | B1 | 10/2001 | Raz et al. |
| 6,314,417 | B1 | 11/2001 | Bennett et al. |
| 6,321,219 | B1 | 11/2001 | Gainer et al. |
| 6,327,705 | B1 | 12/2001 | Larsson et al. |
| 6,339,595 | B1 | 1/2002 | Rekhter et al. |
| 6,370,687 | B1 | 4/2002 | Shimura |
| 6,374,402 | B1 | 4/2002 | Schmeidler et al. |
| 6,385,766 | B1 | 5/2002 | Doran et al. |
| 6,385,768 | B1 | 5/2002 | Ziebell |
| 6,389,084 | B1 | 5/2002 | Rupp |
| 6,438,600 | B1 | 8/2002 | Greenfield et al. |
| 6,453,334 | B1 | 9/2002 | Vinson et al. |
| 6,487,665 | B1 | 11/2002 | Andrews et al. |
| 6,510,466 | B1 | 1/2003 | Cox et al. |
| 6,516,315 | B1 | 2/2003 | Gupta |
| 6,519,643 | B1 | 2/2003 | Foulkes et al. |
| 6,526,056 | B1 | 2/2003 | Rekhter et al. |
| 6,550,012 | B1 | 4/2003 | Villa et al. |
| 6,553,377 | B1 | 4/2003 | Eschelbeck et al. |
| 6,557,168 | B1 | 4/2003 | Czajkowski |
| 6,567,974 | B1 | 5/2003 | Czajkowski |
| 6,574,618 | B2 | 6/2003 | Eylon et al. |
| 6,597,366 | B1 | 7/2003 | Bennett et al. |
| 6,598,125 | B2 | 7/2003 | Romm |
| 6,606,663 | B1 | 8/2003 | Liao et al. |
| 6,691,157 | B2 | 2/2004 | Muir et al. |
| 6,691,232 | B1 | 2/2004 | Wood et al. |
| 6,711,557 | B1 | 3/2004 | Palaniappan |
| 6,714,979 | B1 | 3/2004 | Brandt et al. |
| 6,724,875 | B1 | 4/2004 | Adams et al. |
| 6,735,601 | B1 | 5/2004 | Subrahmanyam |
| 6,757,894 | B2 | 6/2004 | Eylon et al. |
| 6,763,370 | B1 | 7/2004 | Schmeidler et al. |
| 6,766,457 | B1 | 7/2004 | Baisley |
| 6,772,350 | B1 | 8/2004 | Belani et al. |
| 6,779,179 | B1 | 8/2004 | Romm et al. |
| 6,826,624 | B1 | 11/2004 | Fell, Jr. |
| 6,851,114 | B1 | 2/2005 | Czajkowski |
| 6,854,009 | B1 | 2/2005 | Hughes |
| 6,880,002 | B2 | 4/2005 | Hirschfeld et al. |
| 6,889,222 | B1 | 5/2005 | Zhao |
| 6,889,249 | B2 | 5/2005 | Miloushev et al. |
| 6,901,586 | B1 | 5/2005 | Czajkowski |
| 6,918,113 | B2 | 7/2005 | Patel et al. |
| 6,928,464 | B2 | 8/2005 | Appiah et al. |
| 6,928,469 | B1 | 8/2005 | Duursma et al. |
| 6,938,096 | B1 | 8/2005 | Greschler et al. |
| 6,938,247 | B2 | 8/2005 | Czajkowski |
| 6,952,714 | B2 | 10/2005 | Peart |
| 6,959,320 | B2 | 10/2005 | Shah et al. |
| 6,966,060 | B1 | 11/2005 | Young et al. |
| 7,017,188 | B1 | 3/2006 | Schmeidler et al. |
| 7,027,051 | B2 | 4/2006 | Alford et al. |
| 7,028,305 | B2 | 4/2006 | Schaefer |
| 7,065,637 | B1 | 6/2006 | Nanja |
| 7,085,755 | B2 | 8/2006 | Bluhm et al. |
| 7,089,553 | B1 | 8/2006 | Glaser et al. |
| 7,092,987 | B2 | 8/2006 | Brittingham et al. |
| 7,103,625 | B1 | 9/2006 | Hipp et al. |
| 7,117,243 | B2 | 10/2006 | Peart |
| 7,162,724 | B2 | 1/2007 | Blaser et al. |
| 7,200,632 | B1 | 4/2007 | Greschler et al. |
| 7,203,696 | B2 | 4/2007 | Atm |
| 7,203,941 | B2 | 4/2007 | Demsey et al. |
| 7,206,819 | B2 | 4/2007 | Schmidt |
| 7,213,153 | B2 | 5/2007 | Hollander et al. |
| 7,213,247 | B1 | 5/2007 | Wilner et al. |
| 7,293,267 | B1 | 11/2007 | Fresko |
| 7,305,658 | B1 | 12/2007 | Hamilton et al. |
| 7,330,872 | B2 | 2/2008 | Peart et al. |
| 7,380,039 | B2 | 5/2008 | Miloushev et al. |
| 7,383,328 | B2 | 6/2008 | Iyoki |
| 7,409,405 | B1 | 8/2008 | Masinter et al. |
| 7,426,565 | B1 * | 9/2008 | Tormasov et al. ............ 709/229 |
| 7,454,458 | B2 | 11/2008 | Islam et al. |
| 7,461,144 | B1 | 12/2008 | Beloussov et al. |
| 7,484,245 | B1 | 1/2009 | Friedman et al. |
| 7,526,774 | B1 | 4/2009 | Beck et al. |
| 7,577,722 | B1 * | 8/2009 | Khandekar et al. ........... 709/220 |
| 2001/0011254 | A1 | 8/2001 | Clark |
| 2001/0014892 | A1 | 8/2001 | Gaither et al. |
| 2001/0034736 | A1 | 10/2001 | Eylon et al. |
| 2001/0037399 | A1 | 11/2001 | Eylon et al. |
| 2001/0037400 | A1 | 11/2001 | Raz et al. |
| 2001/0044850 | A1 | 11/2001 | Raz et al. |
| 2001/0047386 | A1 | 11/2001 | Domenikos et al. |
| 2001/0047406 | A1 | 11/2001 | Araujo et al. |
| 2002/0010808 | A1 | 1/2002 | Wiggins et al. |

| | | |
|---|---|---|
| 2002/0019972 A1 | 2/2002 | Grier et al. |
| 2002/0035451 A1 | 3/2002 | Rothermel |
| 2002/0042833 A1 | 4/2002 | Hendler et al. |
| 2002/0049608 A1 | 4/2002 | Hartsell et al. |
| 2002/0049841 A1 | 4/2002 | Johnson et al. |
| 2002/0059274 A1 | 5/2002 | Hartsell et al. |
| 2002/0059425 A1 | 5/2002 | Belfiore et al. |
| 2002/0065864 A1 | 5/2002 | Hartsell et al. |
| 2002/0065919 A1 | 5/2002 | Taylor et al. |
| 2002/0078168 A1 | 6/2002 | Christfort et al. |
| 2002/0078203 A1 | 6/2002 | Greschler et al. |
| 2002/0080170 A1 | 6/2002 | Goldberg et al. |
| 2002/0083183 A1 | 6/2002 | Pujare et al. |
| 2002/0087717 A1 | 7/2002 | Artzi et al. |
| 2002/0087883 A1 | 7/2002 | Wohlgemuth et al. |
| 2002/0091763 A1 | 7/2002 | Shah et al. |
| 2002/0095400 A1 | 7/2002 | Johnson et al. |
| 2002/0095479 A1 | 7/2002 | Schmidt |
| 2002/0105972 A1 | 8/2002 | Richter et al. |
| 2002/0107903 A1 | 8/2002 | Richter et al. |
| 2002/0107962 A1 | 8/2002 | Richter et al. |
| 2002/0107971 A1 | 8/2002 | Bailey et al. |
| 2002/0107989 A1 | 8/2002 | Johnson et al. |
| 2002/0107990 A1 | 8/2002 | Johnson et al. |
| 2002/0108059 A1 | 8/2002 | Canion et al. |
| 2002/0116452 A1 | 8/2002 | Johnson et al. |
| 2002/0133593 A1 | 9/2002 | Johnson et al. |
| 2002/0138640 A1 | 9/2002 | Raz et al. |
| 2002/0156831 A1 | 10/2002 | Suorsa et al. |
| 2002/0156911 A1 | 10/2002 | Croman et al. |
| 2002/0161908 A1 | 10/2002 | Benitez et al. |
| 2002/0169887 A1 | 11/2002 | MeLampy et al. |
| 2002/0174215 A1 | 11/2002 | Schaefer |
| 2002/0174227 A1 | 11/2002 | Hartsell et al. |
| 2002/0174255 A1 | 11/2002 | Hayter et al. |
| 2002/0184618 A1 | 12/2002 | Bala et al. |
| 2002/0193985 A1 | 12/2002 | Park |
| 2002/0194010 A1 | 12/2002 | Bergler et al. |
| 2002/0199180 A1 | 12/2002 | Donaldson et al. |
| 2003/0004882 A1 | 1/2003 | Holler et al. |
| 2003/0009538 A1 | 1/2003 | Shah et al. |
| 2003/0051130 A1 | 3/2003 | MeLampy et al. |
| 2003/0056112 A1 | 3/2003 | Vinson et al. |
| 2003/0065676 A1 | 4/2003 | Gbadegesin et al. |
| 2003/0069923 A1 | 4/2003 | Peart |
| 2003/0069924 A1 | 4/2003 | Peart et al. |
| 2003/0088866 A1 | 5/2003 | Boldon et al. |
| 2003/0101292 A1 | 5/2003 | Fisher et al. |
| 2003/0105604 A1 | 6/2003 | Ash et al. |
| 2003/0115458 A1 | 6/2003 | Song |
| 2003/0140160 A1 | 7/2003 | Raz et al. |
| 2003/0145222 A1 | 7/2003 | Gittler et al. |
| 2003/0149685 A1 | 8/2003 | Trossman et al. |
| 2003/0167463 A1 | 9/2003 | Munsil et al. |
| 2003/0172138 A1 | 9/2003 | McCormack et al. |
| 2003/0177178 A1 | 9/2003 | Jones et al. |
| 2003/0191867 A1 | 10/2003 | Czajkowski |
| 2003/0191971 A1 | 10/2003 | Klensin et al. |
| 2003/0217105 A1 | 11/2003 | Zircher et al. |
| 2003/0233489 A1 | 12/2003 | Blaser et al. |
| 2003/0233490 A1 | 12/2003 | Blaser et al. |
| 2003/0233541 A1 | 12/2003 | Fowler et al. |
| 2003/0233544 A1 | 12/2003 | Erlingsson |
| 2003/0233647 A1 | 12/2003 | Blaser et al. |
| 2003/0236837 A1 | 12/2003 | Johnson et al. |
| 2003/0236861 A1 | 12/2003 | Johnson et al. |
| 2003/0236919 A1 | 12/2003 | Johnson et al. |
| 2004/0031058 A1 | 2/2004 | Reisman |
| 2004/0039594 A1 | 2/2004 | Narasimhan et al. |
| 2004/0044643 A1 | 3/2004 | Devries et al. |
| 2004/0045016 A1 | 3/2004 | Romm et al. |
| 2004/0078591 A1 | 4/2004 | Teixeira et al. |
| 2004/0098724 A1 | 5/2004 | Demsey et al. |
| 2004/0117759 A1 | 6/2004 | Rippert et al. |
| 2004/0128250 A1 | 7/2004 | Fox et al. |
| 2004/0128346 A1 | 7/2004 | Melamed et al. |
| 2004/0131042 A1 | 7/2004 | Lillie et al. |
| 2004/0133650 A1 | 7/2004 | Miloushev et al. |
| 2004/0153606 A1 | 8/2004 | Schott |
| 2004/0186860 A1 | 9/2004 | Lee et al. |
| 2004/0204073 A1* | 10/2004 | Yanosy .................. 455/557 |
| 2004/0230971 A1 | 11/2004 | Rachman et al. |
| 2004/0236777 A1 | 11/2004 | Pardikar et al. |
| 2004/0249937 A1 | 12/2004 | Tachihara et al. |
| 2004/0255048 A1 | 12/2004 | Lev Ran et al. |
| 2004/0268361 A1 | 12/2004 | Schaefer |
| 2005/0004942 A1 | 1/2005 | Madsen et al. |
| 2005/0010670 A1 | 1/2005 | Greschler et al. |
| 2005/0010924 A1 | 1/2005 | Hipp et al. |
| 2005/0010927 A1 | 1/2005 | Stern et al. |
| 2005/0015775 A1 | 1/2005 | Russell et al. |
| 2005/0021613 A1 | 1/2005 | Schmeidler et al. |
| 2005/0039190 A1 | 2/2005 | Rees et al. |
| 2005/0044089 A1 | 2/2005 | Wu et al. |
| 2005/0044108 A1 | 2/2005 | Shah et al. |
| 2005/0050053 A1 | 3/2005 | Thompson |
| 2005/0050084 A1 | 3/2005 | Atm |
| 2005/0060725 A1 | 3/2005 | D'Souza et al. |
| 2005/0063083 A1 | 3/2005 | Dart et al. |
| 2005/0065937 A1 | 3/2005 | Degenaro et al. |
| 2005/0080906 A1 | 4/2005 | Pedersen |
| 2005/0091214 A1 | 4/2005 | Probert et al. |
| 2005/0091511 A1 | 4/2005 | Nave et al. |
| 2005/0091534 A1 | 4/2005 | Nave et al. |
| 2005/0091535 A1 | 4/2005 | Kavalam et al. |
| 2005/0091655 A1 | 4/2005 | Probert et al. |
| 2005/0091658 A1 | 4/2005 | Kavalam et al. |
| 2005/0114296 A1 | 5/2005 | Farber et al. |
| 2005/0114870 A1 | 5/2005 | Song et al. |
| 2005/0125663 A1 | 6/2005 | Funk |
| 2005/0149726 A1 | 7/2005 | Joshi et al. |
| 2005/0165853 A1 | 7/2005 | Turpin et al. |
| 2005/0165928 A1 | 7/2005 | Shu et al. |
| 2005/0169073 A1 | 8/2005 | Cook et al. |
| 2005/0172279 A1 | 8/2005 | Cook et al. |
| 2005/0192921 A1 | 9/2005 | Chaudhuri et al. |
| 2005/0193139 A1 | 9/2005 | Vinson et al. |
| 2005/0193396 A1 | 9/2005 | Stafford-Fraser et al. |
| 2005/0195835 A1 | 9/2005 | Savage et al. |
| 2005/0198239 A1 | 9/2005 | Hughes |
| 2005/0229154 A1 | 10/2005 | Hiew et al. |
| 2005/0246444 A1 | 11/2005 | Koehane et al. |
| 2005/0246704 A1 | 11/2005 | Romm et al. |
| 2005/0257265 A1 | 11/2005 | Cook et al. |
| 2005/0257266 A1 | 11/2005 | Cook et al. |
| 2005/0262181 A1 | 11/2005 | Schmidt et al. |
| 2006/0010433 A1 | 1/2006 | Neil |
| 2006/0020858 A1 | 1/2006 | Schaefer |
| 2006/0020937 A1 | 1/2006 | Schaefer |
| 2006/0026602 A1 | 2/2006 | Duplichan |
| 2006/0031165 A1 | 2/2006 | Nave et al. |
| 2006/0036570 A1 | 2/2006 | Schaefer et al. |
| 2006/0037004 A1 | 2/2006 | Long et al. |
| 2006/0053228 A1 | 3/2006 | Rachman et al. |
| 2006/0064697 A1 | 3/2006 | Kagi et al. |
| 2006/0090171 A1 | 4/2006 | Laborczfalvi et al. |
| 2006/0136389 A1 | 6/2006 | Cover et al. |
| 2006/0174223 A1 | 8/2006 | Muir et al. |
| 2006/0206931 A1 | 9/2006 | Dillaway et al. |
| 2006/0248527 A1 | 11/2006 | Jaeckel et al. |
| 2006/0257266 A1 | 11/2006 | LeDoux et al. |
| 2006/0265714 A1 | 11/2006 | Bissett et al. |
| 2007/0006226 A1 | 1/2007 | Hendel |
| 2007/0011672 A1 | 1/2007 | Bhide et al. |
| 2007/0067366 A1 | 3/2007 | Landis |
| 2007/0094667 A1 | 4/2007 | Bissett et al. |
| 2007/0179955 A1 | 8/2007 | Croft et al. |
| 2007/0192444 A1 | 8/2007 | Ackaouy et al. |
| 2007/0245409 A1 | 10/2007 | Harris et al. |
| 2008/0016233 A1 | 1/2008 | Schneider |
| 2008/0134176 A1* | 6/2008 | Fitzgerald et al. ................ 718/1 |
| 2008/0163210 A1* | 7/2008 | Bowman et al. ................ 718/1 |
| 2008/0222160 A1 | 9/2008 | MacDonald et al. |
| 2009/0024997 A1 | 1/2009 | Kobayashi |
| 2009/0241108 A1* | 9/2009 | Edwards et al. ................ 718/1 |
| 2011/0029968 A1* | 2/2011 | Sanders et al. ................ 717/178 |

FOREIGN PATENT DOCUMENTS

| | | |
|---|---|---|
| AU | 7564398 A | 11/1998 |
| AU | 711280 B2 | 10/1999 |
| AU | 5104699 A | 2/2000 |
| AU | 2463700 A | 8/2000 |
| AU | 2862500 A | 8/2000 |
| AU | 4236100 A | 11/2000 |
| AU | 2957501 A | 7/2001 |
| AU | 2973701 A | 7/2001 |
| AU | 3857201 A | 8/2001 |
| AU | 4350201 A | 9/2001 |
| AU | 4555401 A | 9/2001 |
| AU | 6498901 A | 12/2001 |
| AU | 7865401 A | 1/2002 |
| AU | 9079601 A | 3/2002 |
| AU | 9308701 A | 4/2002 |
| AU | 9308801 A | 4/2002 |
| AU | 3403602 | 5/2002 |
| AU | 2002309834 A2 | 11/2002 |
| AU | 2003251505 A1 | 12/2003 |
| CA | 2248086 A1 | 9/1997 |
| CA | 2354078 A1 | 7/2000 |
| CA | 2307008 | 10/2000 |
| CA | 2421609 | 3/2002 |
| CA | 2427848 A1 | 4/2002 |
| CA | 2465880 A1 | 11/2002 |
| CN | 1185591 A | 6/1998 |
| CN | 1354857 A | 6/2002 |
| CN | 1599901 | 3/2005 |
| EP | 0 863 453 A1 | 9/1998 |
| EP | 0 901 655 A1 | 3/1999 |
| EP | 0 927 921 A2 | 7/1999 |
| EP | 1 021 782 A2 | 7/2000 |
| EP | 1 037 147 | 9/2000 |
| EP | 1 047 239 | 10/2000 |
| EP | 1 049 306 | 11/2000 |
| EP | 1 163 599 A1 | 12/2001 |
| EP | 1 241 575 A2 | 9/2002 |
| EP | 1 289 225 | 3/2003 |
| EP | 1 330 705 | 7/2003 |
| EP | 1 330 738 A1 | 7/2003 |
| EP | 1 332 432 A1 | 8/2003 |
| EP | 1 364 296 | 11/2003 |
| EP | 1 388 812 | 2/2004 |
| EP | 1 410 219 A2 | 4/2004 |
| JP | 06-332782 A0 | 12/1994 |
| JP | 2000-307650 | 11/2000 |
| JP | 2001-502821 T | 2/2001 |
| JP | 2002-508907 T | 3/2002 |
| JP | 2002-521745 T | 7/2002 |
| JP | 2003-527645 T | 9/2003 |
| JP | 2003-532166 T | 10/2003 |
| JP | 2004-504681 T | 2/2004 |
| JP | 2004-509539 | 3/2004 |
| JP | 2004-533054 T | 10/2004 |
| KR | 990003481 | 9/2000 |
| KR | 990068380 | 9/2000 |
| WO | WO-97/34225 A1 | 9/1997 |
| WO | WO-98/47074 | 10/1998 |
| WO | WO-98/50474 A2 | 11/1998 |
| WO | WO-98/59460 A1 | 12/1998 |
| WO | WO-99/60462 A1 | 11/1999 |
| WO | WO-00/05637 A2 | 2/2000 |
| WO | WO-00/30323 A2 | 5/2000 |
| WO | WO-00/43919 A1 | 7/2000 |
| WO | WO-00/45262 A2 | 8/2000 |
| WO | WO-00/51290 A2 | 8/2000 |
| WO | WO-00/46685 A1 | 10/2000 |
| WO | WO-00/62161 A2 | 10/2000 |
| WO | WO-00/62507 A1 | 10/2000 |
| WO | WO-01/00651 A1 | 1/2001 |
| WO | WO-01/25894 A1 | 4/2001 |
| WO | WO-01/35717 A2 | 5/2001 |
| WO | WO-01/53938 A1 | 7/2001 |
| WO | WO-01/53940 A2 | 7/2001 |
| WO | WO-01/54375 A2 | 7/2001 |
| WO | WO-01/55813 A2 | 8/2001 |
| WO | WO-01/61967 A2 | 8/2001 |
| WO | WO-01/67379 A2 | 9/2001 |
| WO | WO-01/69448 A1 | 9/2001 |
| WO | WO-01/75632 A1 | 10/2001 |
| WO | WO-01/90901 A2 | 11/2001 |
| WO | WO-01/95094 A2 | 12/2001 |
| WO | WO-02/07364 A2 | 1/2002 |
| WO | WO-02/23362 A1 | 3/2002 |
| WO | WO-02/23363 A1 | 3/2002 |
| WO | WO-02/27492 A1 | 4/2002 |
| WO | WO-02/27556 A1 | 4/2002 |
| WO | WO-02/37267 A2 | 5/2002 |
| WO | WO-02/39221 A2 | 5/2002 |
| WO | WO-02/39260 A2 | 5/2002 |
| WO | WO-02/39261 A2 | 5/2002 |
| WO | WO-02/39262 A2 | 5/2002 |
| WO | WO-02/39263 A2 | 5/2002 |
| WO | WO-02/39264 A2 | 5/2002 |
| WO | WO-02/39275 A2 | 5/2002 |
| WO | WO-02/39276 A2 | 5/2002 |
| WO | WO-02/39301 A2 | 5/2002 |
| WO | WO-02/39666 A2 | 5/2002 |
| WO | WO-02/39693 A2 | 5/2002 |
| WO | WO-02/39695 A2 | 5/2002 |
| WO | WO-02/41575 A2 | 5/2002 |
| WO | WO-02/42922 A2 | 5/2002 |
| WO | WO-02/43320 A2 | 5/2002 |
| WO | WO-02/43364 A2 | 5/2002 |
| WO | WO-02/46925 A2 | 6/2002 |
| WO | WO-02/46944 A2 | 6/2002 |
| WO | WO-02/46945 A2 | 6/2002 |
| WO | WO-02/058349 A1 | 7/2002 |
| WO | WO-02/069604 A2 | 9/2002 |
| WO | WO-02/093369 A1 | 11/2002 |
| WO | WO-02/103521 A1 | 12/2002 |
| WO | WO-03/029977 A2 | 4/2003 |
| WO | WO-03/107183 A1 | 12/2003 |
| WO | WO-03/107220 A1 | 12/2003 |
| WO | WO-03/107221 A1 | 12/2003 |
| WO | WO-2004/003879 | 1/2004 |
| WO | WO-2004/006041 A2 | 1/2004 |
| WO | WO-2004/017601 A2 | 2/2004 |
| WO | WO-2004/049672 A2 | 6/2004 |
| WO | WO-2004/051964 A2 | 6/2004 |
| WO | WO-2004/066278 A2 | 8/2004 |
| WO | WO-2004/090672 A2 | 10/2004 |
| WO | WO-2005/024550 A2 | 3/2005 |
| WO | WO-2005/024567 A2 | 3/2005 |
| WO | WO-2005/024665 A1 | 3/2005 |
| WO | WO-2005/029313 A1 | 3/2005 |
| WO | WO-2005/029363 A1 | 3/2005 |
| WO | WO-2005/045616 A2 | 5/2005 |
| WO | WO-2005/052762 | 6/2005 |
| WO | WO-2005/052762 A2 | 6/2005 |
| WO | WO-2005/059726 A2 | 6/2005 |
| WO | WO-2005/074232 A1 | 8/2005 |
| WO | WO-2005/084232 A2 | 9/2005 |
| WO | WO-2006/012533 | 2/2006 |
| WO | WO-2006/012533 A2 | 2/2006 |
| WO | WO-2006/017388 | 2/2006 |
| WO | WO-2006/017388 A1 | 2/2006 |
| WO | WO-2006/020094 A2 | 2/2006 |
| WO | WO-2006/039239 | 4/2006 |

OTHER PUBLICATIONS

Adaballa et al., "From Virtualized Resources to Virtualized Computing Grids: The In-VIGO System," J. Future-Generation Computing System, (2004) to appear.

Allison, Bridget et al., "File System Security: Secure Network Data Sharing for NT and UNIX," in Network Appliance, Inc. Tech Library pp 16 pgs. Jan. 1, 1998.

Anonymous, "Health Canada Takes Its Network Pulse," Communications News, 48, Oct. 2001, available at http://www.findarticles.com/p/articles/mi_m0DUD/is_5_23/ai_86039142/.

Anonymous, "Multiple Platforms Bring Multiple Challenges," Communications News, 56, Oct. 2001, available at http://www.findarticles.com/p/articles/mi_m0CMN/is_10_38/ai_79370488.

Anonymous, "Remote Access," Secure Computing, 47-60, Oct. 1997.

Antonoff, M., "Writing in a Spreadsheet," Personal Computing, 51-54, 1987.

Ao et al., "A Hierarchical Policy Specification Language, and Enforcement Mechanism, for Governing Digital Enterprises", 3rd IEEE International Workshop on Policies for Distributed Systems and Networks (Policy 2002), 38-49, IEEE CS Press, 2002, available at http://www.cs.rutgers.edu/~tdnguyen/pubs/ao-policy-2002.pdf.

Back et al., "Contracts, Games and Refinement," TUCS Technical Report No. 138, Turku Centre for Computer Science, Nov. 1-15, 1997.

Bala et al., "Dynamo: A Transparent Dynamic Optimization System," Proc ACM SIGPLAN2000 Conf. Programming Language Design and Implementation, ACM Press, 2000, pp. 1-12.

Baraz et al., IA-32 Execution Layer: A Two-Phase Dynamic Translator Designed to Support IA-32 Applications on Itanium-Based Systems,' Proc. 36th Ann. IEEE/ACM Intl Symp. Microarchitecture, IEEE CS Press, 2003, pp. 191-204.

Barham et al., "Xen and the Art of Virtualization," Proc. 19th ACM Symp. Operating Systems Principles, ACM Press, 2003, pp. 164-177.

Beers, C., "McAfee Shores Up Your Defenses," Network Computing, 38, Jun. 2003, available at http://www.networkcomputing.com/1412/1412sp3.html.

Biggins, "Sychron Rises from the Ashes to Try its Hand at Desktop Virtualization", Jan. 17, 2006 (available at http://www.the451group.com/mis/451mis.php?sector focus=10).

Bird, T., "Reduce the Threat from Computers," Communications News, 36, 38-39, Mar. 2005, available at http://www.comnews.com/stories/articles/0305/0305reduce_threat.htm.

Borden et al, "Multiple Operating Systems on One Processor Complex," IBM Systems J., Jan. 1989, pp. 104-123.

Bouras, et al., "Application on Demand System over the Internet", Journal of Network and Computer Applications, Academic Press, New York, NY, US, 28(3):209-232, 2005.

Box, Essential .NET, vol. 1: The Common Language Runtime, Addison-Wesley, 2002.

Boyd et al., "Preemptive module replacement using the virtualizing operating system realizing multi-dimensional software adaptation," Proceedings of the ACM Workshop on Self-Healing, Adaptive and self-MANaged Systems (SHAMAN), in conjunction with the 16th Annual ACM International Conference on Supercomputing, (New York, NY), Jun. 2002.

Boyd et al., "Virtualizing Operating Systems for Seamless Distributed Environments," in Proceedings of the IASTED International Conference on Parallel and Distributed Computing and Systems, vol. 2, Nov. 2000, pp. 735-740.

Boyd, et al., "Process Migration: A Generalized Approach Using A Virtualizing Operating System," Proceedings of the 22nd International Conference on Distributed Computing Systems, ICDS 2002, Vienna Austria, Jul. 2-5, 2002, International Conference on Distributed Computing Systems, Los Alamitos, CA: IEEE Comp. Soc, US, vol. Conf. 22, Jul. 2, 2002, pp. 348-355.

Brekne, T., "Mobile Agents and (In-)Security," Telektronikk, 34-46, 2000.

Bressoud and Schneider, "Hypervisor-based Fault-tolerance," Proc. 15th ACM Symp. Operating Systems Principles, ACM Press, 1995, pp. 1-11.

Bugnion et al., "Disco: Running Commodity Operating Systems on Scalable Multiprocessors," Computer Systems, vol. 15, No. 4, 1997, pp. 412-447.

Burnett et al., "SLN116 Using a Virtual Infrastructure to Implement Hosted Desktop Solutions", VM World 2005, pp. 1-30, 2005.

Carvalho et al., "Supporting Flexible Data Feeds in Dynamic Sensor Grids Through Mobile Agents," Lecture Notes in Computer Science vol. 2535, Proc. 6th International Conference on Mobile Agents (MA 2002), 171-185, Springer-Verlag, Germany, 2002.

Chandra et al., "The Collective: A Cache-Based System Management Architecture," Proc. Symp. Network Systems Design and Implementation, USENIX, 2005, to appear.

Cheng et al., "Adjusting the Autonomy of Collections of Agents in Multiagent Systems," Lecture Notes in Computer Science vol. 3501, 33-37, Advances in Artificial Intelligence: Proc. 18th Conference of the Canadian Society for Computational Studies of Intelligence (Canadian AI 2005), Springer-Verlag, Germany, 2005.

Chinese Office Action, dated May 16, 2008, in Chinese Patent Application No. 200580041055.6.

Chinese Office Action, dated May 23, 2008, in Chinese Patent Application No. 200580041022.1.

Citrix XenApp Application Streaming; http://www.citrix.com/English/ps2/products/subfeature.asp?contentID=163987; printed Nov. 17, 2008.

Corradi et al., "Policy-Driven Management of Agent Systems," Lecture Notes in Computer Science vol. 1995, Policies for Distributed Systems and Networks: Proc. International Workshop (Policy 2001), 214-229, Springer-Verlag, Germany, 2001.

Cowan, et al., "Subdomain: Parsimonious Server Security", Proceeding of the 14th Usenix Systems Administration Conference, pp. 1-20, 2000. URL: http://coblitz.codeen.org:3125/citeseer.ist.psu.edu/cache/papers/cs/20700/http:zSzzSzwww.cse.ogi.eduzSz~crispinzSzsubdomain.pdf/cowan00subdomain.pdf.

Creasy, "The Origin of the VM/370 Time-Sharing System," IBM J. Research and Development, Sep. 1981, pp. 483-490.

Czajkowski et al., "A Multi-User Virtual Machine", Proc. of the USENIX 2003 Annual Technical Conference, 2003, pp. 85-98.

Declaration of Non-Establishment of International Search Report, PCT/US2007/060963, mailed May 30, 2007. 2 pages.

Declaration of Non-Establishment of International Search Report, PCT/2005/034178, mailed on Jan. 2, 2006.

Declaration of Non-Establishment of International Search Report, PCT/US2007/060895, mailed Sep. 21, 2007. 2 pages.

Dulay et al., "A Policy Deployment Model for the Ponder Language," Proc. IEEE/IFIP—International Symposium on Integrated network Management (IM 2001) 529-543 Seattle.

Dunlap et al., "ReVirt: Enabling Intrusion Analysis through Virtual-Machine Logging and Replay," Proc. 5th Symp. Operating Systems Design and Implementation, USENIX, 2002, pp. 211-224.

England et al., "A Trusted Open Platform," Computer, Jul. 2003, pp. 55-62.

Enterprise Hosted Desktop, VM World 2005, pp. 1-41, 2005.

Epema et al., "A Worldwide Flock of Condors: Load sharing among Workstation Clusters," J. Future Generation Computer Systems, vol. 12, No. 1, 1996, pp. 53-65.

Esposito, A. et al., "Integrating Concurrency Control and Distributed Data into Workflow Frameworks: An Actor Model Perspective," 2000 IEEE International Conference on Systems, Man, and Cybernetics, vol. 3, 2110-2114, IEEE Press, 2000.

European Search Report, 4324MNMms, dated Jan. 10, 2008 in Application No. 07113091.8-2211.

European Search Report, 4325MNMms, dated on Jan. 15, 2008 in Application No. 07113105.6-2211.

European Search Report, dated Jan. 8, 2008 in Application No. 05800952.3-2211.

European Search Report, dated May 6, 2008 in Application No. 07112979.5-2211.

European Search Report, dated May 23, 2008 in Application No. 07112164.4-2211.

European Search Report, dated May 6, 2008 in Application No. 07112979.5-2211.

European Search Report, dated May 8, 2008, in Application No. 07112596.7-2211.

European Search Report, dated Sep. 25, 2007 in Application No. 07112164.4-2211.

Feldman, M., "Enterprise Wrappers for Information Assurance," Proc. DARPA Information Survivability Conference and Exposition (DISCEX'03), IEEE Press, 2003.

Fellows, "Parallels prices virtualization at 50% less than VMware, Microsoft", Oct. 24, 2005 (available at http://www.the451group.com/about/bio_detail.php?eid=113).

Figueiredo et al, "A Case for Grid Computing on Virtual Machines," Proc. Int'l Conf. Distributed Computing Systems (ICDCS 03), IEEE CS Press, 2003, pp. 550-559.

Figueiredo et al, "Resource Virtualization Renaissance," Computer, May 2005 pp. 28-31.

Foster and Kesselman, The Grid: Blueprint for a New Computing Infrastructure, "Globus: A Toolkit-Based Grid Architecture," Morgan Kaufmann, 1999, pp. 259-278.

Foster et al., "The Physiology of the Grid: An Open Grid Services Architecture for Distributed Systems Integration," Open Grid Service Infrastructure WG, Global Grid Forum, Jun. 2002 (available at http://www.olobus.oro/research/papers/oosa.odt).

Fratto, M., "Hammering Out a Secure Framework," Network Computing, 79-80, 82, 84-87, 2000, available at http://www.networkcomputing.com/1101/1101f3.html.

Friedlander and Yates, "Desktop Virtualization Is the Future of the Corporate PC", pp. 1-11, 2006 (available at www.forrester.com).

Funk Software, "Funk Software's Endpoint Assurance Solution. The Secure Product Foundation for Endpoint Integrity," 2005, available at: http://www.juniper.net/welcome_funk.html.

Garfinkel and Rosenblum, "A Virtual Machine Introspection Based Architecture for Intrusion Detection," Proc. Network and Distributed Systems Security Symp., The Internet Society, 2003, pp. 191-206.

Garfinkel et al., "Terra: A Virtual Machine-Based Platform for Trusted Computing," Proc. 19th ACM Symp. Operating Systems Principles, ACM Press, 2003, pp. 193-206.

Goldberg, "Survey of Virtual Machine Research," Computer, Jun. 1974, pp. 34-45.

Graniero, P.A. et al. "Investigating the Role of Fuzzy Sets in a Spatial Modeling Framework," Proc. 9th IFSA World Congress and 20th NAFIPS International Conference, 2370-2375, IEEE Press 2001.

Guy III, E.T., "An Introduction to the CAD Framework Initiative," Electro 1992 Conference Record, 78-83, Massachusetts, May 1992.

Intel Corp., "Intel Virtualization Technology Specification for the IA-32 Intel Architecture," (available at http://www.cs.utah.edu/Classes/cs7940-010-raieev/spr06/Daperslvm.

Intel Corp., "Intel Virtualization Technology Specification for the Intel Itanium Architecture (VT-i);" (available at www.intel.com/cd/00/00/21/421214273_214273.pdf).

International Search Report, PCT/US2005/033994, mailed on Feb. 15, 2006.

International Search Report, PCT/US2005/034302, mailed on May 8, 2006.

Jiang and Xu, "VIOLIN: Virtual Internetworking on Overlay Infrastructure," Proc. 2nd Int'l Symp. Parallel and Distributed Processing and Applications, LNCS 3358, Springer-Verlag, 2004, pp. 937-946.

Jiang and Xu, "SODA: A Service-On-Demand Architecture for Application Service Hosting Utility Platforms," Proc. 12th IEEE Int'l Symp. High-Performance Distributed Computing (HPDC-12), IEEE CS Press, 2003, pp. 174-183.

Jin, H. et al., "A Distributed Dynamic µFirewall Architecture With Mobile Agents and KeyNote Trust Management System," Lecture Notes in Computer Science, vol. 2513, Proc. 4th International Conference on Information and Communications Security, (ICICS 2002), 13-24, Springer-Verlag, Germany, 2002.

Jun, M. et al., "Application of Mobile Scanning Agent in the Network Security," J. of Systems Engineering and electronics, 15(3): 371-376, 2004.

Juniper Networks NetScreen-SA 5000 Series. Spec Sheet, Secure Access Appliances. Juniper Networks, Sunnyvale, CA, 4 pages.

Juniper Networks, "Juniper Networks Infranet Controllers Provide Unified Access Control for all Users throughout Your Network," (Oct. 2005), available at: http://www.juniper.nel/products/ua/dsheet/100137.pdf.

Keromytis, A.D. et al., "Transparent Network Security Policy Enforcement," Proc. USENIX Technical Conference, 215-225, San Diego, CA, USA, 2000.

Kim, S.C. et al., "Study of Security Management System Based on Client/Server Model," 1403-1408, IEEE Press, 1999.

Klaiber, "The Technology Behind Crusoe Processors: Low-Power x86-Compatible Processors Implemented with Code Morphing Software," tech. brief, Transmeta Corp., 2000.

Klein, D., "Developing Applications with a UIMS," Proc. USENIX Applications Development Symposium, 37-56, 1994.

Kosar, T. et al., "A Framework for Reliable and Efficient Data Placement in Distributed Computing Systems," Journal of Parallel and Distributed Computing, vol. 65 (10), 1146-1157, Academic Press, Inc., Orlando, FL, USA, 2005.

Kozuch and Satyanarayanan, "Internet Suspend/Resume," Proc. IEEE Workshop Mobile Computing Systems and Applications, IEEE Press, 2002, pp. 40-46.

Krief, F. et al., "An Intelligent Policy-Based Networking Environment for Dynamic Negotiation, Provisioning And Control of QoS," IFIP TC6/WG6.2 & WG6.7 Conference on Network Control and Engineering for QoS, Security and Mobility, (Net-Con 2002), 285-290, Kluwer Academic Publishers, 2002.

Krsul et al., "VMPlants: Providing and Managing Virtual Machine Execution Environments for Grid Computing," Proc. IEEE/A CM Supercomputing, IEEE CS Press, 2004, p. 7.

Law, K.L.E. et al., "Policy-Based Management With Active Networks," IFLIP TC6/WG6.2 &WG6.7 Conference on Network Control and Engineering for QoS, Security and Mobility, (Net-Con 2002), 129-140, Kluwer Academic Publishers 2002.

Law, K.L.E. et al., "UPM: Unified Policy-Based Network Management," Proc. SPIE, (ITCom 2001), vol. 4523, 326-337, Denver, CO, USA, 2001.

Law, K.L.E. et al., "Performance of a Multi-Tiered Policy-Based Management System," IFIP TC6/WG6.2 & WG6.7 Conference on Network Control and Engineering for QoS, Security and Mobility, (Net-Con 2002), 203-214, Kluwer Academic Publishers, 2002.

Lee, D.W. et al., "Managing Fault Tolerance Information in Multi-Agents Based Distributed Systems," Lecture Notes in Computer Science, vol. 2690, Intelligent Data Engineering and Automated Learning, (IDEAL 2003), 104-108, Springer-Verlag, Germany, 2003.

Liang, Z., et al., "Isolated Program Execution: An Application Transparent Approach for Executing Untrusted Programs," Computer Security App. Conf. 182-191, 2003.

Lindholm and Yellin, The Java Virtual Machine Specification, 2nd ed., Addison-Wesley, 1999.

Madden, "Providing Desktops to Users: Centralized Virtual Machines or Terminal Server Desktops?", Oct. 24, 2005.

Maes, S. et al., "Identifiability of Causal Effects in a Multi-Agent Causal Model," IEEE/WIC International Conference on Intelligent Agent Technology, (IAT'03), 605, IEEE Press, 2003.

Magnusson, "The Virtual Test Lab," Embedded Computing, May 2005, pp. 95-97.

Mahler, R.P. et al. "Technologies for Unified Collection and Control of UCAVs," Proc. of SPIE vol. 4729, 90-101, 2002.

Matsuura, S. et al., "An Extension of ECA Architecture and its Application to HTML Document Browsing," IEEE International Conference on Systems, Man, and Cybernetics, vol. 1, 738-743, IEEE Press 1999.

Maxim, M. and Venugopal, A., "Securing Agent Based Architectures," Lecture Notes in Computer Science vol. 2480, Proc. First International Conference on Engineering and Deployment of Cooperative Information Systems, 220-231, Springer-Verlag, Germany, 2002.

McAfee System Protection Solutions, "Enforcing Endpoint Policies for Network Access with Policy Enforcer: Selecting the Right Solution for your Environment," 2005, available at http:/mcafee.com/us/local content/white papers/wp_mpe securingyounetwork.pdf.

McAfee System Protection Solutions, "McAfee Policy Enforcer," 2005, available at: http://www.mcafee.com/us/local content/datasheets/ds policy enforcer.pdf.

Meyer, B. et al., "Towards Implementing Policy-Based Systems Management," Distrib. Syst. Engng vol. 3, 78-85, The Institution of Electrical Engineers and IOP Publishing, Ltd., 1996, available at http://www.mobile.ifi.lmu.de/common/Literatur/MNMPub/Publikationen/map96/PDF-Version/map96.pdf.

Microsoft Corp., "Microscoft Virtual Server 2005 R2 Technical Overview," 2004, (available at http://downloadmicrosoft.com/download/5/5/3/55321426-cb-43/4572-9123-74ca3 af6911d/VS2005Tech WP.doc).

Microsoft DOS ipconfig command, 1998-2009, http://www.computerhope.com/ipconfig.htm.

Molta, D., "Odyssey Makes Wireless LANs a Safe Trip," Networking Computing, 24, 26, 2002, available at <http://www.networkcomoutina.com/1311/1311so2.html>.

Montananri R. et al, "Context-Based Security Management for Multi-Agent Systems," Proc. Second IEEE Symposium on Multi-Agent Security and Survivability (MAS&S 2005), IEEE Press, 2005.

Moving Toward the On Demand Enterprise, How Sychron Solutions Can Make it a Reality pp. 1-5, 2005 (available at www.sychron.com).

Neuman et al., The Kerberos Network Authentication Service (V5), Internet draft, work in progress, Sep. 2004.

Page, S.E., "Self Organization and Coordination," Computational Economics, vol. 18, 25-48, Kluwer Academic Publishers, 2001.

Palmer, D. et al., "Decentralized Cooperative Auction for Multiple Agent Task Allocation Using Synchronized Random No. Generators," Proc. IEEE/RSJ International Conference on Intelligent Robots and Systems, 1963-1968, IEEE Press, 2003.

Patwardhan, A. et al., "Enforcing Policies in Pervasive Environments," First Annual International Conference on Mobile and Ubiquitous Systems: Networking and Services, (MobiQuitous '04), 299-308, IEEE Press, 2004.

Perkins et al., "Route Optimization in Mobile IP," Internet draft, work in progress, Sep. 2001.

Peterson et al., "A Blueprint for Introducing Disruptive Technology into the Internet," Proc. ACM Workshop on Hot Topics in Networking (HotNets-I), ACM Press, 2003, pp. 59-64.

Pietrek, "Intercepting API Functions in Win32", PC Magazine—US Edition, Ziff-Davis, New York, NY, US, 13(19):307-312, Aug. 11, 1994.

Pohl, Stephan, 2002, "System/Windows Info 0.5", http://wareseeker.com/Utilities/system-windows-info-0.5.zip/611583.

Popek and Goldberg, "Formal Requirements for Virtualizable Third Generation Architectures," Comm. ACM, Jul. 1974, pp. 412-421.

Potter et al., "Secure Isolation and Migration of Untrusted Legacy Applications" Computer Science Department, Columbia University, Columbia Technical Report CUCS-005-04, Jan. 2004.

Randic, M. et al., "Object by Value Transfer Mechanisms for Obligation Policy Enforcement Object Loading," Proc. 12th IEEE Mediterranean Electrotechnical Conference, (Melecon 2004), IEEE Press, 2004.

Rosenblum and Garfinkel, "Virtual Machine Monitors: Current Technology and Future Trends," Computer, May 2005, pp. 39-47.

Ruth et al., "Virtual Distributed Environments in a Shared Infrastructure," Computer, May, 2005, pp. 63-69.

Sampemane, et al., "Access control for active spaces", Computer Security Applications Conference, 2002. Proceedings. 18th Annual Dec. 9-13, 2002, Piscataway, NJ, USA, IEEE, pp. 343-352.

Simon et al., "A Cryptographic Protocol to Obtain Secure Communications in Extended Ethernet Environment," Proc. 17th Conf. on Local Computer Networks, 254-261, IEEE CS Press, 1992.

Sirbu, et al., "Distributed Authentication in Kerberos Using Public Key Cryptograph," Proc. 1997 Symposium on Network and Distributed Systems Security (SNDSS'97), 134-141, IEEE CS Press, 1997.

Sites et al., "Binary Translation," Comm. ACM, Feb. 1993, pp. 69-81.

Smith and Nair, "The Architecture of Virtual Machines," Computer, May 2005, pp. 32-38.

Soltis, "Inside the AS/400," Duke Press, 1996.

Souder, et al., "A tool for securely integrating legacy systems into a distributed environment", Reverse Engineering, 1999, Proceedings. Sixth Working Conference on Atlanta, GA, USA Oct. 6-8, 1999, Los Alamitos, CA, USA, IEEE Comput. Soc., US, pp. 47-55.

Sugerman et al., "Virtualizing I/O Devices on VMware Workstation's Hosted Virtual Machine Monitor," Proc. USENIX Ann. Technical Conf, USENIX, 2001, pp. 1-14.

Sun Microsystems, "Sun Enterprise 10000 Server: Dynamic System Domains," tech. whitepaper, 1999 available at www.sun.com/datacenter/docs/domainswp.pdf).

Sun Mircrosystems White Paper, "Sun Ray Interoperability Brief," sun.com./sunray, Aug. 2003.

Sundararaj and Dinda, "Towards Virtual Networks for Virtual Machine Grid Computing," Proc. 3rd USENIX Virtual Machine Technology Symp., USENIX, 2004, pp. 177-190.

Sundararaj et al., "Dynamic Topology Adaptation of Virtual Networks of Virtual Machines," Proc. 7th Workshop Languages, Compilers, and Runtime Support for Scalable Systems, 2004 (available at http://www.tlc2.uh.edu/lcr2004/Final_Proceedings/ Sundararaj.pdf.).

Suri, N. et al., "DAML-based Policy Enforcement for Semantic Data Transformation and Filtering in Multi-agent Systems," Lecture Notes in Computer Science, vol. 2691, Proc. 2nd International Joint Conference on Autonomous Agents and Multi-Agent Systems, (AAMAS 2003), 1132-1133, ACM Press, New York, USA, 2003.

Suri, N. et al., "Enforcement of Communications Policies in Software Agent Systems through Mobile Code," Proc. 4th International Workshop on Policies for Distributed Systems and Networks, (Policy '03), 247, IEEE Press, 2003.

Sychron "On Demand Desktop Synopsis," Product Synopsis, p. 1 (available at www.sychron.com).

Sychron "On Demand Policy Manager, A Look Inside," A Technical White Paper, pp. 1-17, 2005 (available at www.sychron.com).

Sychron "Sychron Architecture," Technology White Paper, pp. 1-15, 2005 (available at www.sychron.com).

Sychron "Optimizing your Server and Desktop Architecture: The Role of Blade Servers, Thin Clients, and Virtualization," pp. 1-3, 2005 (available at www.sychron.com).

Takahashi, K. et al., "Integrating Heterogeneous and Distributed Information by Linking it to Structured Information as an 'Information Integration Directory'," J81-D-I(5): 443-450, 1998.

Taking Command of Windows XP, http://media.wiley.com/product_data/excerpt/34/07645582/0764558234.pdf, 1-11, May 3, 2004.

TCG Published, "TCG Trusted Network Connect TNC Architecture for Interoperability," 2005, available at: https://www.trustedcomputinggroup.org/groups/network/TNC_Architecture_v1_0_r4.pdf.

TCG Published, "TCG Trusted Network Connect TNC IF-IMC," 2005, available at: https://www.trustedcomputinggroup.org/groups/network/TNC_IFIMC_v1_0_r3.pdf.

TCG Published, "TCG Trusted Network Connect TNC IF-IMV," 2005, available at: https://www.trustedcomputinggroup.org/groups/network/TNC_IFIMV_v1_0_r3.pdf.

Thinstall and Citrix Partner to Deliver Virtualize Citrix Presentation Server C USB Drives, http://finanzen.net/news/news_detail.asp?NewsNr=378407.

Traut, "Building the Virtual PC," Byte, Nov. 1997, pp. 51-52 (available athttp://www.byte.com/art/9711/sec4/art4.htm).

Trusted Computing Group, "Trusted Network Connect: Open Standards for Integrity-Based Network Access Control," 2005, available at: Network Access Control, 2005, available at https://www.trustedcomputinggroup.org/groups/network/Open_Standards_for_IntegrityBased_AccessControl.pdf Standardsfor IntegrityBased_AccessControl.

Trusted Computing Group, "Trusted Network Connect to Ensure Endpoint Integrity," 2005, available at: https://www.trustedcomputinggroup.org/groups/network/TNC_NI-collateral_10_may_(2).pdf.

Turner, "Sychron On Demand Desktop Reduces Cost and Risk of Desktop Application Software Services", pp. 1-4 (available at www.summitstrat.com).

Uhlig, et al., "Intel Virtualization Technology," Computer, May 2005 pp. 48-56.

Uszok, A. et al., "KAoS Policy and Domain Services: Toward a Description-Logic Approach to Policy Representation, Deconfliction, and Enforcement," Proc. 4th International Workshop on Policies for Distributed Systems and Networks, (Policy '03), 93, IEEE Press, 2003.

VMware Inc., "VMware Infrastructure Architecture Overview," 14 pages, white paper V00014- 20001205, 2004(available at www.vmware.com/pdf/vi wp.pdf).

VMware Inc., "VMware Insures Improved Customer Service for Prudential", VMWARE, pp. 1-2 (available at www.vmware.com).

Waldspurger, "Memory Resource Management in VMware ESX Server," Proc. 5th Symp. Operating Systems Design and Implementation, Usenix, 2002, pp. 181-194.

Wang, D. et al., "Study on SOAP-Based Mobile Agent Techniques," Lecture Notes in Computer Science, vol. 2480, Proc. First International Conference on Engineering and Deployment of Cooperative Information Systems, 208-219, Springer-Verlag, Germany, 2002.

Whitaker et al., "Scale and Performance in the Denali Isolation Kernel," Proc. 5th Symp. Operating Systems Design and Implementation, USENIX, 2002, pp. 195-210.

Willeford, "IBM Announces Virtualized Hosted Client Infrastructure with VMware", pp. 1-2, Oct. 19, 2005.

Wittner, O., and Helvik, B.E., "Distributed Soft Policy Enforcement by Swarm Intelligence; Application to Loadsharing and Protection," Ann. Telecommun., vol. 59, No. 1-2, 10 -24, 2004.

Xia, H. et al., "Using Secure Coprocessors to Protect Access to Enterprise Networks," Lecture Notes in Computer Science, vol. 3462, Proc. International IFIP-TC6 Networking Conference, (Networking 2005), Springer-Verlag, Germany, 2005, available at http://www.cs.pittedu/-jcb/papers/net2005.pdf.

Xu, Y. et al., "An Agent-Based Data Collection Architecture for Distributed Simulations," Intl J. of Modeling and Simulation, 24(2), 55-64, 2004.

Yang, K. et al, "Service and Network Management Middleware for Cooperative Information Systems through Policies and Mobile Agents," Lecture Notes in Computer Science, vol. 2480,Proc. First International Conference on Engineering and Deployment of CooperativeInformation Systems, 232-246, Springer-Verlag, Germany, 2002.

Yang, S., "Setting up a Secure Public Workstation," Rider University Library, 153-162.

Yocom, B., et al., "A First Look at Wireless Security Products," Business Comm. Review, 36-48, Oct. 2003.

Yu, Y. et al., "Quality of Service Policy Control in Virtual Private Networks," Proc. of SPIE, vol. 5282, 1055-1060, 2003.

Zhang, Y. and You, J., "An RBAC Based Policy Enforcement Coordination Model in Internet Environment," Lecture Notes in Computer Science, vol. 2480, Proc. First International Conference on Engineering and Deployment of Cooperative Information Systems, 466-477, Springer-Verlag, Germany, 2002.

Zhenkai, et al., "Isolated Program Execution: An Application Transparent Approach for Executing Untrusted Programs", Computer Security Applications Conference, 2003. Proceedings. 19th Annual Dec. 8-12, 2003, Piscataway, NJ, USA, IEEE, Dec. 8, 2003, pp. 182-191.

U.S. Office Action, dated Apr. 1, 2009, in U.S. Appl. No. 10/711,732.
U.S. Office Action, dated Apr. 1, 2009, in U.S. Appl. No. 10/711,733.
U.S. Office Action, dated Apr. 12, 2010, in U.S. Appl. No. 11/231,317.
U.S. Office Action, dated Apr. 16, 2010, in U.S. Appl. No. 11/231,316.
U.S. Office Action, dated Apr. 24, 2009, in U.S. Appl. No. 10/956,723.
U.S. Office Action, dated Apr. 7, 2009, in U.S. Appl. No. 11/231,315.
U.S. Office Action, dated Aug. 22, 2007, in U.S. Appl. No. 10/711,737.
U.S. Office Action, dated Aug. 12, 2008, in U.S. Appl. No. 10/711,734.
U.S. Office Action, dated Aug. 17, 2009, in U.S. Appl. No. 10/711,734.
U.S. Office Action, dated Aug. 19, 2009, in U.S. Appl. No. 10/711,736.
U.S. Office Action, dated Aug. 31, 2009, in U.S. Appl. No. 10/956,723.
U.S. Office Action, dated Dec. 6, 2007, in U.S. Appl. No. 11/246,019.
U.S. Office Action, dated Dec. 14, 2009, in U.S. Appl. No. 11/231,284.
U.S. Office Action, dated Dec. 17, 2009, in U.S. Appl. No. 11/231,316.
U.S. Office Action, dated Dec. 19, 2008, in U.S. Appl. No. 10/711,735.
U.S. Office Action, dated Dec. 23, 2008 in U.S. Appl. No. 10/711,737.
U.S. Office Action, dated Feb. 26, 2009, in U.S. Appl. No. 10/711,734.
U.S. Office Action, dated Feb. 4, 2009, in U.S. Appl. No. 10/711,736.
U.S. Office Action, dated Jan. 11, 2007, in U.S. Appl. No. 10/711,737.
U.S. Office Action, dated Jul. 21, 2009, in U.S. Appl. No. 10/711,735.
U.S. Office Action, dated Jul. 22, 2009, in U.S. Appl. No. 10/711,737.
U.S. Office Action, dated Jun. 10, 2010, in U.S. Appl. No. 11/231,284.
U.S. Office Action, dated Mar. 10, 2010, in U.S. Appl. No. 10/956,723.
U.S. Office Action, dated Mar. 16, 2010, in U.S. Appl. No. 10/711,736.
U.S. Office Action, dated May 14, 2010, in U.S. Appl. No. 10/711,733.
U.S. Office Action, dated May 28, 2008, in U.S. Appl. No. 10/711,737.
U.S. Office Action, dated Nov. 14, 2007, in U.S. Appl. No. 10/711,734.
U.S. Office Action, dated Nov. 12, 2008, in U.S. Appl. No. 10/956,723.
U.S. Office Action, dated Nov. 12, 2009, in U.S. Appl. No. 10/711,733.
U.S. Office Action, dated Oct. 6, 2009, in U.S. Appl. No. 11/231,370.
US Office Action, dated Jan. 22, 2009, in U.S. Appl. No. 11/552,315.
US Office Action, dated Jan. 5, 2009, in U.S. Appl. No. 11/624,394.
US Office Action dated Mar. 25, 2009, in U.S. Appl. No. 11/277,296
US Office Action, dated Oct. 29, 2008, in U.S. Appl. No. 11/624,402.
US Office Action, dated Oct. 7, 2008, in U.S. Appl. No. 11/272,598.
US Office Action, dated Sep. 1, 2010 in U.S. Appl. No. 11/231,370.
US Office Action dated Mar. 25, 2011 in U.S. Appl. No. 11/231,317.
Written Opinion, PCT Application No. PCT/US05/028607, mailed Mar. 31, 2006.
Written Opinion, PCT Application No. PCT/US2006/037602, mailed Sep. 28, 2006.
Written Opinion, PCT Application No. PCT/US07/060895, mailed Sep. 24, 2007.
Written Opinion, PCT Application No. PCT/US07/060963, mailed Jul. 24, 2008.
Written Opinion, PCT Application No. PCT/US2005/034302, mailed on May 8, 2006.
Written Opinion, PCT Application No. PCT/US2005/033994, mailed on Feb. 15, 2006.
Written Opinion, PCT Application No. PCT/US2005/034177, mailed on Feb. 21, 2006.
Written Opinion, PCT Application No. PCT/US2005/034178, mailed on Feb. 1, 2006.
Written Opinion, PCT Application No. PCT/US2005/034449, mailed on Mar. 3, 2006.
International Preliminary Report on Patentability, PCT/US2007/060895, mailed Aug. 7, 2008, Issued Jul. 29, 2008, 5 pgs.
International Preliminary Report on Patentability, PCT/US2007/060963, mailed Aug. 7, 2008, Issued Jul. 29, 2008, 5 pgs.
International Preliminary Report on patentability, PCT/US05/028606, issued Apr. 3, 2007.
International Search Report, PCT/US2005/028607, mailed Mar. 31, 2006.
International Search Report, PCT/US2006/037602, mailed May 31, 2007.
International Search Report, PCT/US05/028606, mailed Feb. 24, 2006, 5 pgs.
International Search Report, PCT/US2005/034177, mailed on Feb. 21, 2006.
International Search Report, PCT/US2005/034302, mailed on May 8, 2006.
International Search Report, PCT/US2005/034449, mailed on Mar. 3, 2006.

* cited by examiner

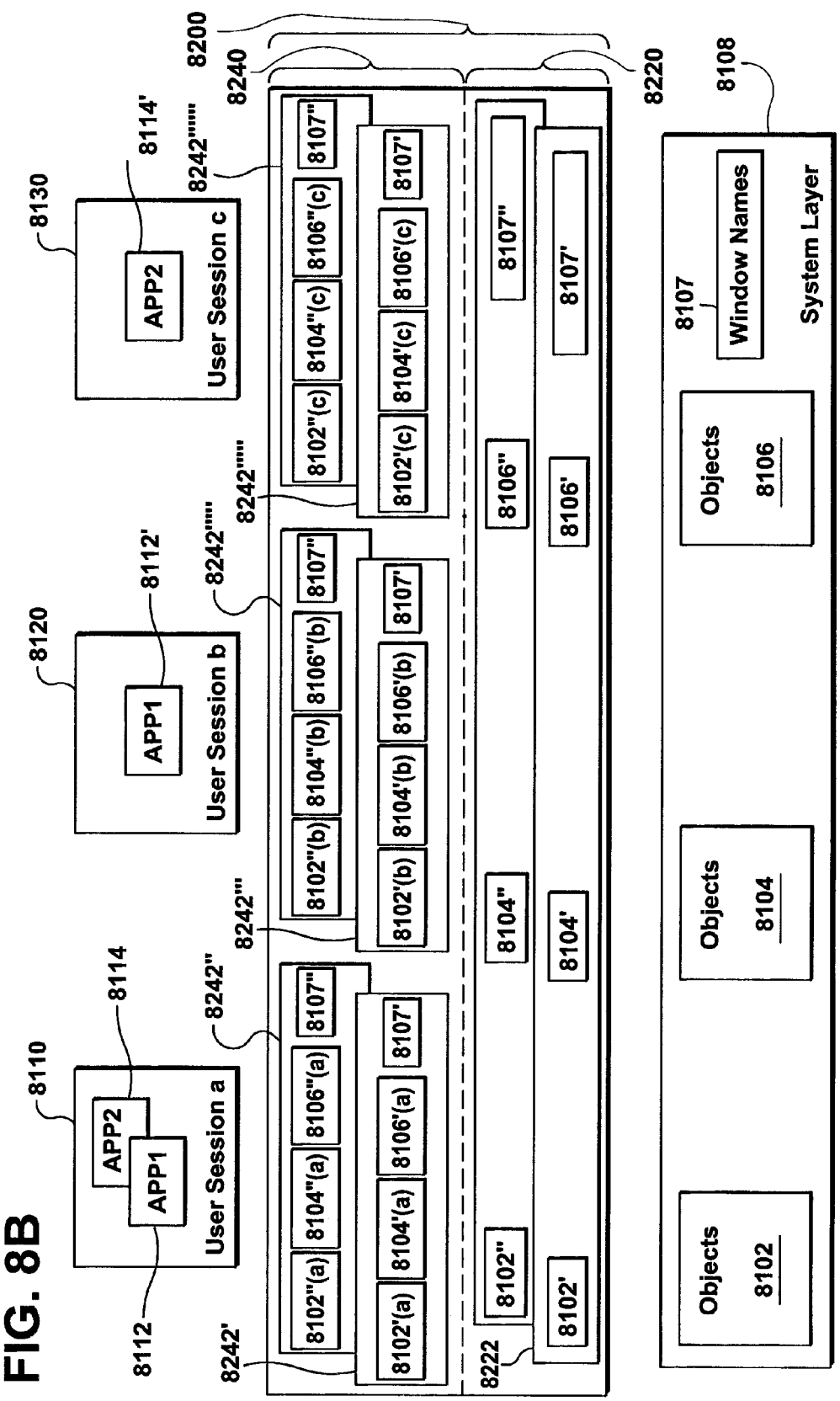

METHODS AND SYSTEMS FOR LAUNCHING APPLICATIONS INTO EXISTING ISOLATION ENVIRONMENTS

FIELD OF THE INVENTION

This invention relates generally to remotely executing applications on a computing machine. More specifically, this invention relates to remotely executing applications in isolation environments on a computing machine.

BACKGROUND OF THE INVENTION

There currently exist methods for isolating applications within isolation environments and according to an application profile, a user session or another parameter that can be used to isolate applications. When an application executes within an isolation environment, typically that application cannot communicate with other applications not executing within the isolation environment. Permitting an isolated application to communicate with an application outside of the isolation environment may require an administrator to package the isolated application and the other application into a larger single isolation image or profile.

Creating an isolation environment requires creating an image of disk data, communicating that image to a kernel mode component and to user mode components. This process can take a great deal of time and require many resources. In particular, creating an image of disk data requires parsing data structures on a disk, a process that becomes increasingly more resource intensive as the number of profiles executing on a disk increases. Thus, creating a larger single isolation image or profile each time an application wishes to communicate with another application that does not reside in the application's isolation environment, can be time and resource intensive. Methods and systems are therefore needed that permit applications executing in different isolation environments to talk with one another without requiring the creation of a separate isolation image or profile.

SUMMARY OF THE INVENTION

In its broadest interpretation, this disclosure describes methods and systems for launching an application into an existing isolation environment. Launching applications into an environment where application sociability and compatibility can present problems, often requires executing the application within an isolation environment or within an isolation scope within an isolation environment. Creating an isolation environment can be a time consuming and resource intensive process, therefore systems and methods are needed to decrease the amount of time and resources required to launch an application into an isolation environment. Implementing methods and systems that identify a pre-existing isolation environment associated with an application and launch the application into that pre-existing isolation environment can both reduce the amount of time and the amount of resources needed to launch the application into an isolation environment.

In one aspect, described herein is a method for launching applications into existing isolation environments. The method can be carried out in part by a run module executing on a computing machine in communication with a client computing machine. The run module receives a request to execute an application on the computing machine; the request generated by a user of the client. The run module identifies a profile associated with the requested application and queries an application delivery service executing on the computing machine to identify at least one isolation environment corresponding to the profile. Upon querying the application delivery service, the run module receives from the application delivery service a response that identifies a first isolation environment associated with the application. The run module, upon obtaining information about the first isolation environment, issues a command to a launch module executing on the computing machine to launch the application in the first isolation environment.

In one embodiment, the run module receives an identifier, from the application delivery service, associated with the first isolation environment. The received identifier can in some embodiments be a name of a first isolation environment. In some embodiments, the run module responds to receiving the first isolation environment identifier by querying a runtime object table for an address of the first isolation environment, wherein the run module queries the runtime object table using the first isolation environment identifier.

The first isolation environment, in some embodiments, exposes a communication interface for communicating with components executing on the computing machine, the communication interface generated by an inter-process mechanism. Commanding the launch module to launch the application can further comprise transmitting a location of the application to the exposed communication interface.

In one embodiment, identifying a first isolation environment further comprises identifying an address associated with the first isolation environment. The first isolation environment address can in some embodiments comprise a profile version associated with the first isolation environment and in other embodiments can comprise a user session identifier associated with the first isolation environment.

In one embodiment, the method can comprise failing to identify an isolation environment corresponding to the profile and launching, by the run module responsive to failing to identify an isolation environment, a lunch module in a suspended mode. The run module then issues a command to the application delivery service to isolate the launch module, sends application information to the launch module, and issues a command to the launch module to resume execution.

In one aspect the method can be carried out by a system comprising a computing machine communicating with a client generating a request to execute an application on the computing machine, the application associated with a profile. The system further comprises an application delivery service, launch module and run module executing on the computing machine. The run module receives the client request and queries the application delivery service to identify at least one isolation environment corresponding to the profile. Upon querying the application delivery service, the run module receives from the application delivery service a response identifying a first isolation environment associated with the application, and issues a command to the launch module to launch the application into the first isolation environment.

In other aspects, the methods and systems can be carried out by a computer readable medium having instructions executable by a processor to launch applications into existing isolation environments.

BRIEF DESCRIPTION OF THE DRAWINGS

The following figures depict certain illustrative embodiments of methods and systems for launching applications into existing isolation environments, where like reference numerals refer to like elements. Each depicted embodiment is illustrative of these methods and systems and not limiting.

FIG. 8B is a block diagram depicting a multi-user computer having reduced application compatibility and application sociability problems.

DETAILED DESCRIPTION

Figure 1A:
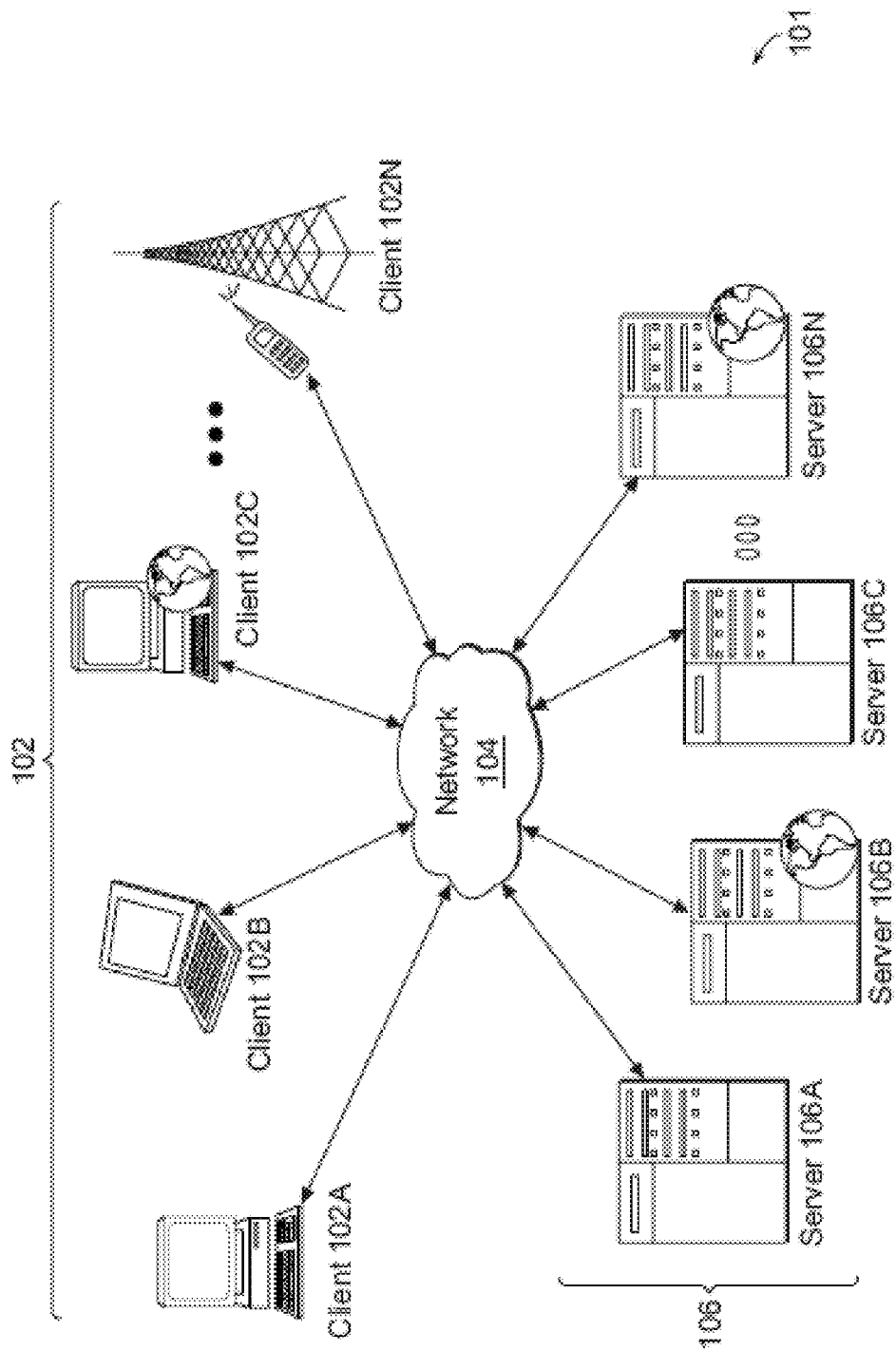
FIG. 1A is a block diagram illustrative of an embodiment of a remote-access, networked environment with a client machine that communicates with a server.

FIG. 1A illustrates one embodiment of a computing environment 101 that includes one or more client machines 102A-102N in communication with servers 106A-106N, and a network 104 installed in between the client machines 102A-102N and the servers 106A-106N. In some embodiments, client machines 102A-10N may be referred to as a single client machine 102 or a single group of client machines 102, while servers may be referred to as a single server 106 or a single group of servers 106. One embodiment includes a single client machine 102 communicating with more than one server 106, another embodiment includes a single server 106 communicating with more than one client machine 102, while another embodiment includes a single client machine 102 communicating with a single server 106.

A client machine 102 within the computing environment may in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106 in some embodiments may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other type and/or form of executable instructions capable of executing on client machine 102. Still other embodiments may include a computing environment 101 with an application that is any of either server-based or remote-based, and an application that is executed on the server 106 on behalf of the client machine 102. Further embodiments of the computing environment 101 include a server 106 configured to display output graphical data to a client machine 102 using a thin-client or remote-display protocol, where the protocol used can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

In one embodiment, the client machine 102 can be a virtual machine 102C such as those manufactured by XenSolutions, Citrix Systems, IBM, VMware, or any other virtual machine able to implement the methods and systems described herein.

The computing environment 101 can, in some embodiments, include more than one server 106A-106N where the servers 106A-106N are: grouped together as a single server 106 entity, logically-grouped together in a server farm 106; geographically dispersed and logically grouped together in a server farm 106, located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity or in other embodiments may include multiple server farms 106. The computing environment 101 can include more than one server 106A-106N grouped together in a single server farm 106 where the server farm 106 is heterogeneous such that one server 106A-106N is configured to operate according to a first type of operating system platform (e.g., WINDOWS NT, manufactured by Microsoft Corp. of Redmond, Wash.), while one or more other servers 106A-106N are configured to operate according to a second type of operating system platform (e.g., Unix or Linux); more than one server 106A-106N is configured to operate according to a first type of operating system platform (e.g., WINDOWS NT), while another server 106A-106N is configured to operate according to a second type of operating system platform (e.g., Unix or Linux); or more than one server 106A-106N is configured to operate according to a first type of operating system platform (e.g., WINDOWS NT) while more than one of the other servers 106A-106N are configured to operate according to a second type of operating system platform (e.g., Unix or Linux).

The computing environment 101 can in some embodiments include a server 106 or more than one server 106 configured to provide the functionality of any one of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 configured to operate as an active direction; a server 106 configured to operate as application acceleration application that provides firewall functionality, application functionality, or load balancing functionality, or other type of computing machine configured to operate as a server 106. In some embodiments, a server 106 may include a remote authentication dial-in user service such that the server 106 is a RADIUS server. Embodiments of the computing environment 101 where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a server 106 with the following functionality: a first server 106A that receives requests from a client machine 102, forwards the request to a second server 106B, and responds to the request generated by the client machine with a response from the second server 106B; acquires an enumeration of applications available to the client machines 102 and address information associated with a server 106 hosting an application identified by the enumeration of applications; presents responses to client requests using a web interface; communicates directly with the client 102 to provide the client 102 with access to an identified application; receives output data, such as display data, generated by an execution of an identified application on the server 106.

The server 106 can be configured to execute any one of the following applications: an application providing a thin-client computing or a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 configured to execute an application so that the server may function as an application server such as any one of the following application server types: an email server that provides email services such as MICROSOFT EXCHANGE manufactured by the Microsoft Corporation; a web or Internet server; a desktop sharing server; or a collaboration server. Still other embodiments include a server 106 that executes an application that is any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

In one embodiment, the server 106 may be a virtual machine 106B such as those manufactured by Citrix Systems, IBM, VMware, or any other virtual machine able to implement the methods and systems described herein.

Client machines 102 may function, in some embodiments, as a client node seeking access to resources provided by a server 106, or as a server 106 providing other clients 102A-102N with access to hosted resources. One embodiment of the computing environment 101 includes a server 106 that provides the functionality of a master node. Communication between the client machine 102 and either a server 106 or servers 106A-106N can be established via any of the following methods: direct communication between a client machine 102 and a server 106A-106N in a server farm 106; a client machine 102 that uses a program neighborhood application to communicate with a server 106a-106n in a server farm 106; or a client machine 102 that uses a network 104 to communicate with a server 106A-106N in a server farm 106. One embodiment of the computing environment 101 includes a client machine 102 that uses a network 104 to request that applications hosted by a server 106A-106N in a server farm 106 execute, and uses the network 104 to receive from the server 106A-106N graphical display output representative of the application execution. In other embodiments, a master node provides the functionality required to identify and provide address information associated with a server 106 hosting a requested application. Still other embodiments include a master node that can be any one of the following: a server 106A-106N within the server farm 106; a remote computing machine connected to the server farm 106 but not included within the server farm 106; a remote computing machine connected to a client 102 but not included within a group of client machines 102; or a client machine 102.

The network 104 between the client machine 102 and the server 106 is a connection over which data is transferred between the client machine 102 and the server 106. Although the illustration in FIG. 1A depicts a network 104 connecting the client machines 102 to the servers 106, other embodiments include a computing environment 101 with client machines 102 installed on the same network as the servers 106. Other embodiments can include a computing environment 101 with a network 104 that can be any of the following: a local-area network (LAN); a metropolitan area network (MAN); a wide area network (WAN); a primary network 104 comprised of multiple sub-networks 104' located between the client machines 102 and the servers 106; a primary public network 104 with a private sub-network 104'; a primary private network 104 with a public sub-network 104'; or a primary private network 104 with a private sub-network 104'. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; a network 104 that includes a wireless link where the wireless link can be an infrared channel or satellite band; or any other network type able to transfer data from client machines 102 to servers 106 and vice versa to accomplish the methods and systems described herein. Network topology may differ within different embodiments, possible network topologies include: a bus network topology; a star network topology; a ring network topology; a repeater-based network topology; a tiered-star network topology; or any other network topology able transfer data from client machines 102 to servers 106, and vice versa, to accomplish the methods and systems described herein. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices to accomplish the systems and methods described herein.

Figure 1B:
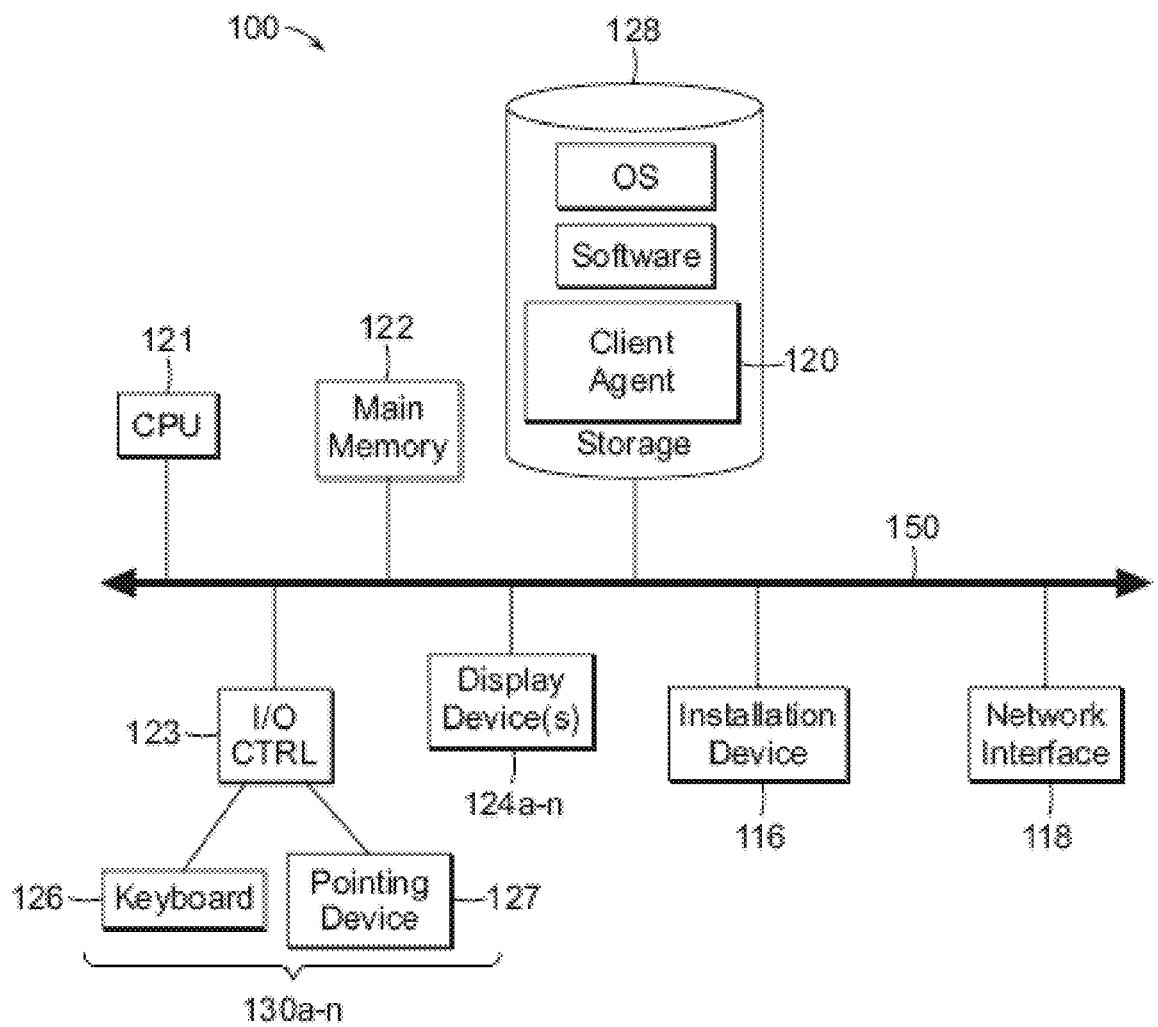
FIGS. 1B and 1C are block diagrams illustrative of an embodiment of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
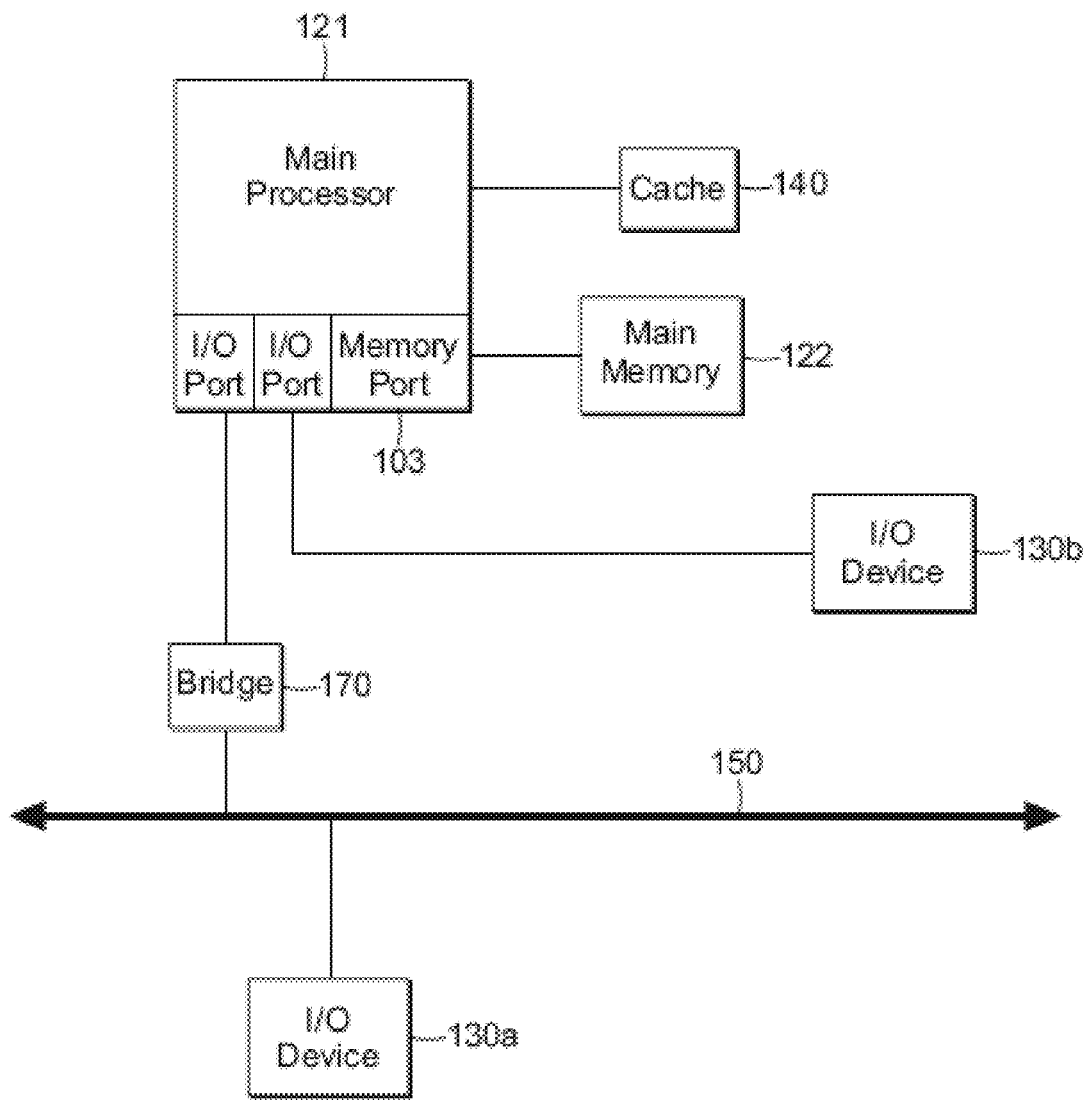

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other embodiments of the central processing unit 122 may include any combination of the following: a microprocessor, a microcontroller, a central processing unit with a single processing core, a central processing unit with two processing cores, or a central processing unit with more than one processing cores.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O devices 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121 via an Advanced Graphics Port (AGP). Still other versions of the computing machine 100 include a processor 121 connected to an I/O device 130A-130N via any one of the following connections: HyperTransport, Rapid I/O, or InfiniBand. Further embodiments of the computing machine 100 include a communication connection where the processor 121 communicates with one I/O device 130A using a local interconnect bus and with a second I/O device 130B using a direct connection.

Included within some embodiments of the computing device 100 is each of a main memory unit 122 and cache memory 140. The cache memory 140 will in some embodiments be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein. The main memory unit 122 and/or the cache memory 140 can in some embodiments include one or more memory devices capable of storing data and allowing any storage location to be directly accessed by the central processing unit 121. Further embodiments include a central processing unit 121 that can access the main memory 122 via one of either: a system bus 150; a memory port 103; or any other connection, bus or port that allows the processor 121 to access memory 122.

One embodiment of the computing device 100 provides support for any one of the following installation devices 116: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a harddrive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments of an I/O device 130 may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a Fibre-Channel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124a-124n. The computing device 100 may in some embodiments be configured to use one or multiple display devices 124A-124N, these configurations include: having multiple connectors to interface to multiple display devices 124a-124n; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments of the computing machine 100, an operating system may be included to control task scheduling and access to system resources. Embodiments of the computing device 100 can run any one of the following operation systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system capable of running on the computing device and performing the operations described herein. One embodiment of the computing machine 100 has multiple operating systems installed thereon.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. Still other embodiments of the computing environment 101 include a mobile computing device 100 that can be any one of the following: any one series of Blackberry, or other handheld device manufactured by Research In Motion Limited; the iPhone manufactured by Apple Computer; any handheld or smart phone; a Pocket PC; a Pocket PC Phone; or any other handheld mobile device supporting Microsoft Windows Mobile Software.

Figure 1D:
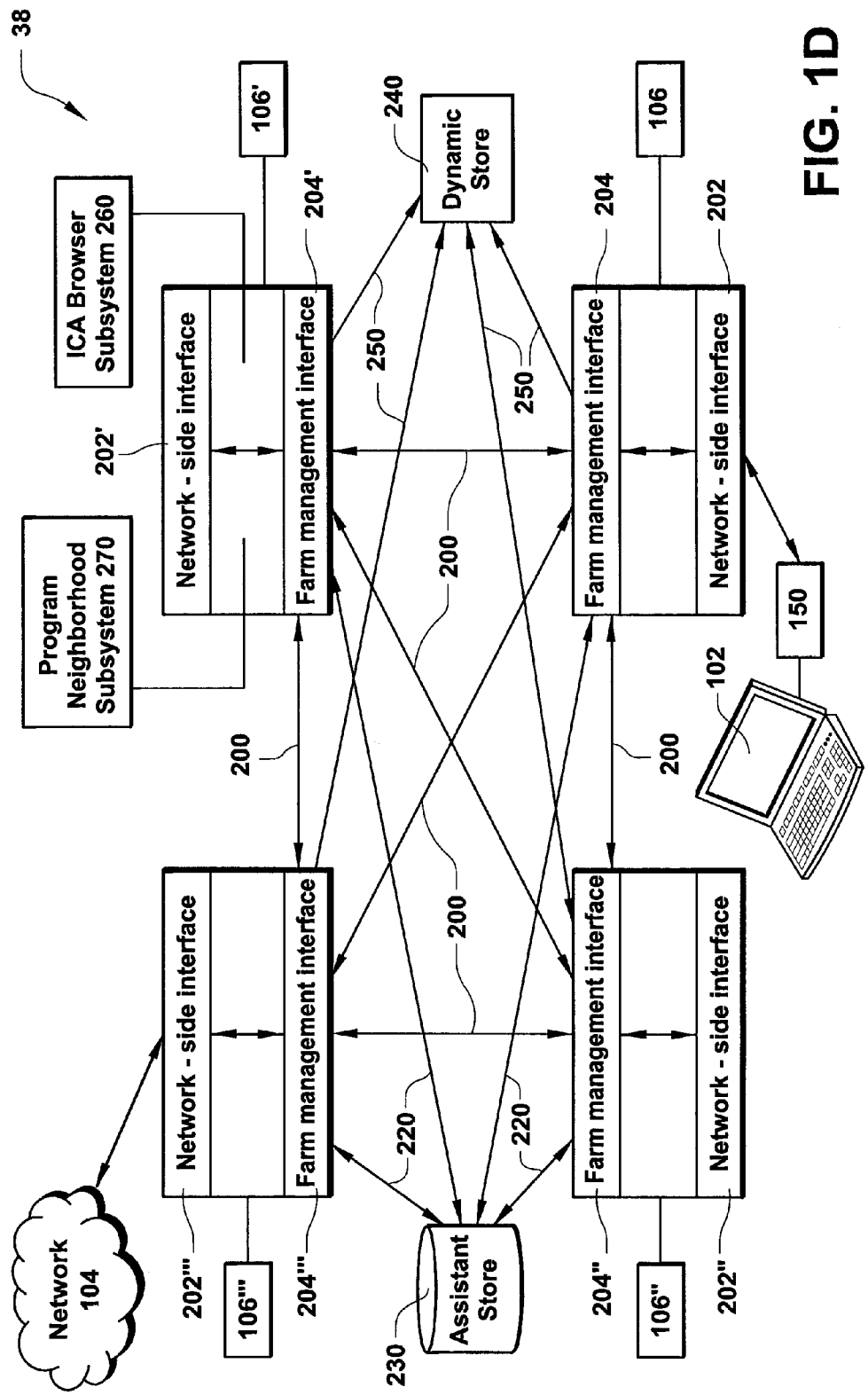
FIG. 1D is a block diagram depicting an embodiment of a server farm.

Referring now to FIG. 1D, together the servers 106 comprise a farm 38 or server farm, where each server 106 can include a network-side interface 202 and a farm-side interface 204. The network-side interface 202 can be in communication with one or more clients 102 or a network 104. The network 104 can be a WAN, LAN, or any other embodiment of a network such those networks described above.

Each server 106 has a farm-side interface 204 connected with one or more farm-side interface(s) 204 of other servers 106 in the farm 38. In one embodiment, each farm-side interface 204 is interconnected to other farm-side interfaces 204 such that the servers 106 within the farm 38 may communicate with one another. On each server 106, the farm-side interface 204 communicates with the network-side interface 202. The farm-side interfaces 204 can also communicate (designated by arrows 220) with a persistent store 230 and, in some embodiments, with a dynamic store 240. The combination of servers 106, the persistent store 230, and the dynamic store 240, when provided, are collectively referred to as a farm 38. In some embodiments, a server 106 communicates with the persistent store 230 and other servers 106' communicate with the server 106 to access information stored in the persistent store.

The persistent store 230 may be physically implemented on a disk, disk farm, a redundant array of independent disks (RAID), writeable compact disc, or any other device that allows data to be read and written and that maintains written data if power is removed from the storage device. A single physical device may provide storage for a plurality of persistent stores, i.e., a single physical device may be used to provide the persistent store 230 for more than one farm 38. The persistent store 230 maintains static data associated with each server 106 in farm 38 and global data used by all servers 106 within the farm 38. In one embodiment, the persistent store 230 may maintain the server data in a Lightweight Directory Access Protocol (LDAP) data model. In other embodiments, the persistent store 230 stores server data in an ODBC-compliant database. For the purposes of this description, the term "static data" refers to data that do not change frequently, i.e., data that change only on an hourly, daily, or weekly basis, or data that never change. Each server uses a persistent storage subsystem to read data from and write data to the persistent store 230.

The data stored by the persistent store 230 may be replicated for reliability purposes physically or logically. For example, physical redundancy may be provided using a set of redundant, mirrored disks, each providing a copy of the data. In other embodiments, the database itself may be replicated using standard database techniques to provide multiple copies of the database. In further embodiments, both physical and logical replication may be used concurrently.

The dynamic store 240 (i.e., the collection of all record tables) can be embodied in various ways. In one embodiment, the dynamic store 240 is centralized; that is, all runtime data are stored in the memory of one server 106 in the farm 38. That server operates as a master network node with which all other servers 106 in the farm 38 communicate when seeking access to that runtime data. In another embodiment, each server 106 in the farm 38 keeps a full copy of the dynamic store 240. Here, each server 106 communicates with every other server 106 to keep its copy of the dynamic store 240 up to date.

In another embodiment, each server 106 maintains its own runtime data and communicates with other servers 106 when seeking to obtain runtime data from them. Thus, for example, a server 106 attempting to find an application program requested by the client 102 may communicate directly with every other server 106 in the farm 38 to find one or more servers hosting the requested application.

For farms 38 having a large number of servers 106, the network traffic produced by these embodiments can become heavy. One embodiment alleviates heavy network traffic by designating a subset of the servers 106 in a farm 38, typically two or more, as "collector points." Generally, a collector point is a server that collects run-time data. Each collector point stores runtime data collected from certain other servers 106 in the farm 38. Each server 106 in the farm 38 is capable of operating as, and consequently is capable of being designated as, a collector point. In one embodiment, each collector point stores a copy of the entire dynamic store 240. In another embodiment, each collector point stores a portion of the dynamic store 240, i.e., it maintains runtime data of a particular data type. The type of data stored by a server 106 may be predetermined according to one or more criteria. For example, servers 106 may store different types of data based on their boot order. Alternatively, the type of data stored by a server 106 may be configured by an administrator using an administration tool (Not Shown.) In these embodiments, the dynamic store 240 is distributed amongst two or more servers 106 in the farm 38.

Servers 106 not designated as collector points know the servers 106 in a farm 38 that are designated as collector points. A server 180 not designated as a collector point may communicate with a particular collector point when delivering and requesting runtime data. Consequently, collector points lighten network traffic because each server 106 in the farm 38 communicates with a single collector point server 106, rather than with every other server 106, when seeking to access the runtime data.

Each server 106 can operate as a collector point for more than one type of data. For example, server 106" can operate as a collector point for licensing information and for loading information. In these embodiments, each collector point may amass a different type of run-time data. For example, to illustrate this case, the server 106''' can collect licensing information, while the server 106" collects loading information.

In some embodiments, each collector point stores data that is shared between all servers 106 in a farm 38. In these embodiments, each collector point of a particular type of data exchanges the data collected by that collector point with every other collector point for that type of data in the farm 38. Thus, upon completion of the exchange of such data, each collector point 106" and 106 possesses the same data. Also in these embodiments, each collector point 106 and 106" also keeps every other collector point abreast of any updates to the runtime data.

Browsing enables a client 102 to view farms 38, servers 106, and applications in the farms 38 and to access available information such as sessions throughout the farm 38. Each server 106 includes an ICA browsing subsystem 260 to provide the client 102 with browsing capability. After the client 102 establishes a connection with the ICA browser subsystem 260 of any of the servers 106, that browser subsystem supports a variety of client requests. Such client requests include: (1) enumerating names of servers in the farm, (2) enumerating names of applications published in the farm, (3) resolving a server name and/or application name to a server address that is useful the client 102. The ICA browser subsystem 260 also supports requests made by clients 10 running a program neighborhood application that provides the client 102, upon request, with a view of those applications within the farm 38 for which the user is authorized. The ICA browser subsystem 260 forwards all of the above-mentioned client requests to the appropriate subsystem in the server 106.

In one embodiment, each server 106 in the farm 38 that has a program neighborhood subsystem 270 can provide the user of a client 102 with a view of applications within the farm 38. The program neighborhood subsystem 270 may limit the view to those applications for which the user of the client 102 has authorization to access. Typically, this program neighborhood service presents the applications to the user as a list or a group of icons.

The functionality provided by the program neighborhood subsystem 270 can be available to two types of clients, (1) program neighborhood-enabled clients that can access the functionality directly from a client desktop, and (2) non-program neighborhood-enabled clients (e.g., legacy clients) that can access the functionality by running a program neighborhood-enabled desktop on the server.

Communication between a program neighborhood-enabled client and the program neighborhood subsystem 270 may occur over a dedicated virtual channel that is established on top of an ICA virtual channel. In other embodiments, the communication occurs using an XML service. In one of these embodiments, the program neighborhood-enabled client communicates with an XML subsystem, such as the XML service 516 described in connection with FIG. 6 below, providing program neighborhood functionality on a server 106.

In one embodiment, the program neighborhood-enabled client does not have a connection with the server with a program neighborhood subsystem 270. For this embodiment, the client 102 sends a request to the ICA browser subsystem 260 to establish an ICA connection to the server 106 in order to identify applications available to the client 102. The client 102 then runs a client-side dialog that acquires the credentials of a user. The credentials are received by the ICA browser subsystem 260 and sent to the program neighborhood subsystem 270. In one embodiment, the program neighborhood subsystem 270 sends the credentials to a user management subsystem for authentication. The user management subsystem may return a set of distinguished names representing the list of accounts to which the user belongs. Upon authentication, the program neighborhood subsystem 270 establishes the program neighborhood virtual channel. This channel remains open until the application filtering is complete.

The program neighborhood subsystem 270 then requests the program neighborhood information from the common application subsystem 524 associated with those accounts. The common application subsystem 524 obtains the program neighborhood information from the persistent store 230. On receiving the program neighborhood information, the program neighborhood subsystem 270 formats and returns the program neighborhood information to the client over the program neighborhood virtual channel. Then the partial ICA connection is closed.

For another example in which the program neighborhood-enabled client establishes a partial ICA connection with a server, consider the user of the client 102 who selects a farm 38. The selection of the farm 38 sends a request from the client 102 to the ICA browser subsystem 260 to establish an ICA connection with one of the servers 106 in the selected farm 38. The ICA browser subsystem 260 sends the request to the program neighborhood subsystem 270, which selects a server 106 in the farm 38. Address information associated with the server 106 is identified and returned to the client 102 by way of the ICA browser subsystem 260. The client 102 can then subsequently connect to the server 106 corresponding to the received address information.

In another embodiment, the program neighborhood-enabled client 102 establishes an ICA connection upon which the program neighborhood-virtual channel is established and remains open for as long as the ICA connection persists. Over this program neighborhood virtual channel, the program neighborhood subsystem 270 pushes program neighborhood information updates to the client 102. To obtain updates, the program neighborhood subsystem 270 subscribes to events from the common application subsystem 524 to allow the program neighborhood subsystem 270 to detect changes to published applications.

Figure 1E:
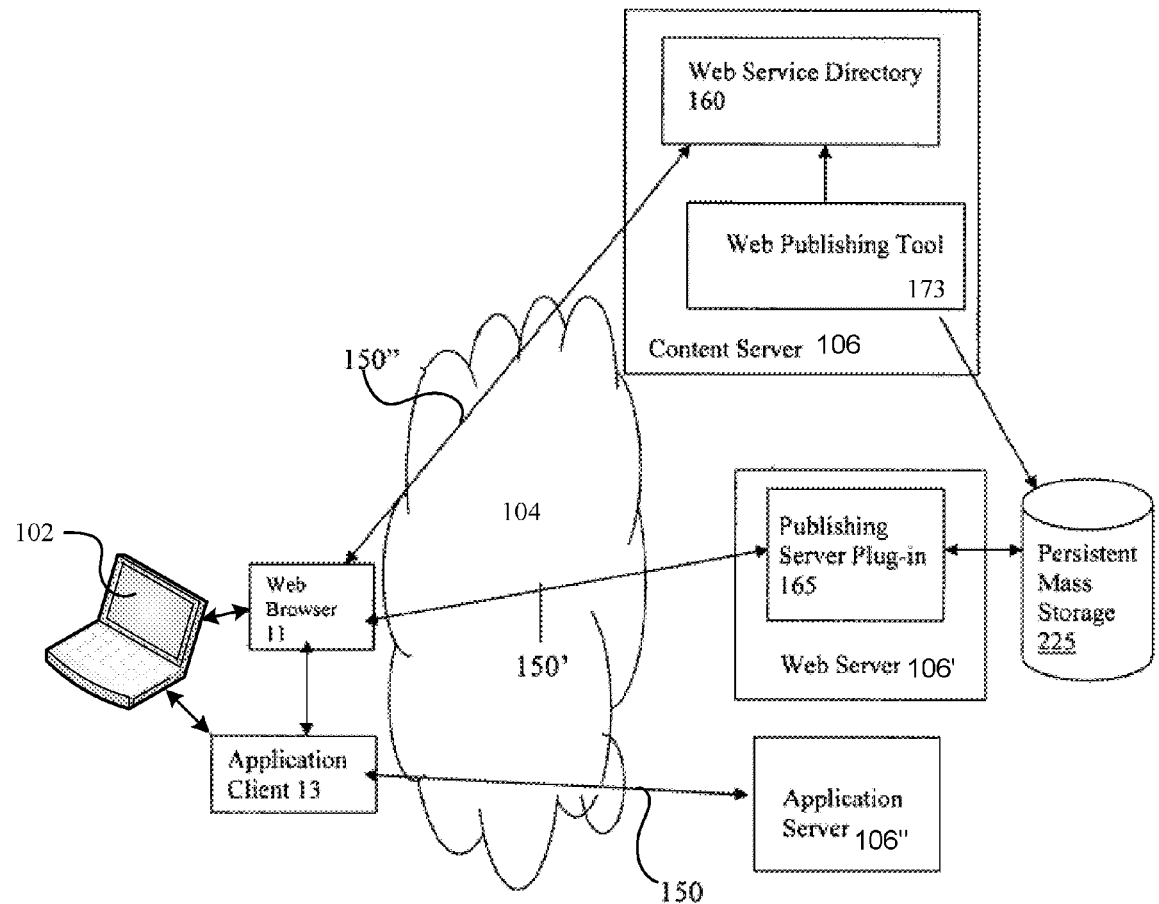
FIG. 1E is a block diagram depicting one embodiment of a system for providing a plurality of application programs available to the client via publishing of GUIs in a web service directory.

Referring to FIG. 1E, a block diagram depicts another embodiment of a system architecture for providing a plurality of application programs available to the client via publishing of GUIs in a web service directory. The system includes the client 102, and a plurality of servers 106. A first server 106 functions as a content server. A second server 106' provides web server functionality, and a third server 106" provides functionality for providing access to application files and acts as an application server or a file server. The client 102 can download content from the content server 106, the web server 106', and the application server 106" over the network 104. In one embodiment, the client 102 can download content (e.g., an application) from the application server 106" over the client-application server communication channel 150.

In one embodiment, the web browser 11 on the client 102 uses Secure Socket Layer (SSL) support for communications to the content server 106 and/or the web server 106'. SSL is a secure protocol developed by Netscape Communication Corporation of Mountain View, Calif., and is now a standard promulgated by the Internet Engineering Task Force (IETF). The web browser 11 can alternatively connect to the content server 106 and/or the web server 106' using other security protocols, such as, but not limited to, Secure Hypertext Transfer Protocol (SHTTP) developed by Terisa Systems of Los Altos, Calif., HTTP over SSL (HTTPS), Private Communication Technology (PCT) developed by Microsoft Corporation of Redmond, Wash., and the Transport Level Security (TLS) standard promulgated by the IETF. In other embodiments, the web browser 11 communicates with the servers 106 using a communications protocol without encryption, such as the HyperText Transfer Protocol (HTTP).

The client 102 can additionally include an application client 13 for establishing and exchanging communications with the application server 106" over the client-application server communication channel 150. In one embodiment, the application client 13 is a GUI application. In some embodiments, the application client 13 is an Independent Computing Architecture (ICA) client, developed by Citrix Systems, Inc. of Fort Lauderdale, Fla., and is also referred to below as ICA client 13. Other embodiments of the application client 13 include a Remote Display Protocol (RDP) client, developed by Microsoft Corporation of Redmond, Wash., an X-Windows client 13, a client-side player, interpreter or simulator capable of executing multimedia applications, email, Java, or .NET code. Moreover, in one embodiment the output of an application executing on the application server 106" can be displayed at the client 102 via the ICA client 13. In some embodiments, the application client 13 is an application client such as the application streaming client 552, described in greater detail in connection with FIG. 5.

The client 102 searches the web service directory 160 for a web service. In one embodiment, the search is a manual search. Alternatively, the search is an automatic search. The web service directory 160 may also provide a service based view, such as white and yellow pages, to search for web services in the web service directory. In another embodiment, the web service directory 160 supports a hierarchical browsing based on a structured service name and service kind for GUI applications. In one embodiment, the web service directory 160 executes on a server independent of the content server 106, such as a directory server. In other embodiments, the web service directory 160 executes on multiple servers.

In some embodiments, the content server 106 enables the client 102 to select web services based on additional analysis or information by providing this information or analysis in the web service directory 160. Examples of service information that the web service directory 160 can list includes, but is not limited to, the name of the business offering the service, the service type, a textual description of the service, one or more service access points (SAPs), the network type, the path to use (e.g., TCP or HTTPS), and quality of service (QoS) information. Moreover, service information can be client device type or user (e.g., role) specific. Thus, service selection can be based on one or more of the above attributes.

In one embodiment, the service type denotes a programming interface that the client 102 must use to access the web service. For instance, the service type can state that the service is encoded by an interface description language, such as Web Services Description Language (WSDL).

The service access point, or SAP, is a unique address for an application. The SAPs enable the computer system to support multiple applications at the client 102 and each server 106. For example, the application server 106" may support an electronic mail (i.e., e-mail) application, a file transfer application, and/or a GUI application. In one embodiment, these applications would each have a SAP that is unique within the application server 106". In one embodiment, the SAP is a web or Internet address (e.g., Domain Name System (DNS) name, IP/port, or Uniform Resource Locator (URL)). Thus, in one embodiment the SAP identifies the address of the web server 106' as part of the address for an application stored on the web server 106'. In some embodiments, the SAP identifies the address of a publishing server plug-in 165 as part of the address for an application stored on the web server 106', as described below. In one embodiment, the SAP is an "accesPoint" from the UDDI registry.

To prepare an item for publishing in the web service directory 160, the content server 106 includes a web publishing tool 170. In one embodiment, the web publishing tool 173 is a software module. Alternatively, the web publishing tool 173 is another server that may be externally located from or internally located in the content server 106.

In one embodiment, the web server 106' delivers web pages to the client 102. The web server 106' can be any server 106 capable of providing web pages to the client 102. In another embodiment, the web server 106' is an Enterprise Information Portal (e.g., corporate Intranet or secured business-to-business extranet). Enterprise portals are company web sites that aggregate, personalize and serve applications, data and content to users, while offering management tools for organizing and using information more efficiently. In some companies, portals have replaced traditional desktop software with browser-based access to a virtual workplace.

The web server 106' can also include a publishing server plug-in 165 to enable the publishing of graphical user interface (GUI) applications. More specifically, the publishing server plug-in 165 translates a new web service entry URL into a GUI application service so that the GUI can be accessed via the web service directory 160. In one embodiment, the publishing server plug-in 165 is a Common Gateway Interface (CGI) script, which is a program designed to accept and return data that conforms to the CGI specification. The program can be written in any programming language, such as C, Perl, Java, or Visual Basic. In another embodiment, the publishing server plug-in 165 is a Java Server Page (JSP). Using the publishing server plug-in 165 to facilitate the publishing of remote GUI applications, the client 102 can thereby access the web service, not through a programming interface or a web page, but through a full GUI interface, such as with Citrix's ICA or Microsoft's RDP.

The application server 106" hosts one or more applications that are available for the client 102. Examples of such applications include word processing programs such as MICROSOFT WORD and spreadsheet programs such as MICROSOFT EXCEL, both manufactured by Microsoft Corporation of Redmond, Wash., financial reporting programs, customer registration programs, programs providing technical support information, customer database applications, or application set managers.

In some embodiments, one or more communication links 150 are established over different networks. For example, the client-content server communication channel 150' can belong to a first network (e.g., the World Wide Web) and the client-web server communication channel 150" can belong to a second network (e.g., a secured extranet or Virtual Private Network (VPN)).

In one embodiment, the web publishing tool 173 stores information about an application that the web publishing tool 173 is currently publishing in the web service directory 160 in a persistent mass storage 225. In one embodiment the information is a URL for the dynamic publishing server plug-in 165. The persistent mass storage 225 may be a magnetic disk or magneto-optical drive. In one embodiment, the persistent mass storage 225 is a database server, which stores data related to the published application in one or more local service databases. The persistent mass storage 225 may be a component internally located in or externally located from any or all of the servers 106.

In other embodiments, the content server 106 or the web server 106' communicate with a server 106 in the farm 38 to retrieve the list of applications. In one of these embodiments, the content server 106 or the web server 106' communicate with the farm 38 instead of with the persistent mass storage 225.

Figure 2:
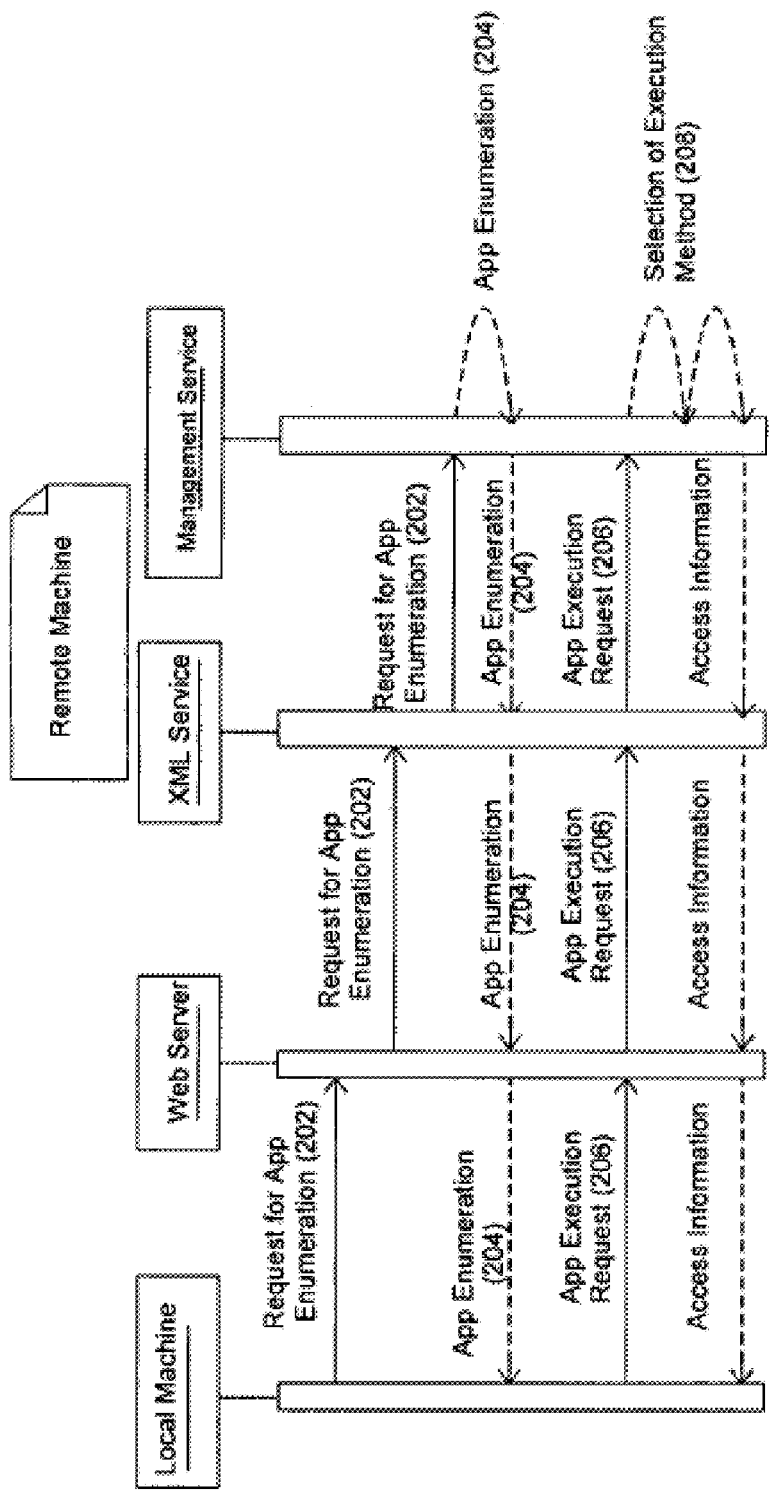
FIG. 2 is a flow diagram depicting one embodiment of the steps taken to select a method of execution of an application program.

Referring now to FIG. 2, a flow diagram depicts one embodiment of the steps taken to select a method of execution of an application program. In brief overview, credentials associated with the client or with a user of the client are received, with a request for an enumeration of applications available for execution by the client (step 202). An enumeration of a plurality of application programs available to the client is provided, responsive to the received credentials (step 204). A request is received to execute an enumerated application (step 206). One of a predetermined number of methods for executing the enumerated application is selected, responsive to a policy, the predetermined number of methods including a method for application streaming of the enumerated application (step 208).

Credentials associated with the client or with a user of the client are received, with a request for an enumeration of applications available for execution by the client (step 202). In one embodiment, the server receives a request for enumeration of available applications from the client 102 with the credentials. In another embodiment, an XML service on the server 106 receives the request and the credentials and transmits the request and credentials to a management service on the server 106.

In some embodiments, a server 106 functioning as a web server receives communications from the client 102 and forwards the communications to a server 106'. In one of these embodiments, the web server forwards the communications to an XML service on the server 106'. In another of these embodiments, the web server resides on the client. In other embodiments where communications from the client 102 are routed to a server 106' by the web server, the server 106 may be selected responsive to an Internet Protocol (IP) address of the client 102.

In some embodiments, a client 102 requests access to an application residing on a server 106. In one of these embodiments, the client 102 requests execution by the server 106 of the application residing on the server 106. In another of these embodiments, the client 102 requests retrieval of a plurality of application files that comprise the application.

In some embodiments, the user provides credentials to the server 106 via a graphical user interface presented to the client 102 by the server 106. In other embodiments, a server 106''' having the functionality of a web server provides the graphical user interface to the client 102. In still other embodiments, a collection agent transmitted to the client 102 by the server 106 gathers the credentials from the client 102. In one embodiment, a credential refers to a username and password. In another embodiment, a credential is not limited to a username and password but includes, without limitation, a machine ID of the client 102, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information such as internet protocol address or range of addresses, machine ID of the server 106, date or time of access request including adjustments for varying time zones, and authorization credentials.

In some embodiments, a credential associated with a client is associated with a user of the client. In one of these embodiments, the credential is information possessed by the user. In another of these embodiments, the credential is user authentication information. In other embodiments, a credential associated with a client is associated with a network. In one of these embodiments, the credential is information associated with a network to which the client may connect. In another of these embodiments, the credential is information associated with a network collecting information about the client. In still other embodiments, a credential associated with a client is a characteristic of the client.

An enumeration of a plurality of application programs available to the client is provided, responsive to the received credentials (step 204). In one embodiment, a user of a client 102 may learn of the availability of application programs hosted by the servers 106 on the network 104 without knowing where to find such applications and without technical information necessary to link to such applications. These available application programs can comprise the "program neighborhood" of the user. A system for determining a program neighborhood for a client may include an application program (hereafter referred to as the "Program Neighborhood" application), memory for storing components of the application program, and a processor for executing the application program. The Program Neighborhood (PN) application can be installed in the memory of the client 102 and/or on a server 106 as described below.

A server 106 operating according to the Program Neighborhood application collects application-related information from each of the servers 106 in a farm 38. The application-related information for each hosted application can be a variety of information including, for example, an address of the server hosting that application, the application name, the users or groups of users who are authorized to use that application, and the minimum capabilities required of the client 102 before establishing a connection to run the application. For example, the application may stream video data, and therefore a required minimum capability may be that the client supports video data. Other examples are requirements that the client support audio data or have the capacity to process encrypted data. The application-related information can be stored in a database.

When a client 102 connects to the network 104, the user of the client 102 provides user credentials. User credentials may include the username of a user of the client 102, the password of the user, and the domain name for which the user is authorized. Alternatively, the user credentials may be obtained from smart cards, time-based tokens, social security numbers, user passwords, personal identification (PIN) numbers, digital certificates based on symmetric key or elliptic curve cryptography, biometric characteristics of the user, or any other means by which the identification of the user of the client 102 can be obtained and submitted for authentication. The server 106 responding to the client 102 can authenticate the user based on the user credentials. The user credentials can be stored wherever the Program Neighborhood application is executing. For embodiments in which the client 102 executes the Program Neighborhood application, the user credentials may be stored at the client 102. For embodiments in which a server 106 executes the Program Neighborhood, the user credentials can be stored at that server 106.

From the user credentials and the application-related information, the server 106 can also determine which application programs hosted by servers 106 are available for use by the user of the client 102. The server 106 transmits information representing the available application programs to the client 102. This process eliminates the need for a user of the client 102 to establish application connections. Additionally, an administrator of the server 106 may control access to applications among multiple users of a client 102.

In some embodiments, the user authentication performed by the server 106 may suffice to authorize the user of each hosted application program presented to the client 102, although such applications may reside at another server 106'. Accordingly, when the client 102 launches (i.e., initiates execution of) one of the hosted applications, additional input of user credentials by the client 102 may be unnecessary to authenticate use of that application. Thus, a single entry of the user credentials may serve to determine the available applications and to authorize the launching of such applications without an additional, manual log-on authentication process by the user.

Either a client 102 or server 106 can launch the Program Neighborhood application. The results can be displayed on the display screen of the client 102. In a graphical windows-based implementation, the results can be displayed in a Program Neighborhood graphical window and each authorized application program can be represented by a graphical icon in that window.

In one embodiment, the Program Neighborhood application filters out application programs that the client 102 is unauthorized to execute and displays only authorized (i.e., available) programs. In other embodiments, the Program Neighborhood application can display authorized and unauthorized applications. When unauthorized applications are not filtered from the display, a notice can be provided indicating that such applications are unavailable. Alternatively, the Program Neighborhood application can report all applications hosted by the servers 106 to the user of a client 102 without identifying which applications the client 102 is authorized or unauthorized to execute. Authorization can be subsequently determined when the client 102 attempts to run one of those applications.

The client 102 may request application enumeration from a server 106. Application enumeration enables a user of the client 102 to view the names of every published application. In one embodiment, the user of the client 102 can view the application names regardless of whether the user has the authorization to execute the application. In another embodiment, the user views only those application names that the user is authorized to execute.

Requests for application enumeration pass to the ICA browser subsystem 260, to the program neighborhood subsystem 270, or to a common application subsystem 524, depending upon the particular process being run by the client 102. For example, when the client 102 runs the program neighborhood application, the requests for application enumeration are sent to the program neighborhood subsystem 270 on a server 106. When the client 102 submits the enumeration request through a web page, the requests pass to the common access point subsystem 524. For these embodiments, the common application subsystem 524 serves as an initial access point for the program neighborhood subsystem 270, ICA browser subsystem 260, and common application subsystems when the client 102 wants to enumerate applications. In some embodiments, when the client 102 submits the enumeration request through a web page, an intermediate server 106 hosting a web server receives the request and forwards the request to a server 106'.

Upon receiving the enumeration requests, a common application subsystem 524 queries the persistent store 230 for a list of all applications. For requests received from the program neighborhood subsystem 270 and common access point (Not Shown) subsystems, this list of applications is filtered according to the credentials of the user of the client 102 (i.e., the user views only those applications for which the user is authorized).

The client 102 can also request server enumeration. Server enumeration enables a user of the client 102 to view a list of servers in the farm 38. In one embodiment, the list of servers can be filtered according to the type of server, as determined by the specialized server subsystem on that server.

Requests for server enumeration pass to the ICA browser subsystem 260 or to the common access point subsystem (Not Shown), depending upon the particular process being run by the client 120. For example, when the client 120 submits the server enumeration request through a web page, the requests pass to the common access point subsystem (Not Shown). For these embodiments, the common server subsystem 300 serves as an initial access point for the ICA browser subsystem 260 and common access point (Not Shown) subsystems. Upon receiving the server enumeration requests, the common server subsystem queries the persistent store 230 for a list of all servers. Optionally, the list of servers is filtered according to the server type.

Figure 3A:
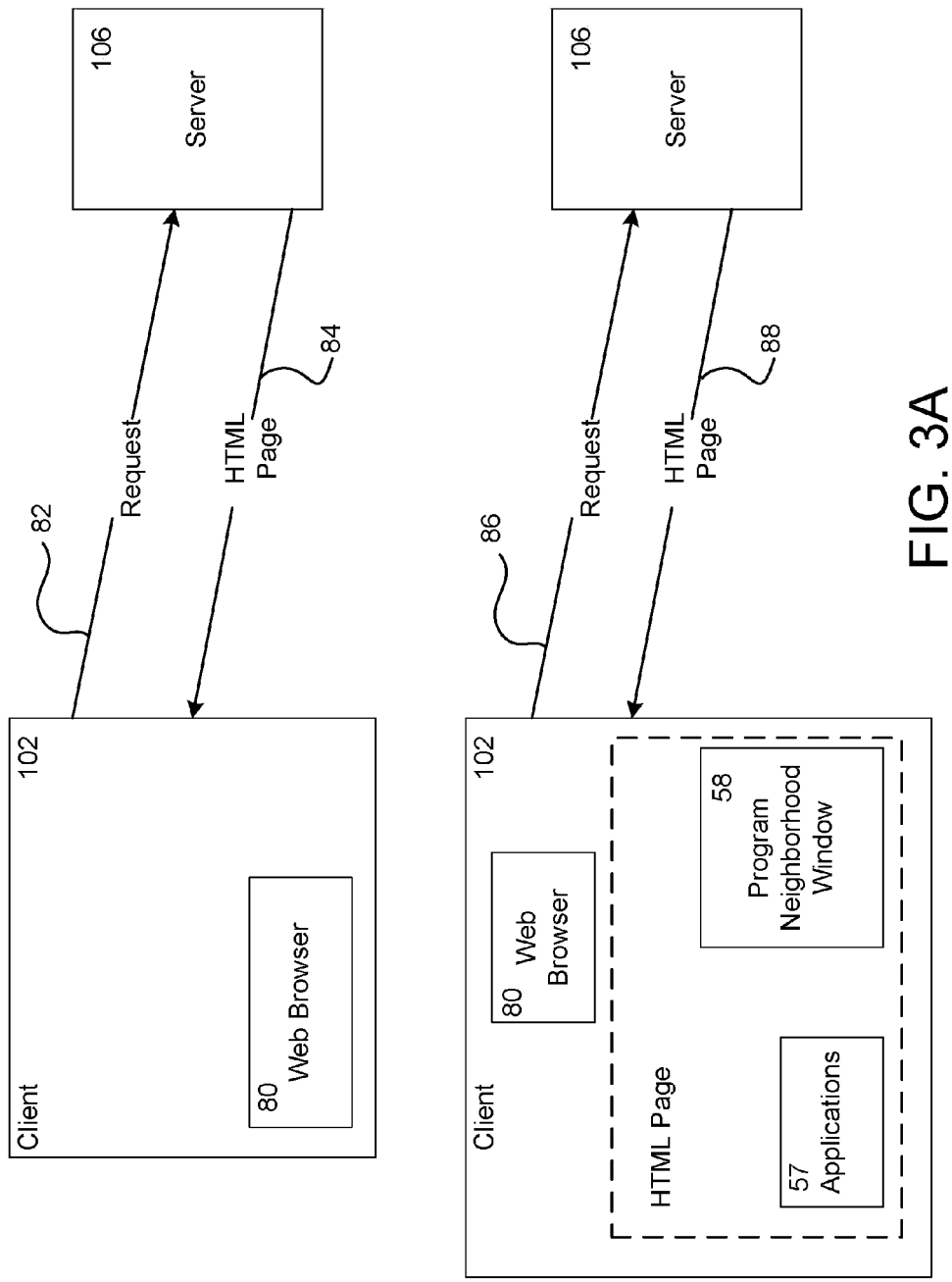
FIG. 3A is a block diagram depicting one embodiment of a client initiating execution of a Program Neighborhood application via the World Wide Web.

FIG. 3A depicts an embodiment of a block diagram that illustrates a process by which a client 102 initiates execution of the Program Neighborhood application, in this example via the World Wide Web. A client 102 executes a web browser application 80, such as NETSCAPE NAVIGATOR, manufactured by Netscape Communications, Inc. of Mountain View, Calif. or MICROSOFT INTERNET EXPLORER, manufactured by Microsoft Corporation of Redmond, Wash., or FIREFOX, manufactured by Mozilla Foundation of Mountain View, Calif., or OPERA, manufactured by Opera Software ASA, of Oslo, Norway, or SAFARI, manufactured by Apple Computer, Inc., of Cupertino, Calif.

The client 102, via the web browser 80, transmits a request 82 to access a Uniform Resource Locator (URL) address corresponding to an HTML page residing on server 106. In some embodiments the first HTML page returned 84 to the client 102 by the server 106 is an authentication page that seeks to identify the client 102.

Still referring to FIG. 3A, once the client 102 is authenticated by the server 106, the server 106 prepares and transmits to the client 102 an HTML page 88, in response to another Request 86, that includes a Program Neighborhood window 58 in which appears graphical icons 57 representing application programs to which the client 102 has access. A user of client 102 invokes execution of an application represented by icon 57 by clicking that icon 57.

In some embodiments, the server 106 executes the Program Neighborhood application on behalf of a user of the client 102. In one of these embodiments, the server 106 is an intermediate server residing between the client 102 and a server 106'.

Figure 3B:
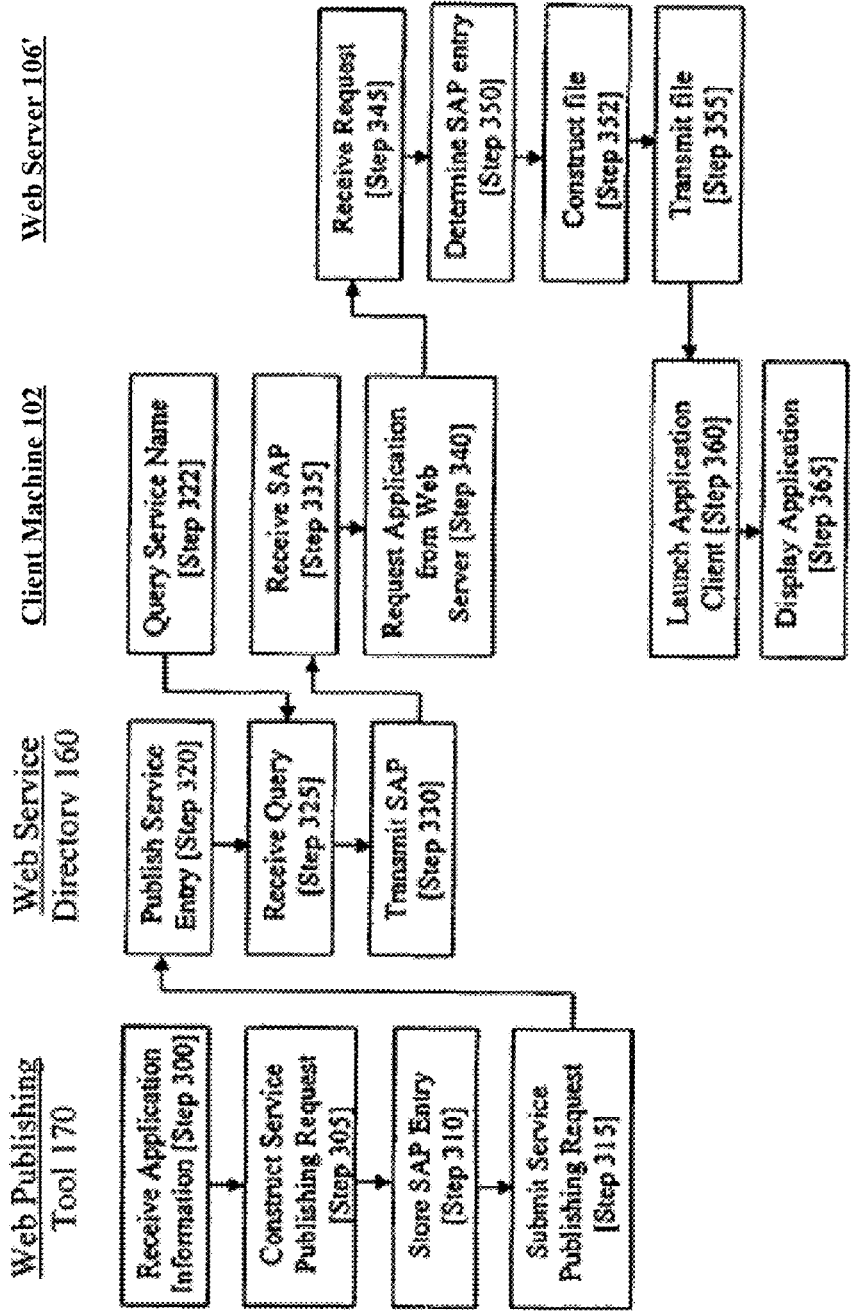
FIG. 3B is a flow diagram depicting one embodiment of the steps taken by a client to access an application program enumerated using a web service directory.

Referring to FIG. 3B, a flow diagram depicts one embodiment of the steps taken to provide a plurality of application programs available to the client via publishing of GUIs in a web service directory. The web publishing tool 173 receives a web service description and access information for an application (e.g., GUI application) for publishing (step 300). In one embodiment, the web service description includes the service information described above (e.g., the name of the business offering the web service, the service type, a textual description of the service, and a SAP). The access information may include, for example, a published application name, a Transmission Control Protocol (TCP) browsing server farm address, and a MetaFrame server IP address. In some embodiments, the access information specifies the address to use and a ticket to use to traverse network or security gateways or bridge devices.

The web publishing tool 173 then constructs a service-publishing request to request the publication of the web service (i.e., GUI application) (step 305). In one embodiment, the service-publishing request includes a SAP. In some embodiments, the SAP is a URL including the web address of the web server 106' and the publishing server plug-in 165. Further, the web address can be a Uniform Resource Identifier (URI), which is the generic term for the types of names and addresses that refer to objects on the web. A URL is one kind of URI. An example of the URI is the name of the web server 106' (e.g., "web-server") and the CGI script name (e.g., "dynamic-component") for the publishing server plug-in 165.

The web publishing tool 173 stores a SAP entry associated with the SAP in the persistent mass storage 225 (step 310). In some embodiments, the web publishing tool 173 also associates published application information (e.g., ICA-published-app-info) with the GUI application. In further embodiments, the web publishing tool 173 also includes a key in the service-publishing request to identify the SAP entry that the content server 106 stores in the persistent mass storage 225. For instance, the key can have the value of "123456677." An example of a SAP identifying the web server 106', the CGI script name of the publishing server plug-in 165, and the key described above is "http://web-server/dynamic-component/?app=123456677."

An example of the SAP entry associated with the SAP described above is "key=123456677, value=ICA-published-app-info." The key can be any length (e.g., 56 bit key, 128 bit key). In one embodiment, the key is a cryptographic random number. The key may also provides an access right to the key holder. Although illustrated with a key, any means can be used to provide a form of security to the SAP entry stored in the persistent mass storage 225.

The web publishing tool 173 provides the service-publishing request to the content server 106 for publishing in the web service directory 160 (step 315). Moreover, in one embodiment, the content server 106 transmits the key of the SAP to the client 102 requesting the particular web service for subsequent use in locating the SAP entry. In one embodiment, the publishing of the service-publishing request enables users of the client 102 to access the service. In one embodiment, GUI applications are published on the web service directory 160 using NFUSE developed by Citrix Systems, Inc. of Fort Lauderdale, Fla. In some embodiments, a publisher of a GUI application customizes the publication of the GUI application on the web service directory 160 using Application Launching And Embedding (ALE), also developed by Citrix Systems, Inc. ALE enables the launching of a GUI application from or the embedding of the application into an HTML page.

The client 102 then queries a service name from the web service directory 160 (step 320). The content server 106 receives the query from the client 102 (step 325) and finds the requested service name in the web service directory 160. In another embodiment, the user of the client 102 navigates the web service directory 160 until locating a particular service name that the user of the client 102 was attempting to find. Although illustrated with the client 102, any web service directory client (e.g., UDDI client or LDAP browser) can query or navigate the web service directory 160 to discover published web services.

Upon location of the SAP associated with the received query, the content server 106 transmits the SAP to the client 102 (step 330). The client 102 receives the SAP (step 335) and determines the address of the publishing server plug-in 165 from the SAP. The client 102 subsequently transmits a request for the GUI application to the web server 106' (step 340). In some embodiments, the request from the client 102 is an HTTP request transmitted from the web browser 11 to the web server 106'. In other embodiments, an application (e.g., general directory browser or HTML UI) executing on the client 102 receives the SAP from the content server 106 and provides the SAP as an argument to the web browser 11. The web browser 11 may then automatically transmit an HTTP request (for the GUI application) to the web server 106'. Following along the lines of the previous examples, a particular example of the application request to the web server 106' is http://web-server/dynamic-component/?app=123456677).

The web server 106', and, more particularly, the publishing server plug-in 165, receives the application request associated the SAP (step 345) and determines the SAP entry associated with the request (step 350). In one embodiment, the publishing server plug-in 165 receives the request from the client 102 and retrieves the published application information associated with the request that had been stored (as part of the SAP entry) in the persistent mass storage 225. In some embodiments, the publishing server plug-in 165 uses the SAP (or part of the SAP) that the client 102 received from the content server 106 as the key to access the proper service entry (e.g., the published application information) stored in the persistent mass storage 225.

The publishing server plug-in 165 then constructs a file or document having the published application information (e.g., HTTP address of the application server 106") (step 352) and transmits this document to the client 102 (step 355). The publishing server plug-in 165 constructs the file so that the file has a format compatible with the application client 13. In one embodiment, the document is a Multipurpose Internet Mail Extensions (MIME) or a secure MIME (S/MIME) document. In another embodiment, the document is an HTML document containing an ICA web client embedded object HTML tag. In still another embodiment, the document is an HTML document containing an application streaming client embedded object HTML tag.

The web browser 11 subsequently receives the document and attempts to open the document. In one embodiment, if the application client 13 is not installed on the client 102, the client 102 communicates with the application server 106" to download and install the application client 13. Upon installation of the application client 13 or, alternatively, if the application client 13 has already been installed on the client 102, the client 102 launches the application client 13 to view the document received from the web server 106' (step 360).

Once the application client 13 is installed and executing on the client 102, the application server 106" then executes the application and displays the application on the application client 13 (step 365). In an alternative embodiment, the application server 106" transmits a plurality of application files comprising the application to the application client 13 for execution on the client 102, as described in further detail below in connection with FIG. 7. In another embodiment, the client 102 views the document (even before launching the application client 13) and uses the information in the document to obtain the GUI application from the application server 106". In this embodiment, the display of the GUI application includes the installation and execution of the application client 106". Moreover, the viewing of the document may be transparent to the user of the client 102. For example, the client 102 may receive the document from the web server 106' and interpret the document before automatically requesting the GUI application from the application server 106".

Thus, the application client 13 provides service-based access to published applications, desktops, desktop documents, and any other application that is supported by the application client 13. Examples of applications that the application client 13 can provide access to include, but are not limited to, the WINDOWS desktops, WINDOWS documents such as MICROSOFT EXCEL, WORD, and POWERPOINT, all of which were developed by Microsoft Corporation of Redmond, Wash., Unix desktops such as SUN SOLARIS developed by Sun Microsystems of Palo Alto, Calif., and GNU/Linux distributed by Red Hat, Inc. of Durham, N.C., among others.

Figure 4A:
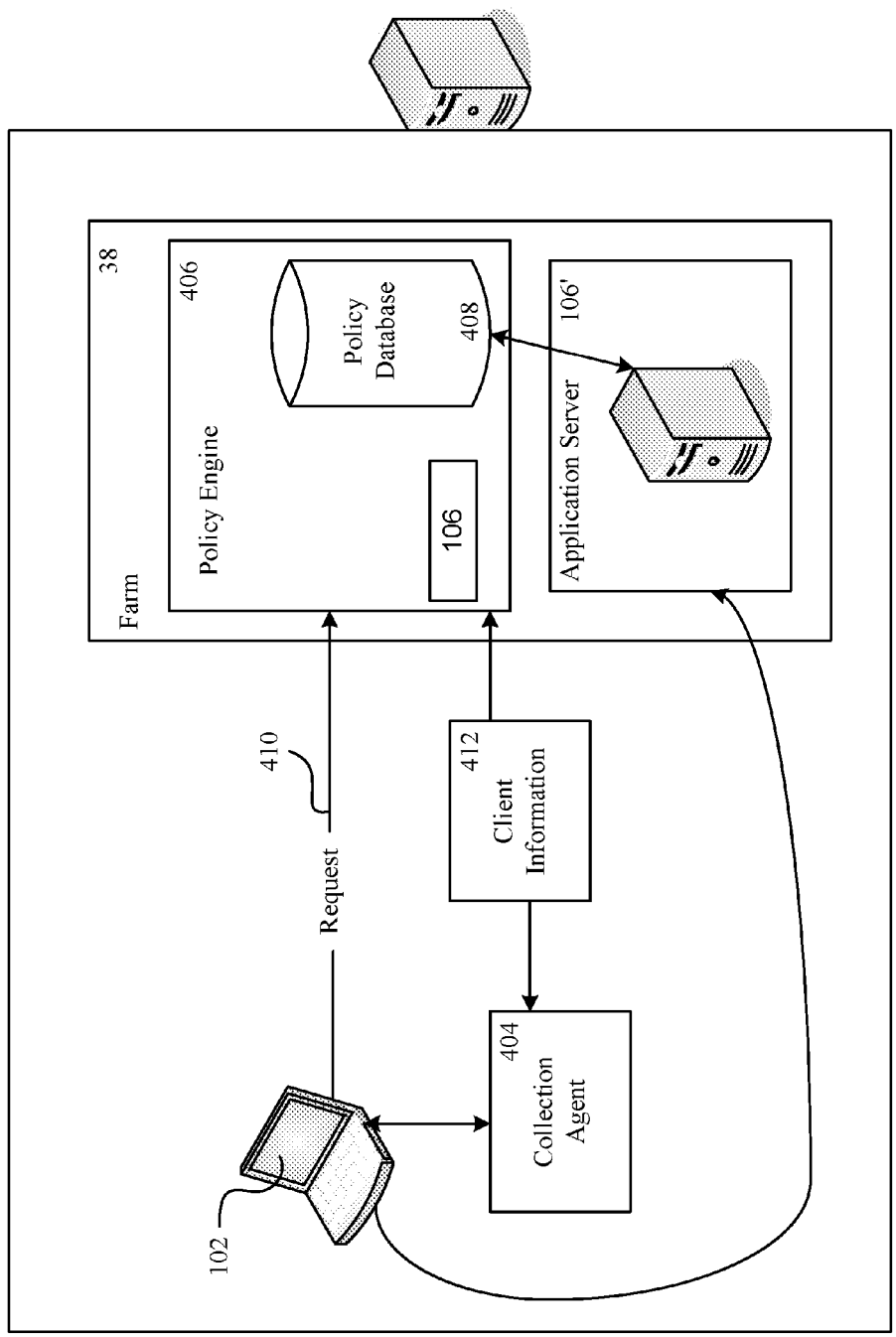
FIG. 4A is a block diagram of an embodiment of a network providing policy-based access to application programs for a client.

In some embodiments, an enumeration of a plurality of application programs available to the client 102 is provided (step 204) responsive to a determination by a policy engine regarding whether and how a client may access an application. The policy engine may collect information about the client prior to making the determination. Referring now to FIG. 4A, one embodiment of a computer network is depicted, which includes a client 102, a collection agent 404, a policy engine 406, a policy database 408, a farm 38, and an application server 106'. In one embodiment, the policy engine 406 is a server 106. Although only one client 102, collection agent 404, policy engine 406, farm 38, and application server 106' are depicted in the embodiment shown in FIG. 4A, it should be understood that the system may provide multiple ones of any or each of those components.

In brief overview, when the client 102 transmits a request 410 to the policy engine 406 for access to an application, the collection agent 404 communicates with client 102, retrieving information about the client 102, and transmits the client information 412 to the policy engine 406. The policy engine 406 makes an access control decision by applying a policy from the policy database 408 to the received information 412.

In more detail, the client 102 transmits a request 410 for a resource to the policy engine 406. In one embodiment, the policy engine 406 resides on an application server 106'. In another embodiment, the policy engine 406 is a server 106. In still another embodiment, an application server 106' receives the request 410 from the client 102 and transmits the request 410 to the policy engine 406. In yet another embodiment, the client transmits a request 410 for a resource to a server 106''', which transmits the request 410 to the policy engine 406.

In some embodiments, the client 102 transmits the request 410 over a network connection. The network can be a local area network (LAN), a metropolitan area network (MAN), or a wide area network (WAN) such as the Internet. The client 102 and the policy engine 406 may connect to a network through a variety of connections including standard telephone lines, LAN or WAN links (e.g., T1, T3, 56 kb, X.25), broadband connections (ISDN, Frame Relay, ATM), and wireless connections. Connections between the client 102 and the policy engine 10 may use a variety of data-link layer communication protocols (e.g., TCP/IP, IPX, SPX, NetBIOS, NetBEUI, SMB, Ethernet, ARCNET, Fiber Distributed Data Interface (FDDI), RS232, IEEE 802.11, IEEE 802.11a, IEE 802.11b, IEEE 802.11g and direct asynchronous connections). The connection may also be a communications link 150 as described above.

Upon receiving the request, the policy engine 406 initiates information gathering by the collection agent 404. The collection agent 404 gathers information regarding the client 102 and transmits the information 412 to the policy engine 406.

In some embodiments, the collection agent 404 gathers and transmits the information 412 over a network connection. In some embodiments, the collection agent 404 comprises bytecode, such as an application written in the bytecode programming language JAVA. In some embodiments, the collection agent 404 comprises at least one script. In those embodiments, the collection agent 404 gathers information by running at least one script on the client 102. In some embodiments, the collection agent comprises an Active X control on the client 102. An Active X control is a specialized Component Object Model (COM) object that implements a set of interfaces that enable it to look and act like a control.

In one embodiment, the policy engine 406 transmits the collection agent 404 to the client 102. In one embodiment, the policy engine 406 requires a second execution of the collection agent 404 after the collection agent 404 has transmitted information 412 to the policy engine 406. In this embodiment, the policy engine 406 may have insufficient information 412 to determine whether the client 102 satisfies a particular condition. In other embodiments, the policy engine 406 requires a plurality of executions of the collection agent 404 in response to received information 412.

In some embodiments, the policy engine 406 transmits instructions to the collection agent 404 determining the type of information the collection agent 404 gathers. In those embodiments, a system administrator may configure the instructions transmitted to the collection agent 404 from the policy engine 406. This provides greater control over the type of information collected. This also expands the types of access control decisions that the policy engine 406 can make, due to the greater control over the type of information collected. The collection agent 404 gathers information 412 including, without limitation, machine ID of the client 102, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information such as internet protocol address or range of addresses, machine ID of the server 106, date or time of access request including adjustments for varying time zones, and authorization credentials.

In some embodiments, the device type is a personal digital assistant. In other embodiments, the device type is a cellular telephone. In other embodiments, the device type is a laptop computer. In other embodiments, the device type is a desktop computer. In other embodiments, the device type is an Internet kiosk.

In some embodiments, the digital watermark includes data embedding. In some embodiments, the watermark comprises a pattern of data inserted into a file to provide source information about the file. In other embodiments, the watermark comprises data hashing files to provide tamper detection. In other embodiments, the watermark provides copyright information about the file.

In some embodiments, the network connection information pertains to bandwidth capabilities. In other embodiments, the network connection information pertains to Internet Protocol address. In still other embodiments, the network connection information consists of an Internet Protocol address. In one embodiment, the network connection information comprises a network zone identifying the logon agent to which the client provided authentication credentials.

In some embodiments, the authorization credentials include a number of types of authentication information, including without limitation, user names, client names, client addresses, passwords, PINs, voice samples, one-time passcodes, biometric data, digital certificates, tickets, etc. and combinations thereof After receiving the gathered information 412, the policy engine 406 makes an access control decision based on the received information 412.

Figure 4B:
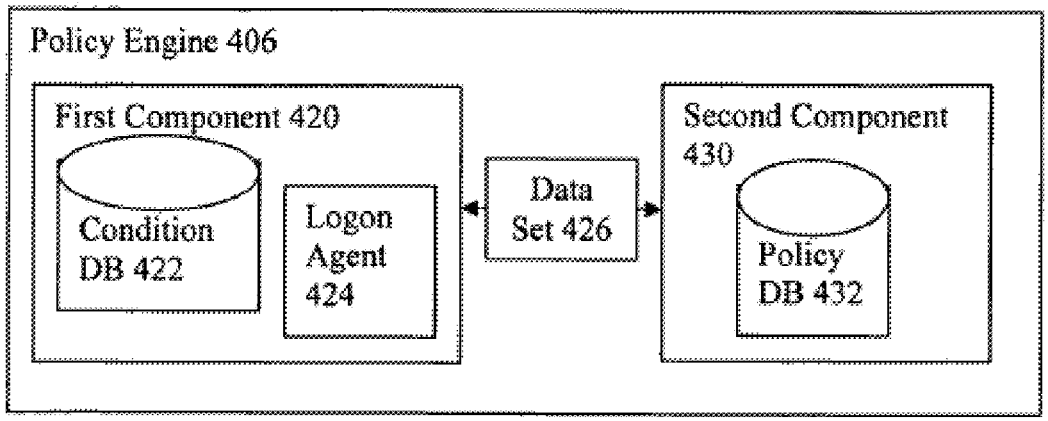
FIG. 4B is a block diagram depicting a more detailed embodiment of a policy engine.

Referring now to FIG. 4B, a block diagram depicts one embodiment of a policy engine 406, including a first component 420 comprising a condition database 422 and a logon agent 424, and including a second component 430 comprising a policy database 432. The first component 420 applies a condition from the condition database 422 to information received about client 102 and determines whether the received information satisfies the condition.

In some embodiments, a condition may require that the client 102 execute a particular operating system to satisfy the condition. In other embodiments, a condition may require that the client 102 execute a particular operating system patch to satisfy the condition. In still other embodiments, a condition may require that the client 102 provide a MAC address for each installed network card to satisfy the condition. In some embodiments, a condition may require that the client 102 indicate membership in a particular Active Directory to satisfy the condition. In another embodiment, a condition may require that the client 102 execute a virus scanner to satisfy the condition. In other embodiments, a condition may require that the client 102 execute a personal firewall to satisfy the condition. In some embodiments, a condition may require that the client 102 comprise a particular device type to satisfy the condition. In other embodiments, a condition may require that the client 102 establish a particular type of network connection to satisfy the condition.

If the received information satisfies a condition, the first component 420 stores an identifier for that condition in a data set 426. In one embodiment, the received information satisfies a condition if the information makes the condition true. For example, a condition may require that a particular operating system be installed. If the client 102 has that operating system, the condition is true and satisfied. In another embodiment, the received information satisfies a condition if the information makes the condition false. For example, a condition may address whether spyware exists on the client 102. If the client 102 does not contain spyware, the condition is false and satisfied.

In some embodiments, the logon agent 424 resides outside of the policy engine 406. In other embodiments, the logon agent 424 resides on the policy engine 406. In one embodiment, the first component 420 includes a logon agent 424, which initiates the information gathering about client 102. In some embodiments, the logon agent 424 further comprises a data store. In these embodiments, the data store includes the conditions for which the collection agent may gather information. This data store is distinct from the condition database 422.

In some embodiments, the logon agent 424 initiates information gathering by executing the collection agent 404. In other embodiments, the logon agent 424 initiates information gathering by transmitting the collection agent 404 to the client 102 for execution on the client 102. In still other embodiments, the logon agent 424 initiates additional information gathering after receiving information 412. In one embodiment, the logon agent 424 also receives the information 412. In this embodiment, the logon agent 424 generates the data set 426 based upon the received information 412. In some embodiments, the logon agent 424 generates the data set 426 by applying a condition from the database 422 to the information received from the collection agent 404.

In another embodiment, the first component 420 includes a plurality of logon agents 424. In this embodiment, at least one of the plurality of logon agents 424 resides on each network domain from which a client 102 may transmit a resource request. In this embodiment, the client 102 transmits the resource request to a particular logon agent 424. In some embodiments, the logon agent 424 transmits to the policy engine 406 the network domain from which the client 102 accessed the logon agent 424. In one embodiment, the network domain from which the client 102 accesses a logon agent 424 is referred to as the network zone of the client 102.

The condition database 422 stores the conditions that the first component 420 applies to received information. The policy database 432 stores the policies that the second component 430 applies to the received data set 426. In some embodiments, the condition database 422 and the policy database 432 store data in an ODBC-compliant database. For example, the condition database 422 and the policy database 432 may be provided as an ORACLE database, manufactured by Oracle Corporation of Redwood Shores, Calif. In other embodiments, the condition database 422 and the policy database 432 can be a Microsoft ACCESS database or a Microsoft SQL server database, manufactured by Microsoft Corporation of Redmond, Wash.

After the first component 420 applies the received information to each condition in the condition database 422, the first component transmits the data set 426 to second component 430. In one embodiment, the first component 420 transmits only the data set 426 to the second component 430. Therefore, in this embodiment, the second component 430 does not receive client information 412, only identifiers for satisfied conditions. The second component 430 receives the data set 426 and makes an access control decision by applying a policy from the policy database 432 based upon the conditions identified within data set 426.

In one embodiment, policy database 432 stores the policies applied to the received information 412. In one embodiment, the policies stored in the policy database 432 are specified at least in part by the system administrator. In another embodiment, a user specifies at least some of the policies stored in the policy database 432. The user-specified policy or policies are stored as preferences. The policy database 432 can be stored in volatile or non-volatile memory or, for example, distributed through multiple servers.

In one embodiment, a policy allows access to a resource only if one or more conditions are satisfied. In another embodiment, a policy allows access to a resource but prohibits transmission of the resource to the client 102. Another policy might make connection contingent on the client 102 that requests access being within a secure network. In some embodiments, the resource is an application program and the client 102 has requested execution of the application program. In one of these embodiments, a policy may allow execution of the application program on the client 102. In another of these embodiments, a policy may enable the client 102 to receive a stream of files comprising the application program. In this embodiment, the stream of files may be stored and executed in an isolation environment. In still another of these embodiments, a policy may allow only execution of the application program on a server, such as an application server, and require the server to transmit application-output data to the client 102.

Figure 4C:
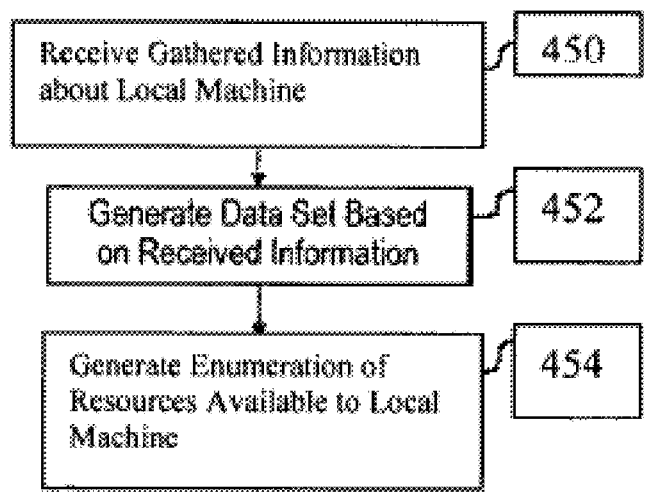
FIG. 4C a flow diagram depicting one embodiment of the steps taken by a policy engine to make an access control decision based upon information received about a client.

Referring now to FIG. 4C, a flow diagram depicts one embodiment of the steps taken by the policy engine 406 to make an access control decision based upon information received about a client 102. Upon receiving gathered information about the client 102 (Step 450), the policy engine 406 generates a data set based upon the information (Step 452). The data set 426 contains identifiers for each condition satisfied by the received information 412. The policy engine 406 applies a policy to each identified condition within the data set 426. That application yields an enumeration of resources which the client 102 may access (Step 454). The policy engine 406 then presents that enumeration to the client 102. In some embodiments, the policy engine 406 creates a Hypertext Markup Language (HTML) document used to present the enumeration to the client.

Figure 4D:
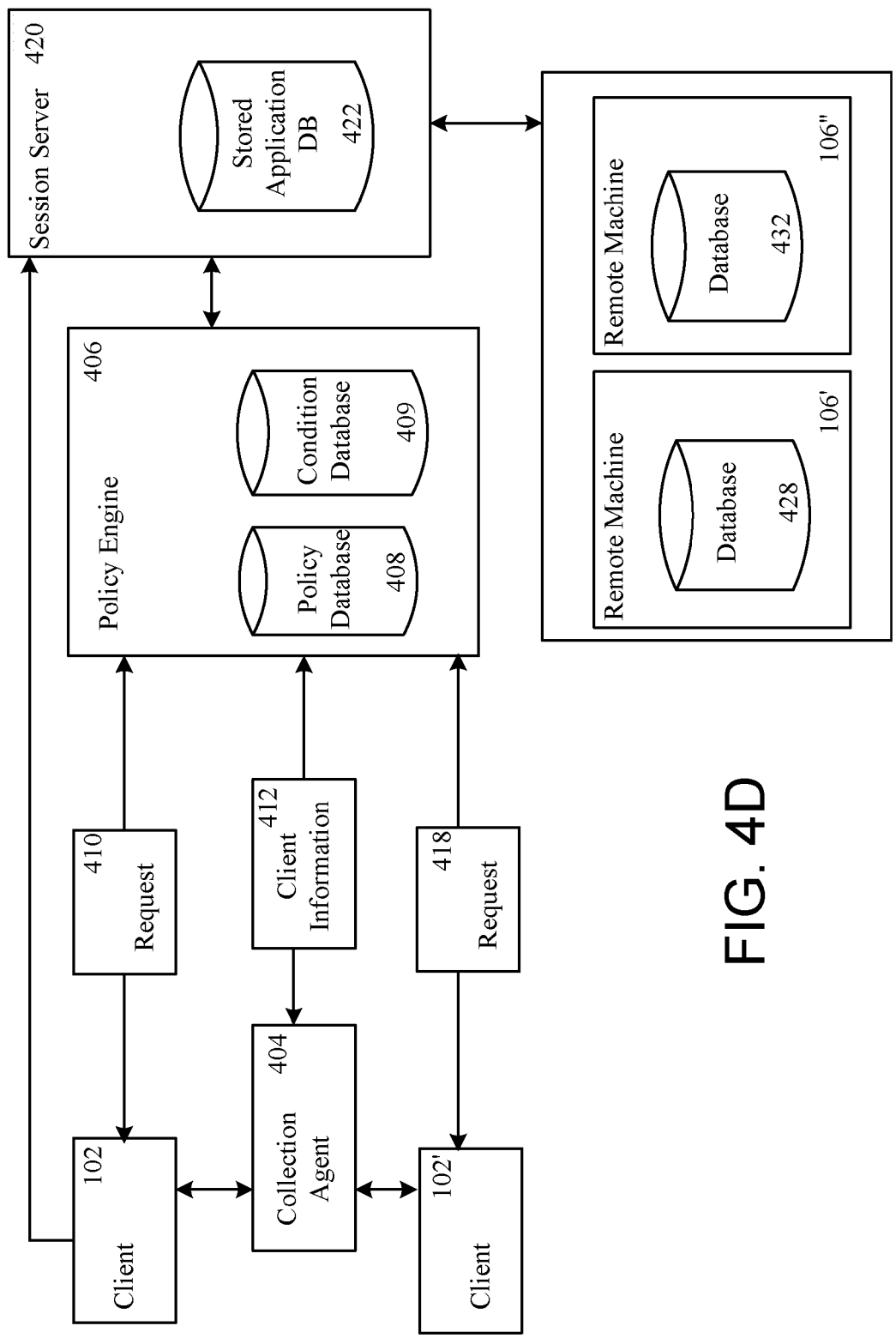
FIG. 4D is a block diagram depicting an embodiment of a computer network in which authorized remote access to a plurality of application sessions is provided.

Referring to FIG. 4D, and in more detail, one embodiment of a network constructed is depicted, which includes a client 102, a collection agent 404, a policy engine 406, a policy database 408, a condition database 409, a client 102, 102', a session server 420, a stored application database 422, a first server 106', a first database 428, a second server 106", and a second database 432. In brief overview, when the client 102 transmits to the access control server 406 or policy engine, a request 410 for access to an application program, the collection agent 404 communicates with client 102, retrieves information about client 102, and transmits the client information 412 to the policy engine 406. The policy engine 406 makes an access control decision, as discussed above in FIG. 4A and FIG. 4B, and the client 102 receives an enumeration of available applications associated with the client 102.

In some embodiments, the session server 420 establishes a connection between the client 102 and a plurality of application sessions associated with the client 102. In other embodiments, the policy engine 406 determines that the client 102 has authorization to retrieve a plurality of application files comprising the application and to execute the application program locally. In one of these embodiments, the server 106' stores application session data and a plurality of application files comprising the application program. In another of these embodiments, the client 102 establishes an application streaming session with a server 106' storing the application session data and the plurality of application files comprising the application program.

Figure 4E:
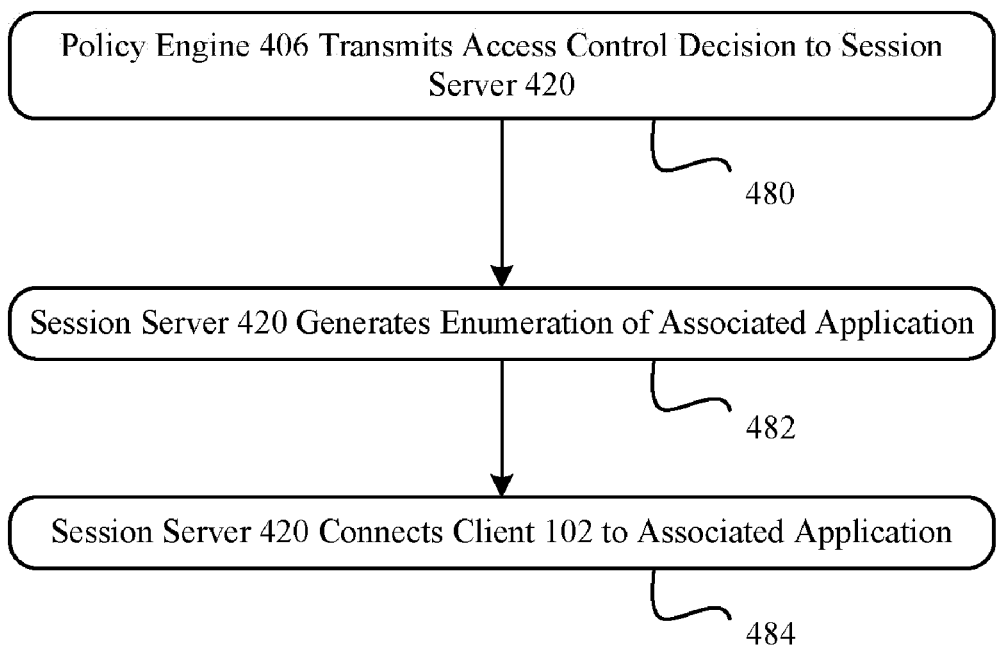
FIG. 4E is a flow diagram depicting one embodiment of the steps taken by a session server to connect a client with its associated application sessions.

Referring now to FIG. 4E, a flow diagram depicts one embodiment of the steps taken by the session server 420 to provide access for the client 102 to its associated application sessions. The session server 420 receives information about the client 102 from the policy engine 406 containing access control decision the policy engine 406 made (step 480). The session server 420 generates an enumeration of associated applications (step 482). The session server 420 may connect the client 102 to an associated application (step 484). In one embodiment, the information also includes the client machine information 412. In another embodiment, the information includes authorization to execute the application program locally.

The session server 420 generates an enumeration of associated applications (step 482). In some embodiments, the policy engine 406 identifies a plurality of application sessions already associated with the client 102. In other embodiments, the session server 420 identifies stored application sessions associated with the client 102. In some of these embodiments, the session server 420 automatically identifies the stored application sessions upon receiving the information from the policy engine 406. In one embodiment, the stored application database 422 resides on the session server 420. In another embodiment, the stored application database 422 resides on the policy engine 406.

The stored application database 422 contains data associated with a plurality of servers in the farm 38 executing application sessions or providing access to application session data and application files comprising application programs. In some embodiments, identifying the application sessions associated with the client 102 requires consulting stored data associated with one or more servers or servers. In some of these embodiments, the session store 420 consults the stored data associated with one or more servers. In others of these embodiments, the policy engine 406 consults the stored data associated with one or more servers. In some embodiments, a first application session runs on a first server 106' and a second application session runs on a second server 106". In other embodiments, all application sessions run on a single server 106 within the farm 38.

The session server 420 includes information related to application sessions initiated by users. The session server can be stored in volatile or non-volatile memory or, for example, distributed through multiple servers. Table 1 shows the data included in a portion of an illustrative session server 420:

TABLE 1

| | Application Session | | |
|---|---|---|---|
| | App Session 1 | App Session 2 | App Session 3 |
| User ID | User 1 | User 2 | User 1 |
| Client ID | First Client | | First Client |
| Client Address | 172.16.0.50 | | 172.16.0.50 |
| Status | Active | Disconnected | Active |
| Applications | Word Processor | Data Base | Spreadsheet |
| Process Number | 1 | 3 | 2 |
| Server | Server A | Server A | Server B |
| Server Address | 172.16.2.55 | 172.16.2.55 | 172.16.2.56 |

The illustrative session server 420 in Table 1 includes data associating each application session with the user that initiated the application session, an identification of the client computer 102, 102', if any, from which the user is currently connected to the server 106', and the IP address of that client computer 102, 102'. The illustrative session server 420 also includes the status of each application session. An application session status can be, for example, "active" (meaning a user is connected to the application session), or "disconnected" (meaning a user is not connected to the application session). In an alternative embodiment, an application session status can also be set to "executing-disconnected" (meaning the user has disconnected from the application session, but the applications in the application session are still executing), or "stalled-disconnected" (meaning the user is disconnected and the applications in the application session are not executing, but their operational state immediately prior to the disconnection has been stored). The session server 420 further stores information indicating the applications that are executing within each application session and data indicating each application's process on the server. In embodiments in which the server 106' is part of the farm 38, the session server 420 is at least a part of the dynamic store, and also includes the data in the last two rows of Table 1 that indicate on which server 106 in the farm 38 each application is/was executing, and the IP address of that server 106. In alternative embodiments, the session server 420 includes a status indicator for each application in each application session.

For example, in the example of Table 1, three application sessions exist, App Session 1, App Session 2, and App Session 3. App Session 1 is associated with User 1, who is currently using terminal 1. Terminal 1's IP address is 152.16.2.50. The status of App Session 1 is active, and in App Session 1, a word processing program, is being executed. The word processing program is executing on Server A as process number 1. Server A's IP address is 152.16.2.55. App Session 2 in Table 1 is an example of a disconnected application session 118. App Session 2 is associated with User 2, but App Session 2 is not connected to a client 102 or 20. App Session 2 includes a database program that is executing on Server A, at IP address 152.16.2.55 as process number 3. App Session 3 is an example of how a user can interact with application sessions operating on different servers 106. App Session 3 is associated with User 1, as is App Session 1. App Session 3 includes a spreadsheet program that is executing on Server B at IP address 152.16.2.56 as process number 2, whereas the application session included in App Session 1 is executing on Server A.

In another example, a user may access a first application program through an application session executing on a server 106', such as Server A, while communicating across an application streaming session with a second server 106″, such as Server B, to retrieve a second application program from the second server 106″ for local execution. The user of the client 102 may have acquired authorization to execute the second application program locally while failing to satisfy the execution pre-requisites of the first application program.

In one embodiment, the session server 420 is configured to receive a disconnect request to disconnect the application sessions associated with the client 102 and disconnects the application sessions in response to the request. The session server 420 continues to execute an application session after disconnecting the client 102 from the application session. In this embodiment, the session server 420 accesses the stored application database 422 and updates a data record associated with each disconnected application session so that the record indicates that the application session associated with the client 102 is disconnected.

After receiving authentication information associated with a client connecting to the network, the session server 420 consults the stored applications database 422 to identify any active application sessions that are associated with a user of the client, but that are connected to a different client, such as the client 102′ if the authentication information is associated with client 102′, for example. In one embodiment, if the session server 420 identifies any such active application sessions, the session server 420 automatically disconnects the application session(s) from the client 102 and connects the application session(s) to the current client 102′. In some embodiments, the received authentication information will restrict the application sessions to which the client 102 may reconnect. In other embodiments, the received authentication information authorizes execution of an application program on the client 102′, where the authorization may have been denied to client 102. In one of these embodiments, the session server 420 may provide the client access information for retrieving the application program for local execution.

A request is received to execute an enumerated application (step 206). In one embodiment, a user of the client 102 selects an application for execution from a received enumeration of available applications. In another embodiment, the user selects an application for execution independent of the received enumeration. In some embodiments, the user selects an application for execution by selecting a graphical representation of the application presented on the client 102 by a client agent. In other embodiments, the user selects an application for execution by selecting a graphical representation of the application presented to the user on a web server or other server 106‴.

In still other embodiments, the user requests to access a file. In one of these embodiments, execution of an application is required to provide the user with access to the file. In another of these embodiments, the application is automatically selected for execution upon selection of the file for access. In still another of these embodiments, prior to the request for access to the file, the application is associated with a type of file, enabling automatic selection of the application upon identification of a type of file associated with the requested file.

In one embodiment, the enumerated application comprises a plurality of application files. In some embodiments, the plurality of application files reside on the server 106′. In other embodiments, the plurality of application files reside on a separate file server or server 106″. In still other embodiments, the plurality of application files may be transmitted to a client 102. In yet other embodiments, a file in the plurality of application files may be executed prior to transmission of a second file in the plurality of application files to the client 102.

In some embodiments, the server 106 retrieves information about the enumerated application from a server 106′. In one of these embodiments, the server 106 receives an identification of a server 106″ hosting a plurality of application files. In another of these embodiments, the server 106 receives identification of a location of a plurality of application files, the identification conforming to a Universal Naming Convention (UNC). In still another of these embodiments, the identification includes a network location and a socket for an application streaming protocol.

In one embodiment, the server 106 retrieves a file containing information about the enumerated application. The file may include an identification of a location of a server hosting the enumerated application. The file may include an identification of a plurality of versions of the enumerated application. The file may include an enumeration of a plurality of application files comprising the enumerated application. The file may include an identification of a compressed file comprising a plurality of applications files comprising the enumerated application. The file may include an identification of pre-requisites to be satisfied by a machine executing the enumerated application. The file may include an enumeration of data files associated with the enumerated application. The file may include an enumeration of scripts to be executed on a machine executing the enumerated application. The file may include an enumeration of registry data associated with the enumerated application. The file may include an enumeration of rules for use in an embodiment where the enumerated application executes within an isolation environment. In one embodiment, the file may be referred to as a "manifest" file.

In some embodiments, the server 106 applies a policy to an identified characteristic of the client 102. In one of these embodiments, the server 106 identifies a version of the enumerated application for execution responsive to the identified characteristic. In another of these embodiments, the server 106 makes a determination to execute a version of the enumerated application compatible with a characteristic of the client 102. In still another of these embodiments, the server 106 makes a determination to execute a version of the enumerated application compatible with an operating system executing on the client 102. In yet another of these embodiments, the server 106 makes a determination to execute a version of the enumerated application compatible with a revision level of an operating system on the client 102. In one of these embodiments, the server 106 makes a determination to execute a version of the enumerated application compatible with a language specified by an operating system on the client 102.

One of a predetermined number of methods for executing the enumerated application is selected, responsive to a policy, the predetermined number of methods including a method for application streaming of the enumerated application (step 208). In one embodiment, the selection is made responsive to an application of a policy to the received credentials associated with the client 102. In some embodiments, the selection is made by a policy engine such as the policy engine 406 described above in FIG. 4A, FIG. 4B and FIG. 4C. In other embodiments, the server 106 receiving the credentials and the request to execute the enumerated application further comprises such a policy engine 406.

In one embodiment, the predetermined number of methods includes a method for executing the enumerated application on a server 106′. In another embodiment, the predetermined number of methods includes a method for executing the enumerated application on the client 102. In still another embodiment, the predetermined number of methods includes a method for executing the enumerated application on a second server 106'.

In some embodiments, the predetermined number of methods includes a method for providing the enumerated application to the client 102 across an application streaming session. In one of these embodiments, the client 102 comprises a streaming service agent capable of initiating a connection with a server 106' and receiving from the server 106' a stream of transmitted data packets.

The stream of data packets may include application files comprising the enumerated application. In some embodiments, application files include data files associated with an application program. In other embodiments, application files include executable files required for execution of the application program. In still other embodiments, the application files include metadata including information about the files, such as location, compatibility requirements, configuration data, registry data, identification of execution scripts rules for use in isolation environments, or authorization requirements.

In some embodiments, the streamed application executes prior to the transmission of each application file in a plurality of application files comprising the streamed application. In one of these embodiments, execution of the streamed application begins upon receipt by a client 102 of one application file in the plurality of applications. In another of these embodiments, execution of the streamed application begins upon receipt by a client 102 of an executable application file in the plurality of application files. In still another of these embodiments, the client 102 executes a first received application file in a plurality of application files and the first received application file requests access to a second application file in the plurality of application files.

In one embodiment, the streamed application executes on the client 102 without permanently residing on the client 102. In this embodiment, the streamed application may execute on the client 102 and be removed from the client 102 upon termination of the streamed application. In another embodiment, the streamed application executes on the client 102 after a pre-deployed copy of each application file is stored on the client 102. In still another embodiment, the streamed application executes on the client 102 after a copy of each application file is stored in an isolation environment on the client 102. In yet another embodiment, the streamed application executes on the client 102 after a copy of each application file is stored in a cache on the client 102.

In one embodiment, the method for streaming the application to the client 102 is selected from the predetermined number of methods responsive to a determination that the client 102 may receive the streamed application files. In another embodiment, the method for streaming the application to the client 102 is selected from the predetermined number of methods responsive to a determination that the client 102 has authority to execute the streamed application files locally at the client 102.

In other embodiments, the predetermined number of methods include a method for providing application-output data to the client 102, the application-output data generated from an execution of the enumerated application on a server 106. In one of these embodiments, the server 106 is the server 106 receiving the request for execution of the enumerated application. In another of these embodiments, the server 106 is a second server 106', such as a file server or an application server. In some embodiments, the enumerated application resides on the server 106' executing the enumerated application. In other embodiments, the server 106' executing the enumerated application first receives the enumerated application from a second server 106' across an application streaming session. In one of these embodiments, the server 106' comprises a streaming service agent capable of initiating a connection with a second server 106' and receiving from the second server 106' a stream of transmitted data. In another of these embodiments, the second server 106' may be identified using a load balancing technique. In still another of these embodiments, the second server 106' may be identified based upon proximity to the server 106'.

In some embodiments, the server 106 selects from the predetermined number of methods for executing the enumerated application, a method for streaming the enumerated application to the server 106, executing the enumerated application on the server 106, and providing to the client 102 application-output data generated by the execution of the enumerated application. In one of these embodiments, the server 106 selects the method responsive to an evaluation of the client 102. In another of these embodiments the determination is made responsive to an application of a policy to the evaluation of the client 102. In still another of these embodiments, the determination is made responsive to an evaluation of the received credentials. In one embodiment, the server 106 receives a plurality of application files comprising the enumerated application. In another embodiment, the server 106 provides the application-output data via a presentation level protocol, such as an ICA presentation level protocol or a Remote Desktop Windows presentation level protocol or an X-Windows presentation level protocol.

In some embodiments, the server 106 also provides access information associated with the enumerated application, the access information generated responsive to the selected method. In one of these embodiments, the access information provides an indication to the client 102 of the selected method for execution of the enumerated application program. In another of these embodiments, the access information includes an identification of a location of the enumerated application, the identification conforming to a Universal Naming Convention (UNC). In still another of these embodiments, the access information includes an identification of a session management server.

In some embodiments, the access information includes a launch ticket comprising authentication information. In one of these embodiments, the client 102 may use the launch ticket to authenticate the access information received from the server 106. In another of these embodiments, the client 102 may use the launch ticket to authenticate itself to a second server 106 hosting the enumerated application. In still another of these embodiments, the server 106 includes the launch ticket in the access information responsive to a request from the client 102 for the launch ticket.

Figure 5:
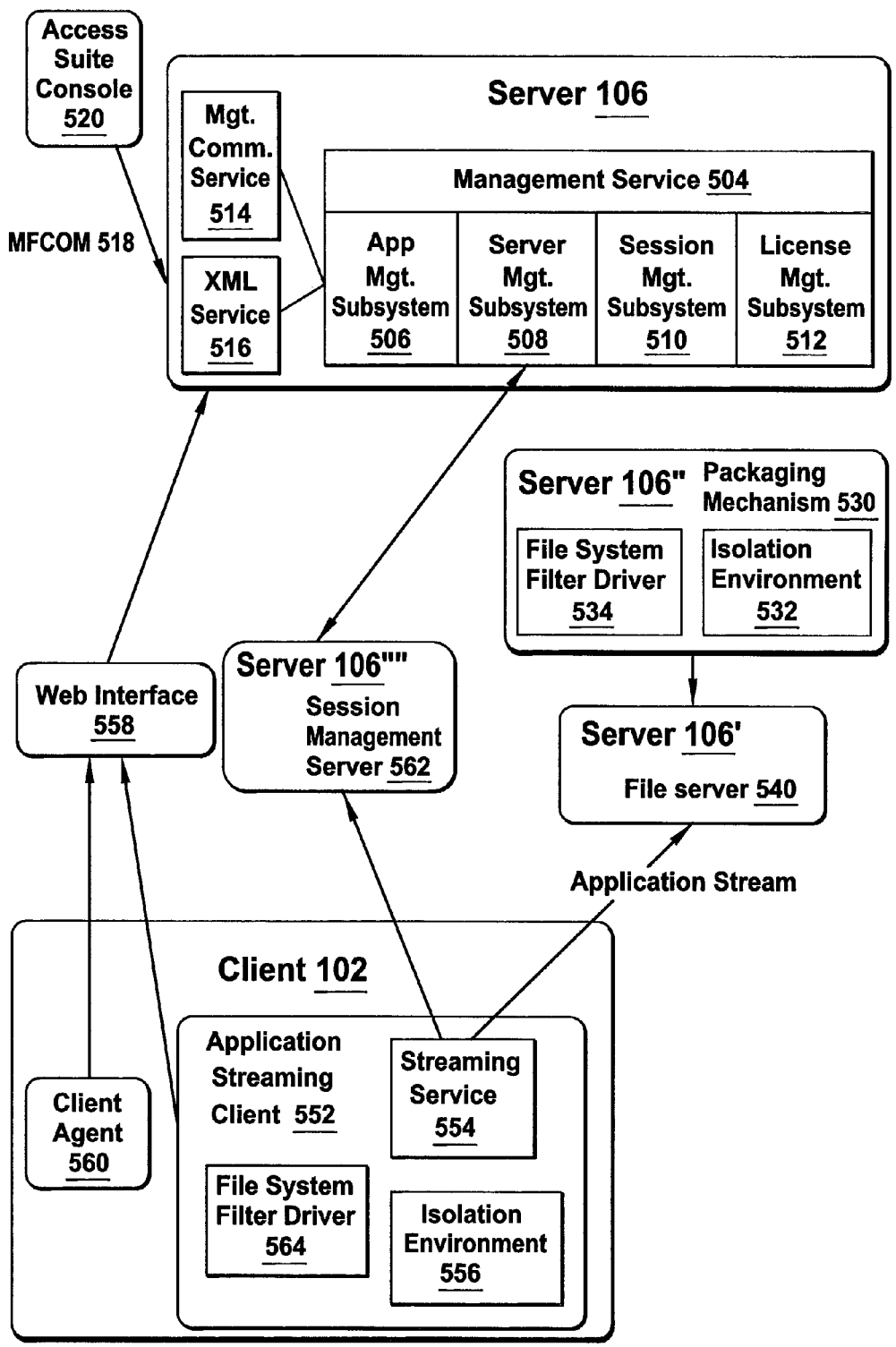
FIG. 5 is a flow diagram depicting one embodiment of the steps taken by a session server to connect a client node with its associated application sessions.

Referring now to FIG. 5, a block diagram depicts an embodiment of the system described herein in which a client 102 requests execution of an application program and a server 106 selects a method of executing the application program. In one embodiment, the server 106 receives credentials from the client 102. In another embodiment, the server 106 receives a request for an enumeration of available applications from the client 102.

In some embodiments, multiple, redundant, servers 106, 106', 106", 106''', and 106'''' are provided. In one of these embodiments, there may be, for example, multiple file servers, multiple session management servers, multiple staging machines, multiple web interfaces, or multiple access suite consoles. In another of these embodiments, if a server fails, a redundant server 106 is selected to provide the functionality of the failed machine. In other embodiments, although the servers 106, 106', 106", 106''', and 106'''', and the web interface 558 and access suite console 520 are described as separate servers 106 having the separate functionalities of a management server, a session management server, a staging machine, a file server, a web server, and an access suite console, a single server 106 may be provided having the functionality of all of these machines. In still other embodiments, a server 106 may provide the functionality and services of one or more of the other servers.

Referring now to FIG. 5 in greater detail, a block diagram depicts one embodiment of a server 106 providing access to an application program. In addition to the interfaces and subsystems described above in connection with FIG. 1D, the server 106 may further include a management communication service 514, an XML service 516, and a management service 504. The management service 504 may comprise an application management subsystem 506, a server management subsystem 508, a session management subsystem 510, and a license management subsystem 512. The server 106 may be in communication with an access suite console 520.

In one embodiment, the management service 504 further comprises a specialized remote procedure call subsystem, the MetaFrame Remote Procedure Call (MFRPC) subsystem 522. In some embodiments, the MFRPC subsystem 522 routes communications between subsystems on the server 106, such as the XML service 516, and the management service 504. In other embodiments, the MFRPC subsystem 522 provides a remote procedure call (RPC) interface for calling management functions, delivers RPC calls to the management service 504, and returns the results to the subsystem making the call.

In some embodiments, the server 106 is in communication with a protocol engine, such as the protocol engine 406 described above in FIG. 4B. In one of these embodiments, the server 106 is in communication with a protocol engine 406 residing on a server 106'. In other embodiments, the server 106 further comprises a protocol engine 406.

The server 106 may be in communication with an access suite console 520. The access suite console 520 may host management tools to an administrator of a server 106 or of a farm 38. In some embodiments, the server 106 communicates with the access suite console 520 using XML. In other embodiments, the server 106 communicates with the access suite console 520 using the Simple Object Access Protocol (SOAP).

For embodiments such as those described in FIG. 1D and in FIG. 5 in which the server 106 comprises a subset of subsystems, the management service 504 may comprise a plurality of subsystems. In one embodiment, each subsystem is either a single-threaded or a multi-threaded subsystem. A thread is an independent stream of execution running in a multi-tasking environment. A single-threaded subsystem is capable of executing only one thread at a time. A multi-threaded subsystem can support multiple concurrently executing threads, i.e., a multi-threaded subsystem can perform multiple tasks simultaneously.

The application management subsystem 506 manages information associated with a plurality of applications capable of being streamed. In one embodiment, the application management subsystem 506 handles requests from other components, such as requests for storing, deleting, updating, enumerating or resolving applications. In another embodiment, the application management subsystem 506 handles requests sent by components related to an application capable of being streamed. These events can be classified into three types of events: application publishing, application enumeration and application launching, each of which will be described in further detail below. In other embodiments, the application management subsystem 506 further comprises support for application resolution, application publication and application publishing. In other embodiments, the application management subsystem 506, uses a data store to store application properties and policies.

The server management subsystem 508 handles configurations specific to application streaming in server farm configurations. In some embodiments, the server management subsystem 508 also handles events that require retrieval of information associated with a configuration of a farm 38. In other embodiments, the server management subsystem 508 handles events sent by other components related to servers providing access to applications across application streams and properties of those servers. In one embodiment, the server management subsystem 508 stores server properties and farm properties.

In some embodiments, the server 106 further comprises one or more common application subsystems 524 providing services for one or more specialized application subsystems. These servers 106 may also have one or more common server subsystems providing services for one or more specialized server subsystems. In other embodiments, no common application subsystems 524 are provided, and each specialized application and server subsystem implements all required functionality.

In one embodiment in which the server 106 comprises a common application subsystem 524, the common application subsystem 524 manages common properties for published applications. In some embodiments, the common application subsystem 524 handles events that require retrieval of information associated with published applications or with common properties. In other embodiments, the common application subsystem 524 handles all events sent by other components related to common applications and their properties.

A common application subsystem 524 can "publish" applications to the farm 38, which makes each application available for enumeration and launching by a client 102. Generally, an application is installed on each server 106 on which availability of that application is desired. In one embodiment, to publish an application, an administrator runs an administration tool specifying information such as the servers 106 hosting the application, the name of the executable file on each server, the required capabilities of a client for executing the application (e.g., audio, video, encryption, etc.), and a list of users that can use the application. This specified information is categorized into application-specific information and common information. Examples of application-specific information are: the path name for accessing the application and the name of the executable file for running the application. Common information (i.e., common application data) includes, for example, the user-friendly name of the application (e.g., "Microsoft WORD 2000"), a unique identification of the application, and the users of the application.

The application-specific information and common information may be sent to a specialized application subsystem controlling the application on each server 106 hosting the application. The specialized application subsystem may write the application-specific information and the common information into a persistent store 240.

When provided, a common application subsystem 524 also provides a facility for managing the published applications in the farm 38. Through a common application subsystem 524, an administrator can manage the applications of the farm 38 using an administration tool such as the access suite console 520 to configure application groups and produce an application tree hierarchy of those application groups. Each application group may be represented as a folder in the application tree hierarchy. Each application folder in the application tree hierarchy can include one or more other application folders and specific instances of servers. The common application subsystem 524 provides functions to create, move, rename, delete, and enumerate application folders.

In one embodiment, the common application subsystem 524 supports the application management subsystem 506 in handling application enumeration and application resolution requests. In some embodiments, the common application subsystem 524 provides functionality for identifying an application for execution responsive to a mapping between a type of data file and an application for processing the type of data file. In other embodiments, a second application subsystem provides the functionality for file type association.

In some embodiments, the server 106 may further comprise a policy subsystem. A policy subsystem includes a policy rule for determining whether an application may be streamed to a client 102 upon a request by the client 102 for execution of the application. In some embodiments, the policy subsystem identifies a server access option associated with a streamed application published in the access suite console 520. In one of these embodiments, the policy subsystem uses the server access option as a policy in place of the policy rule.

The session monitoring subsystem 510 maintains and updates session status of an application streaming session associated with a client 102 and enforces license requirements for application streaming sessions. In one embodiment the session management subsystem 510 monitors sessions and logs events, such as the launching of an application or the termination of an application streaming session. In another embodiment, the session monitoring subsystem 510 receives communications, such as heartbeat messages, transmitted from the client 102 to the server 106. In still another embodiment, the session management subsystem 510 responds to queries about sessions from management tools, such as tools within the access suite console 520. In some embodiments, the management service 504 further comprises a license management subsystem communicating with the session management subsystem to provide and maintain licenses to clients for execution of applications.

In one embodiment, the management service 504 provides functionality for application enumeration and application resolution. In some embodiments, the management service 504 also provides functionality for application launching, session monitoring and tracking, application publishing, and license enforcement.

Figure 6:
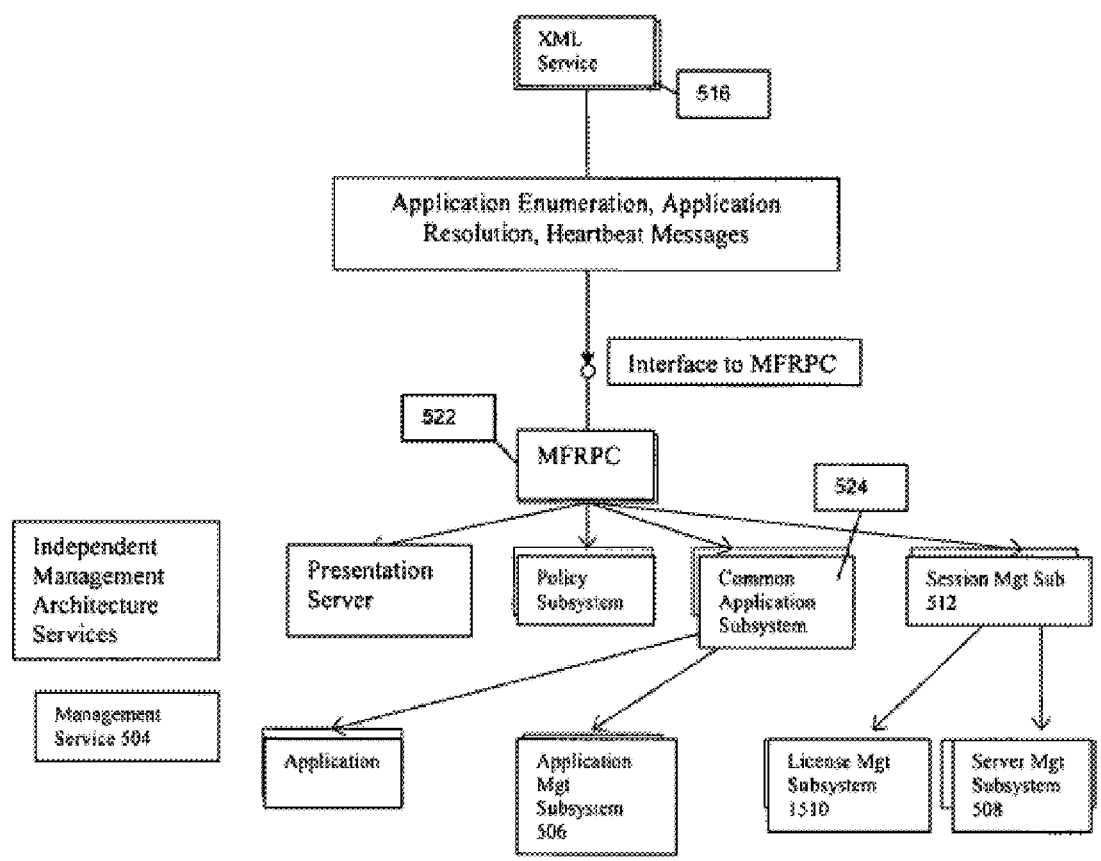
FIG. 6 is a block diagram depicting one embodiment of a server including a management service providing an application enumeration.

Referring now to FIG. 6, a block diagram depicts one embodiment of a server 106 comprising a management service providing an application enumeration. The management service 504 may provide application enumeration through the use of a web interface interacting with an XML service 516. In one embodiment, XML service 516 enumerates applications for a user of a client 102. In another embodiment, the XML service 516 implements the functionality of the ICA browser subsystem and the program neighborhood subsystem described above. The XML service 516 may interact with a management communications service 514. In one embodiment, the XML service 516 generates an application enumeration request using the management communications service 514. The application enumeration request may include a client type indicating a method of execution to be used when executing the enumerated application. The application enumeration request is sent to a common application subsystem 524. In one embodiment, the common application subsystem 524 returns an enumeration of applications associated with the client type of the application enumeration request. In another embodiment, the common application subsystem 524 returns an enumeration of applications available to the user of the client 102, the enumeration selected responsive to an application of a policy to a credential associated with the client 102. In this embodiment, a policy engine 406 may apply the policy to credentials gathered by a collection agent 404, as described in connection with FIG. 4B above. In still another embodiment, the enumeration of applications is returned and an application of a policy to the client 102 is deferred until an execution of an enumerated application is requested.

The management service 504 may provide application resolution service for identifying a second server 106' hosting an application. In one embodiment, the second server 106' is a file server or an application server. In some embodiments, the management service 504 consults a file including identifiers for a plurality of servers 106 hosting applications. In one embodiment, the management service 504 provides the application resolution service responsive to a request from a client 102 for execution of an application. In another embodiment, the management service 504 identifies a second server 106' capable of implementing a different method of executing the application than a first server 106. In some embodiments, the management service 504 identifies a first server 106' capable of streaming an application program to a client 102 and a second server 106' capable of executing the application program and providing application-output data generated responsive to the execution of the application program to the client 102.

In one embodiment, a web interface transmits an application resolution request to the XML service 516. In another embodiment, the XML service 516 receives a application resolution request and transmits the request to the MFRPC subsystem 522.

In one embodiment, the MFRPC subsystem 522 identifies a client type included with a received application resolution request. In another embodiment, the MFRPC subsystem applies a policy to the client type and determines to "stream" the application to the client 102. In this embodiment, the MFRPC subsystem 522 may forward the application resolution request to an application management subsystem 506. In one embodiment, upon receiving the application resolution request from the MFRPC subsystem 522, the application management subsystem 506 may identify a server 106'''' functioning as a session management server 562 for the client 102. In some embodiments, the client transmits a heartbeat message to the session management server 562. In another embodiment, the application management subsystem 506 may identify a server 106' hosting a plurality of application files comprising the application to be streamed to the client 102.

In some embodiments, the application management subsystem 506 uses a file enumerating a plurality of servers hosting the plurality of application files to identify the server 106'. In other embodiments, the application management subsystem 506 identifies a server 106' having an IP address similar to an IP address of the client 102. In still other embodiments, the application management subsystem 506 identifies a server 106' having an IP address in a range of IP addresses accessible to the client 102.

In still another embodiment, the MFRPC subsystem 522 applies a policy to the client type and determines that the application may be executed on a server 106', the server 106' transmitting application-output data generated by an execution of the application to the client 102. In this embodiment, the MFRPC subsystem 522 may forward the application resolution request to a common application subsystem 524 to retrieve an identifier of a host address for a server 106'. In one embodiment, the identified server 106' may transmit the application-output data to the client using a presentation level protocol such as ICA or RDP or X Windows. In some embodiments, the server 106' receives the application from a second server 106' across an application streaming session.

In one embodiment, upon completion of application enumeration and application resolution, access information is transmitted to the client 102 that includes an identification of a method of execution for an enumerated application and an identifier of a server 106' hosting the enumerated application. In one embodiment where the management service 504 determines that the enumerated application will execute on the client 102, a web interface creates and transmits to the client 102 a file containing name-resolved information about the enumerated application. In some embodiments, the file may be identified using a ".rad" extension. The client 102 may execute the enumerated application responsive to the contents of the received file. Table 2 depicts one embodiment of information contained in the file:

TABLE 2

| Field | Description | Source |
|---|---|---|
| UNC path | Points to a Container master manifest file on the file server | XML service |
| Initial program | Program to launch from container | XML service |
| Command line | For launching documents using FTA | XML service |
| Web server URL | For messages from RADE client to WI | WI config |
| Farm ID | The farm the application belongs to - needed for heartbeat messages | WI config |
| LaunchTicket | Application streaming client uses LaunchTicket to acquire a license authorizing execution of the program | XML/IMA |
| ICA fallback launch info | Embedded ICA file for fallback, if fallback is to be allowed | XML Service |

The file may also contain a launch ticket for use by the client in executing the application, as shown in Table 2. In some embodiments, the launch ticket expires after a predetermined period of time. In one embodiment, the client provides the launch ticket to a server hosting the enumerated application to be executed. Use of the launch ticket to authorize access to the enumerated application by a user of the client assists in preventing the user from reusing the file or generating an unauthorized version of the file to inappropriately access to applications. In one embodiment, the launch ticket comprises a large, randomly-generated number.

As described above in connection with FIG. 2, a method for selecting a method of execution of an application program begins when credentials associated with the client 102 or with a user of the client 102 are received (step 202) and an enumeration of a plurality of application programs available to the client 102 is provided, responsive to the received credentials (step 204). A request is received to execute an enumerated application (step 206) and one of a predetermined number of methods for executing the enumerated application is selected, responsive to a policy, the predetermined number of methods including a method for application streaming of the enumerated application (step 208).

Figure 7:
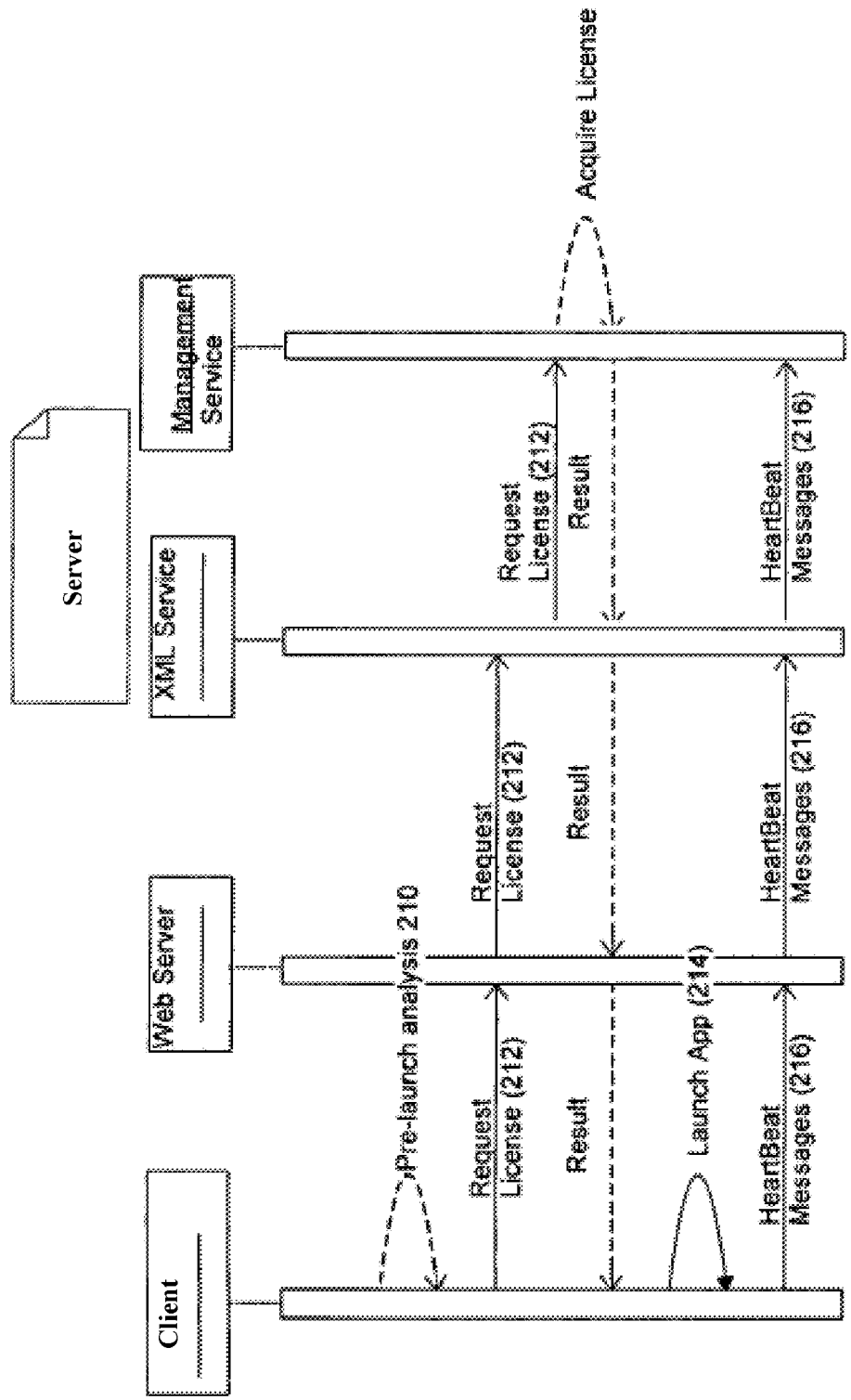
FIG. 7 is a flow diagram depicting one embodiment of the steps taken to access a plurality of files comprising an application program.

Referring now to FIG. 7, a flow diagram depicts one embodiment of the steps taken to access a plurality of files comprising an application program. A client performs a pre-launch analysis of the client (step 210). In one embodiment, the client 102 performs the pre-launch analysis prior to retrieving and executing a plurality of application files comprising an application program. In another embodiment, the client 102 performs the pre-launch analysis responsive to a received indication that the pre-launch analysis is a requirement for authorization to access the plurality of application files comprising an application program.

In some embodiments, the client 102 receives, from a server 106, access information associated with the plurality of application files. In one of these embodiments, the access information includes an identification of a location of a server 106' hosting the plurality of application files. In another of these embodiments, the client 102 receives an identification of a plurality of applications comprising one or more versions of the application program. In still another of these embodiments, the client 102 receives an identification of a plurality of application files comprising one or more application programs. In other embodiments, the client 102 receives an enumeration of application programs available to the client 102 for retrieval and execution. In one of these embodiments, the enumeration results from an evaluation of the client 102. In still other embodiments, the client 102 retrieves the at least one characteristic responsive to the retrieved identification of the plurality of application files comprising an application program.

In some embodiments, the access information includes a launch ticket capable of authorizing the client to access the plurality of application files. In one of these embodiments, the launch ticket is provided to the client 102 responsive to an evaluation of the client 102. In another of these embodiments, the launch ticket is provided to the client 102 subsequent to a pre-launch analysis of the client 102 by the client 102.

In other embodiments, the client 102 retrieves at least one characteristic required for execution of the plurality of application files. In one of these embodiments, the access information includes the at least one characteristic. In another of these embodiments, the access information indicates a location of a file for retrieval by the client 102, the file enumerating the at least one characteristic. In still another of these embodiments, the file enumerating the at least one characteristic further comprises an enumeration of the plurality of application files and an identification of a server 106 hosting the plurality of application files.

The client 102 determines the existence of the at least one characteristic on the client. In one embodiment, the client 102 makes this determination as part of the pre-launch analysis. In another embodiment, the client 102 determines whether the client 102 has the at least one characteristic.

In one embodiment, determining the existence of the at least one characteristic on the client 102 includes determining whether a device driver is installed on the client. In another embodiment, determining the existence of the at least one characteristic on the client 102 includes determining whether an operating system is installed on the client 102. In still another embodiment, determining the existence of the at least one characteristic on the client 102 includes determining whether a particular operating system is installed on the client 102. In yet another embodiment, determining the existence of the at least one characteristic on the client 102 includes determining whether a particular revision level of an operating system is installed on the client 102.

In some embodiments, determining the existence of the at least one characteristic on the client 102 includes determining whether the client 102 has acquired authorization to execute an enumerated application. In one of these embodiments, a determination is made by the client 102 as to whether the client 102 has received a license to execute the enumerated application. In another of these embodiments, a determination is made by the client 102 as to whether the client 102 has received a license to receive across an application streaming session a plurality of application files comprising the enumerated application. In other embodiments, determining the existence of the at least one characteristic on the client 102 includes determining whether the client 102 has sufficient bandwidth available to retrieve and execute an enumerated application.

In some embodiments, determining the existence of the at least one characteristic on the client 102 includes execution of a script on the client 102. In other embodiments, determining the existence of the at least one characteristic on the client 102 includes installation of software on the client 102. In still other embodiments, determining the existence of the at least one characteristic on the client 102 includes modification of a registry on the client 102. In yet other embodiments, determining the existence of the at least one characteristic on the client 102 includes transmission of a collection agent 404 to the client 102 for execution on the client 102 to gather credentials associated with the client 102.

The client 102 requests, from a server 106, authorization for execution of the plurality of application files, the request including a launch ticket (step 212). In some embodiments, the client 102 makes the request responsive to a determination that at least one characteristic exists on the client 102. In one of these embodiments, the client 102 determines that a plurality of characteristics exist on the client 102, the plurality of characteristics associated with an enumerated application and received responsive to a request to execute the enumerated application. In another of these embodiments, whether the client 102 receives an indication that authorization for execution of the enumerated application files depends upon existence of the at least one characteristic on the client 102. In one embodiment, the client 102 received an enumeration of application programs, requested execution of an enumerated application, and received access information including the at least one characteristic and a launch ticket authorizing the execution of the enumerated application upon the determination of the existence of the at least one characteristic on the client 102.

In one embodiment, the client 102 receives from the server 106 a license authorizing execution of the plurality of application files. In some embodiments, the license authorizes execution for a specified time period. In one of these embodiments, the license requires transmission of a heart beat message to maintain authorization for execution of the plurality of application files.

In another embodiment, the client 102 receives from the server 106 the license and an identifier associated with a server 106 monitoring execution of the plurality of application files. In some embodiments, the server is a session management server 562, as depicted above in FIG. 5. In one of these embodiments, the session management server 562 includes a session management subsystem 510 that monitors the session associated with the client 102. In other embodiments, a separate server 106"" is the session management server 562.

The client 102 receives and executes the plurality of application files (step 214). In one embodiment, the client 102 receives the plurality of application files across an application streaming session. In another embodiment, the client 102 stores the plurality of application files in an isolation environment on the client 102. In still another embodiment, the client 102 executes one of the plurality of application files prior to receiving a second of the plurality of application files. In some embodiments, a server transmits the plurality of application files to a plurality of clients, each client in the plurality having established a separate application streaming session with the server.

In some embodiments, the client 102 stores the plurality of application files in a cache and delays execution of the application files. In one of these embodiments, the client 102 receives authorization to execute the application files during a pre-defined period of time. In another of these embodiments, the client 102 receives authorization to execute the application files during the pre-defined period of time when the client 102 lacks access to a network. In other embodiments, the client stores the plurality of application files in a cache. In one of these embodiments, the application streaming client 552 establishes an internal application streaming session to retrieve the plurality of application files from the cache. In another of these embodiments, the client 102 receives authorization to execute the application files during a pre-defined period of time when the client 102 lacks access to a network.

The client 102 transmits at least one heartbeat message to a server (step 216). In some embodiments, the client 102 transmits the at least one heartbeat message to retain authorization to execute the plurality of application files comprising the enumerated application. In other embodiments, the client 102 transmits the at least one heartbeat message to retain authorization retrieve an application file in the plurality of application files. In still other embodiments, the client 102 receives a license authorizing execution of the plurality of application files during a pre-determined period of time.

In some embodiments, the client 102 transmits the heartbeat message to a second server 106"". In one of these embodiments, the second server 106"" may comprise a session management server 562 monitoring the retrieval and execution of the plurality of application files. In another of these embodiments, the second server 106"" may renew a license authorizing execution of the plurality of application files, responsive to the transmitted heartbeat message. In still another of these embodiments, the second server 106"" may transmit to the client 102 a command, responsive to the transmitted heartbeat message.

Referring back to FIG. 5, the client 102 may include an application streaming client 552, a streaming service 554 and an isolation environment 556.

The application streaming client 552 may be an executable program. In some embodiments, the application streaming client 552 may be able to launch another executable program. In other embodiments, the application streaming client 552 may initiate the streaming service 554. In one of these embodiments, the application streaming client 552 may provide the streaming service 554 with a parameter associated with executing an application program. In another of these embodiments, the application streaming client 552 may initiate the streaming service 554 using a remote procedure call.

In one embodiment, the client 102 requests execution of an application program and receives access information from a server 106 regarding execution. In another embodiment, the application streaming client 552 receives the access information. In still another embodiment, the application streaming client 552 provides the access information to the streaming service 554. In yet another embodiment, the access information includes an identification of a location of a file associated with a plurality of application files comprising the application program.

In one embodiment, the streaming service 554 retrieves a file associated with a plurality of application files. In some embodiments, the retrieved file includes an identification of a location of the plurality of application files. In one of these embodiments, the streaming service 554 retrieves the plurality of application files. In another of these embodiments, the streaming service 554 executes the retrieved plurality of application files on the client 102. In other embodiments, the streaming service 554 transmits heartbeat messages to a server to maintain authorization to retrieve and execute a plurality of application files.

In some embodiments, the retrieved file includes an identification of a location of more than one plurality of application files, each plurality of application files comprising a different application program. In one of these embodiments, the streaming service 554 retrieves the plurality of application files comprising the application program compatible with the client 102. In another of these embodiments, the streaming service 554 receives authorization to retrieve a particular plurality of application files, responsive to an evaluation of the client 102.

In some embodiments, the plurality of application files are compressed and stored on a file server within an archive file such as a CAB, ZIP, SIT, TAR, JAR or other archive file. In one embodiment, a plurality of application files stored in an archive file comprise an application program. In another embodiment, multiple pluralities of application files stored in an archive file each comprise different versions of an application program. In still another embodiment, multiple pluralities of application files stored in an archive file each comprise different application programs. In some embodiments, an archive file includes metadata associated with each file in the plurality of application files. In one of these embodiments, the streaming service 554 generates a directory structure responsive to the included metadata. As will be described in greater detail in connection with FIG. 12 below, the metadata may be used to satisfy requests by application programs for directory enumeration.

In one embodiment, the streaming service 554 decompresses an archive file to acquire the plurality of application files. In another embodiment, the streaming service 554 determines whether a local copy of a file within the plurality of application files exists in a cache on the client 102 prior to retrieving the file from the plurality of application files. In still another embodiment, the file system filter driver 564 determines whether the local copy exists in the cache. In some embodiments, the streaming service 554 modifies a registry entry prior to retrieving a file within the plurality of application files.

In some embodiments, the streaming service 554 stores a plurality of application files in a cache on the client 102. In one of these embodiments, the streaming service 554 may provide functionality for caching a plurality of application files upon receiving a request to cache the plurality of application files. In another of these embodiments, the streaming service 554 may provide functionality for securing a cache on the client 102. In another of these embodiments, the streaming service 554 may use an algorithm to adjust a size and a location of the cache.

In some embodiments, the streaming service 554 creates an isolation environment 556 on the client 102. In one of these embodiments, the streaming service 554 uses an isolation environment application programming interface to create the isolation environment 556. In another of these embodiments, the streaming service 554 stores the plurality of application files in the isolation environment 556. In still another of these embodiments, the streaming service 554 executes a file in the plurality of application files within the isolation environment. In yet another of these embodiments, the streaming service 554 executes the application program in the isolation environment.

For embodiments in which authorization is received to execute an application on the client 102, the execution of the application may occur within an isolation environment 556. In some embodiments, a plurality of application files comprising the application are stored on the client 102 prior to execution of the application. In other embodiments, a subset of the plurality of application files are stored on the client 102 prior to execution of the application. In still other embodiments, the plurality of application files do not reside in the isolation environment 556. In yet other embodiments, a subset of the plurality of applications files do not reside on the client 102. Regardless of whether a subset of the plurality of application files or each application file in the plurality of application files reside on the client 102 or in isolation environment 556, in some embodiments, an application file in the plurality of application files may be executed within an isolation environment 556.

The isolation environment 556 may consist of a core system able to provide File System Virtualization, Registry System Virtualization, and Named Object Virtualization to reduce application compatibility issues without requiring any change to the application source code. The isolation environment 556 may redirect application resource requests using hooking both in the user mode for registry and named object virtualization, and in the kernel using a file system filter driver for file system virtualization. The following is a description of some embodiments of an isolation environment 556.

Figure 8A:
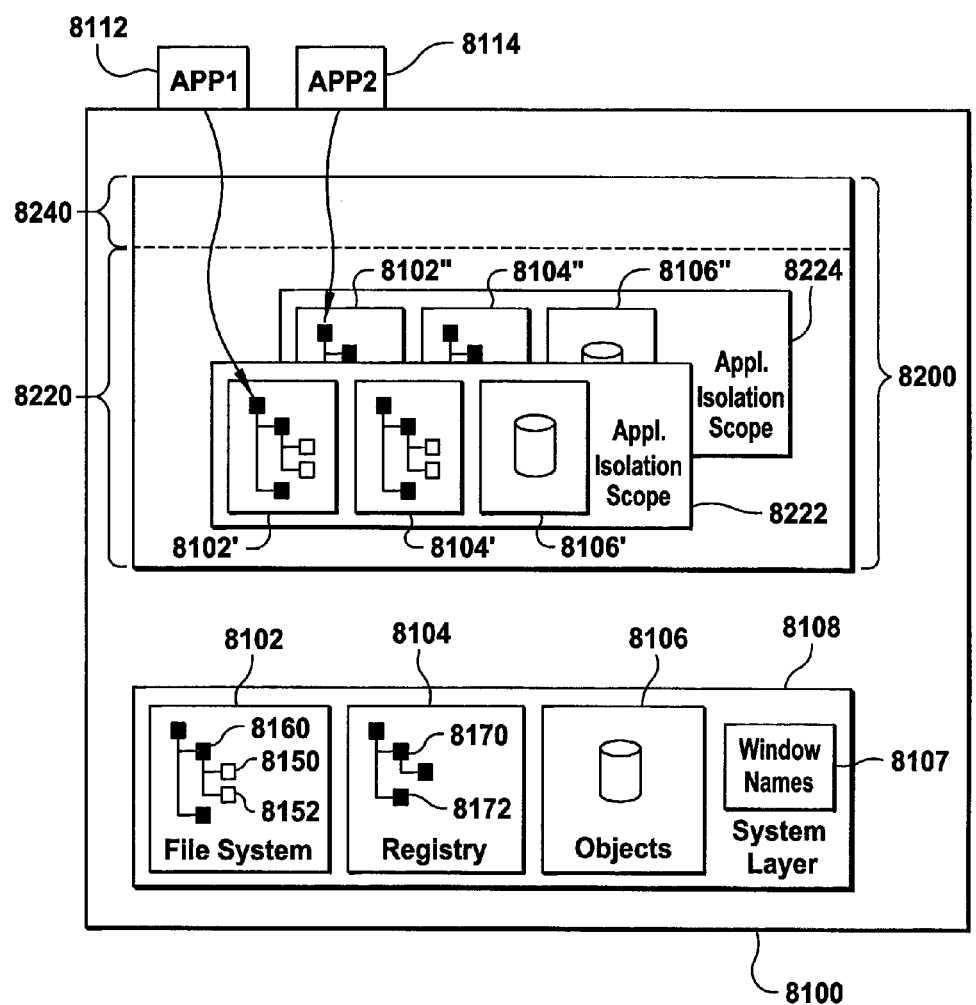
FIG. 8A is a block diagram depicting one embodiment of a computer running under control of an operating system that has reduced application compatibility and application sociability problems.

Referring now to FIG. 8A, one embodiment of a computer running under control of an operating system 8100 that has reduced application compatibility and application sociability problems is shown. The operating system 8100 makes available various native resources to application programs 8112, 8114 via its system layer 8108. The view of resources embodied by the system layer 8108 will be termed the "system scope". In order to avoid conflicting access to native resources 8102, 8104, 8106, 8107 by the application programs 8112, 8114, an isolation environment 8200 is provided. As shown in FIG. 8A, the isolation environment 8200 includes an application isolation layer 8220 and a user isolation layer 8240. Conceptually, the isolation environment 8200 provides, via the application isolation layer 8220, an application program 8112, 8114, with a unique view of native resources, such as the file system 8102, the registry 8104, objects 8106, and window names 8107. Each isolation layer modifies the view of native resources provided to an application. The modified view of native resources provided by a layer will be referred to as that layer's "isolation scope". As shown in FIG. 8A, the application isolation layer includes two application isolation scopes 8222, 8224. Scope 8222 represents the view of native resources provided to application 8112 and scope 8224 represents the view of native resources provided to application 8114. Thus, in the embodiment shown in FIG. 8A, APP1 8112 is provided with a specific view of the file system 8102', while APP2 8114 is provided with another view of the file system 8102" which is specific to it. In some embodiments, the application isolation layer 8220 provides a specific view of native resources 8102, 8104, 8106, 8107 to each individual application program executing on top of the operating system 8100. In other embodiments, application programs 8112, 8114 may be grouped into sets and, in these embodiments, the application isolation layer 8220 provides a specific view of native resources for each set of application programs. Conflicting application programs may be put into separate groups to enhance the compatibility and sociability of applications. In still further embodiments, the applications belonging to a set may be configured by an administrator. In some embodiments, a "passthrough" isolation scope can be defined which corresponds exactly to the system scope. In other words, applications executing within a passthrough isolation scope operate directly on the system scope.

In some embodiments, the application isolation scope is further divided into layered sub-scopes. The main sub-scope contains the base application isolation scope, and additional sub-scopes contain various modifications to this scope that may be visible to multiple executing instances of the application. For example, a sub-scope may contain modifications to the scope that embody a change in the patch level of the application or the installation or removal of additional features. In some embodiments, the set of additional sub-scopes that are made visible to an instance of the executing application is configurable. In some embodiments, that set of visible sub-scopes is the same for all instances of the executing application, regardless of the user on behalf of which the application is executing. In others, the set of visible sub-scopes may vary for different users executing the application. In still other embodiments, various sets of sub-scopes may be defined and the user may have a choice as to which set to use. In some embodiments, sub-scopes may be discarded when no longer needed. In some embodiments, the modifications contained in a set of sub-scopes may be merged together to form a single sub-scope.

Referring now to FIG. 8B, a multi-user computer having reduced application compatibility and application sociability problems is depicted. The multi-user computer includes native resources 8102, 8104, 8106, 8107 in the system layer 8108, as well as the isolation environment 8200 discussed immediately above. The application isolation layer 8220 functions as discussed above, providing an application or group of applications with a modified view of native resources. The user isolation layer 8240, conceptually, provides an application program 8112, 8114, with a view of native resources that is further altered based on user identity of the user on whose behalf the application is executed. As shown in FIG. 8B, the user isolation layer 8240 may be considered to comprise a number of user isolation scopes 8242', 8242'', 8242''', 8242'''', 8242''''', 8242'''''' (generally 8242). A user isolation scope 8242 provides a user-specific view of application-specific views of native resources. For example, APP1 8112 executing in user session 8110 on behalf of user "a" is provided with a file system view 8102'(*a*) that is altered or modified by both the user isolation scope 8242' and the application isolation scope 8222.

Put another way, the user isolation layer 8240 alters the view of native resources for each individual user by "layering" a user-specific view modification provided by a user isolation scope 8242' "on top of" an application-specific view modification provided by an application isolation scope 8222, which is in turn "layered on top of" the system-wide view of native resources provided by the system layer. For example, when the first instance of APP1 8112 accesses an entry in the registry database 8104, the view of the registry database specific to the first user session and the application 8104'(*a*) is consulted. If the requested registry key is found in the user-specific view of the registry 8104'(*a*), that registry key is returned to APP1 8112. If not, the view of the registry database specific to the application 8104' is consulted. If the requested registry key is found in the application-specific view of the registry 8104', that registry key is returned to APP1 8112. If not, then the registry key stored in the registry database 8104 in the system layer 8108 (i.e. the native registry key) is returned to APP1 8112.

In some embodiments, the user isolation layer 8240 provides an isolation scope for each individual user. In other embodiments, the user isolation layer 8240 provides an isolation scope for a group of users, which may be defined by roles within the organization or may be predetermined by an administrator. In still other embodiments, no user isolation layer 8240 is provided. In these embodiments, the view of native resources seen by an application program is that provided by the application isolation layer 8220. The isolation environment 8200, although described in relation to multi-user computers supporting concurrent execution of application programs by various users, may also be used on single-user computers to address application compatibility and sociability problems resulting from sequential execution of application programs on the same computer system by different users, and those problems resulting from installation and execution of incompatible programs by the same user.

In some embodiments, the user isolation scope is further divided into sub-scopes. The modifications by the user isolation scope to the view presented to an application executing in that scope is the aggregate of the modifications contained within each sub-scope in the scope. Sub-scopes are layered on top of each other, and in the aggregate view modifications to a resource in a higher sub-scope override modifications to the same resource in lower layers.

In some of these embodiments, one or more of these sub-scopes may contain modifications to the view that are specific to the user. In some of these embodiments, one or more sub-scopes may contain modifications to the view that are specific to sets of users, which may be defined by the system administrators or defined as a group of users in the operating system. In some of these embodiments, one of these sub-scopes may contain modifications to the view that are specific to the particular login session, and hence that are discarded when the session ends. In some of these embodiments, changes to native resources by application instances associated with the user isolation scope always affects one of these sub-scopes, and in other embodiments those changes may affect different sub-scopes depending on the particular resource changed.

The conceptual architecture described above allows an application executing on behalf of a user to be presented with an aggregate, or unified, virtualized view of native resources, specific to that combination of application and user. This aggregated view may be referred to as the "virtual scope". The application instance executing on behalf of a user is presented with a single view of native resources reflecting all operative virtualized instances of the native resources. Conceptually this aggregated view consists firstly of the set of native resources provided by the operating system in the system scope, overlaid with the modifications embodied in the application isolation scope applicable to the executing application, further overlaid with the modifications embodied in the user isolation scope applicable to the application executing on behalf of the user. The native resources in the system scope are characterized by being common to all users and applications on the system, except where operating system permissions deny access to specific users or applications. The modifications to the resource view embodied in an application isolation scope are characterized as being common to all instances of applications associated with that application isolation scope. The modifications to the resource view embodied in the user isolation scope are characterized as being common to all applications associated with the applicable application isolation scope that are executing on behalf of the user associated with the user isolation scope.

This concept can be extended to sub-scopes; the modifications to the resource view embodied in a user sub-scope are common to all applications associated with the applicable isolation sub-scope executing on behalf of a user, or group of users, associated with a user isolation sub-scope. Throughout this description it should be understood that whenever general reference is made to "scope," it is intended to also refer to sub-scopes, where those exist.

When an application requests enumeration of a native resource, such as a portion of the file system or registry database, a virtualized enumeration is constructed by first enumerating the "system-scoped" instance of the native resource, that is, the instance found in the system layer, if any. Next, the "application-scoped" instance of the requested resource, that is the instance found in the appropriate application isolation scope, if any, is enumerated. Any enumerated resources encountered in the application isolation scope are added to the view. If the enumerated resource already exists in the view (because it was present in the system scope, as well), it is replaced with the instance of the resource encountered in the application isolation scope. Similarly, the "user-scoped" instance of the requested resource, that is the instance found in the appropriate user isolation scope, if any, is enumerated. Again, any enumerated resources encountered in the user isolation scope are added to the view. If the native resource already exists in the view (because it was present in the system scope or in the appropriate application isolation scope), it is replaced with the instance of the resource encountered in the user isolation scope. In this manner, any enumeration of native resources will properly reflect virtualization of the enumerated native resources. Conceptually the same approach applies to enumerating an isolation scope that comprises multiple sub-scopes. The individual sub-scopes are enumerated, with resources from higher sub-scopes replacing matching instances from lower sub-scopes in the aggregate view.

In other embodiments, enumeration may be performed from the user isolation scope layer down to the system layer, rather than the reverse. In these embodiments, the user isolation scope is enumerated. Then the application isolation scope is enumerated and any resource instances appearing in the application isolation scope that were not enumerated in the user isolation scope are added to the aggregate view that is under construction. A similar process can be repeated for resources appearing only in the system scope.

In still other embodiments, all isolation scopes may be simultaneously enumerated and the respective enumerations combined.

If an application attempts to open an existing instance of a native resource with no intent to modify that resource, the specific instance that is returned to the application is the one that is found in the virtual scope, or equivalently the instance that would appear in the virtualized enumeration of the parent of the requested resource. From the point of view of the isolation environment, the application is said to be requesting to open a "virtual resource", and the particular instance of native resource used to satisfy that request is said to be the "literal resource" corresponding to the requested resource.

If an application executing on behalf of a user attempts to open a resource and indicates that it is doing so with the intent to modify that resource, that application instance is normally given a private copy of that resource to modify, as resources in the application isolation scope and system scope are common to applications executing on behalf-of other users. Typically a user-scoped copy of the resource is made, unless the user-scoped instance already exists. The definition of the aggregate view provided by a virtual scope means that the act of copying an application-scoped or system-scoped resource to a user isolation scope does not change the aggregate view provided by the virtual scope for the user and application in question, nor for any other user, nor for any other application instance. Subsequent modifications to the copied resource by the application instance executing on behalf of the user do not affect the aggregate view of any other application instance that does not share the same user isolation scope. In other words, those modifications do not change the aggregate view of native resources for other users, or for application instances not associated with the same application isolation scope.

Applications may be installed into a particular isolation scope (described below in more detail). Applications that are installed into an isolation scope are always associated with that scope. Alternatively, applications may be launched into a particular isolation scope, or into a number of isolation scopes. In effect, an application is launched and associated with one or more isolation scopes. The associated isolation scope, or scopes, provide the process with a particular view of native resources. Applications may also be launched into the system scope, that is, they may be associated with no isolation scope. This allows for the selective execution of operating system applications such as Internet Explorer, as well as third party applications, within an isolation environment.

This ability to launch applications within an isolation scope regardless of where the application is installed mitigates application compatibility and sociability issues without requiring a separate installation of the application within the isolation scope. The ability to selectively launch installed applications in different isolation scopes provides the ability to have applications which need helper applications (such as Word, Notepad, etc.) to have those helper applications launched with the same rule sets.

Further, the ability to launch an application within multiple isolated environments allows for better integration between isolated applications and common applications.

Figure 8C:
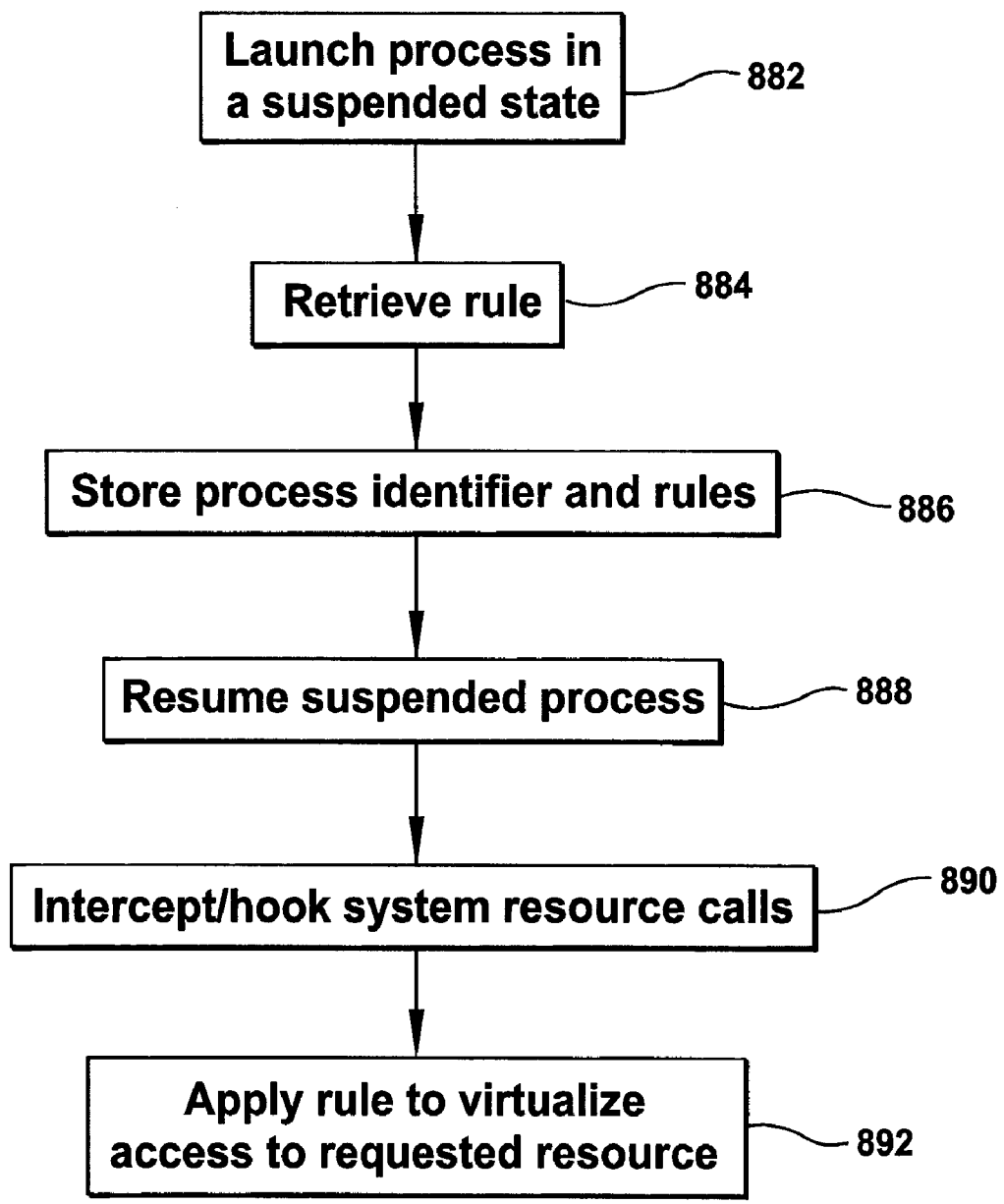
FIG. 8C is a flow diagram depicting one embodiment of the steps taken in a method for associating a process with an isolation scope.

Referring now to FIG. 8C, and in brief overview, a method for associating a process with an isolation scope includes the steps of launching the process in a suspended state (step 882). The rules associated with the desired isolation scope are retrieved (step 884) and an identifier for the process and the retrieved rules are stored in a memory element (step 886) and the suspended process is resumed (step 888). Subsequent calls to access native resources made by the process are intercepted or hooked (step 890) and the rules associated with the process identifier, if any, are used to virtualize access to the requested resource (step 892).

Still referring to FIG. 8C, and in more detail, a process is launched in a suspended state (step 882). In some embodiments, a custom launcher program is used to accomplish this task. In some of these embodiments, the launcher is specifically designed to launch a process into a selected isolation scope. In other embodiments, the launcher accepts as input a specification of the desired isolation scope, for example, by a command line option.

The rules associated with the desired isolation scope are retrieved (step 884). In some embodiments, the rules are retrieved from a persistent storage element, such as a hard disk drive or other solid state memory element. The rules may be stored as a relational database, flat file database, tree-structured database, binary tree structure, or other persistent data structure. In other embodiments, the rules may be stored in a data structure specifically configured to store them.

An identifier for the process, such as a process id (PID), and the retrieved rules are stored in a memory element (step 886). In some embodiments, a kernel mode driver is provided that receives operating system messages concerning new process creation. In these embodiments, the PID and the retrieved rules may be stored in the context of the driver. In other embodiments, a file system filter driver, or mini-filter, is provided that intercepts native resource requests. In these embodiments, the PID and the retrieved rules may be stored in the filter. In other embodiments still, all interception is performed by user-mode hooking and no PID is stored at all. The rules are loaded by the user-mode hooking apparatus during the process initialization, and no other component needs to know the rules that apply to the PID because rule association is performed entirely in-process.

The suspended process is resumed (step 888) and subsequent calls to access native resources made by the process are intercepted or hooked (step 890) and the rules associated with the process identifier, if any, are used to virtualize access to the requested resource (step 892). In some embodiments, a file system filter driver, or mini-filter, or file system driver, intercepts requests to access native resources and determines if the process identifier associated with the intercepted request has been associated with a set of rules. If so, the rules associated with the stored process identifier are used to virtualize the request to access native resources. If not, the request to access native resources is passed through unmodified. In other embodiments, a dynamically-linked library is loaded into the newly-created process and the library loads the isolation rules. In still other embodiments, both kernel mode techniques (hooking, filter driver, mini-filter) and user-mode techniques are used to intercept calls to access native resources. For embodiments in which a file system filter driver stores the rules, the library may load the rules from the file system filter driver.

Processes that are "children" of processes associated with isolation scopes are associated with the isolation scopes of their "parent" process. In some embodiments, this is accomplished by a kernel mode driver notifying the file system filter driver when a child process is created. In these embodiments, the file system filter driver determines if the process identifier of the parent process is associated with an isolation scope. If so, file system filter driver stores an association between the process identifier for the newly-created child process and the isolation scope of the parent process. In other embodiments, the file system filter driver can be called directly from the system without use of a kernel mode driver. In other embodiments, in processes that are associated with isolation scopes, operating system functions that create new processes are hooked or intercepted. When request to create a new process are received from such a process, the association between the new child process and the isolation scope of the parent is stored.

In some embodiments, a scope or sub-scope may be associated with an individual thread instead of an entire process, allowing isolation to be performed on a per-thread basis. In some embodiments, per-thread isolation may be used for Services and COM+ servers.

In some embodiments, isolation environments are used to provide additional functionality to the application streaming client 552. In one of these embodiments, an application program is executed within an isolation environment. In another of these embodiments, a retrieved plurality of application files resides within the isolation environment. In still another of these embodiments, changes to a registry on the client 810 are made within the isolation environment.

In one embodiment, the application streaming client 552 includes an isolation environment 556. In some embodiments, the application streaming client 552 includes a file system filter driver 564 intercepting application requests for files. In one of these embodiments, the file system filter driver 564 intercepts an application request to open an existing file and determines that the file does not reside in the isolation environment 556. In another of these embodiments, the file system filter driver 564 redirects the request to the streaming service 554 responsive to a determination that the file does not reside in the isolation environment 556. The streaming service 554 may extract the file from the plurality of application files and store the file in the isolation environment 556. The file system filter driver 564 may then respond to the request for the file with the stored copy of the file. In some embodiments, the file system filter driver 564 may redirect the request for the file to a file server 540, responsive to an indication that the streaming service 554 has not retrieved the file or the plurality of application files and a determination the file does not reside in the isolation environment 556.

In some embodiments, the file system filter driver 564 uses a strict isolation rule to prevent conflicting or inconsistent data from appearing in the isolation environment 556. In one of these embodiments, the file system filter driver 564 intercepting a request for a resource in a user isolation environment may redirect the request to an application isolation environment. In another of these embodiments, the file system filter driver 564 does not redirect the request to a system scope.

In one embodiment, the streaming service 554 uses IOCTL commands to communicate with the filter driver. In another embodiment, communications to the file server 540 are received with the Microsoft SMB streaming protocol.

In some embodiments, the packaging mechanism 530 stores in a manifest file a list of file types published as available applications and makes this information available to application publishing software. In one of these embodiments, the packaging mechanism 530 receives this information from monitoring an installation of an application program into the isolation environment on the staging machine. In another of these embodiments, a user of the packaging mechanism 530 provides this information to the packaging mechanism 530. In other embodiments, application publishing software within the access suite console 520 consults the manifest file to present to a user of the access suite console 520 the possible file types that can be associated with the requested application being published. The user selects a file type to associate with a particular published application. The file type is presented to the client 102 at the time of application enumeration.

The client 102 may include a client agent 560. The client agent 560 provides functionality for associating a file type with an application program and selecting a method of execution of the application program responsive to the association. In one embodiment, the client agent 560 is a program neighborhood application.

When an application program is selected for execution, the client 102 makes a determination as to a method of execution associated with a file type of the application program. In one embodiment, the client 102 determines that the file type is associated with a method of execution requiring an application streaming session for retrieval of the application files and execution within an isolation environment. In this embodiment, the client 102 may redirect the request to the application streaming client 552 instead of launching a local version of the application program. In another embodiment, the client agent 560 makes the determination. In still another embodiment, the client agent 560 redirects the request to the application streaming client 552.

In one embodiment, the application streaming client 552 requests access information associated with the application program from the server 106. In some embodiments, the application streaming client 552 receives an executable program containing the access information. In one of these embodiments, the application streaming client 552 receives an executable program capable of displaying on the client 102 application-output data generated from an execution of the application program on a server. In another of these embodiments, the application streaming client 552 receives an executable program capable of retrieving the application program across an application streaming session and executing the application program in an isolation environment on the client 102. In this embodiment, the application streaming client 552 may execute the received executable program. In still another of these embodiments, the server 106 selects an executable program to provide to the client 102 responsive to performing an application resolution as described above.

Figure 9:
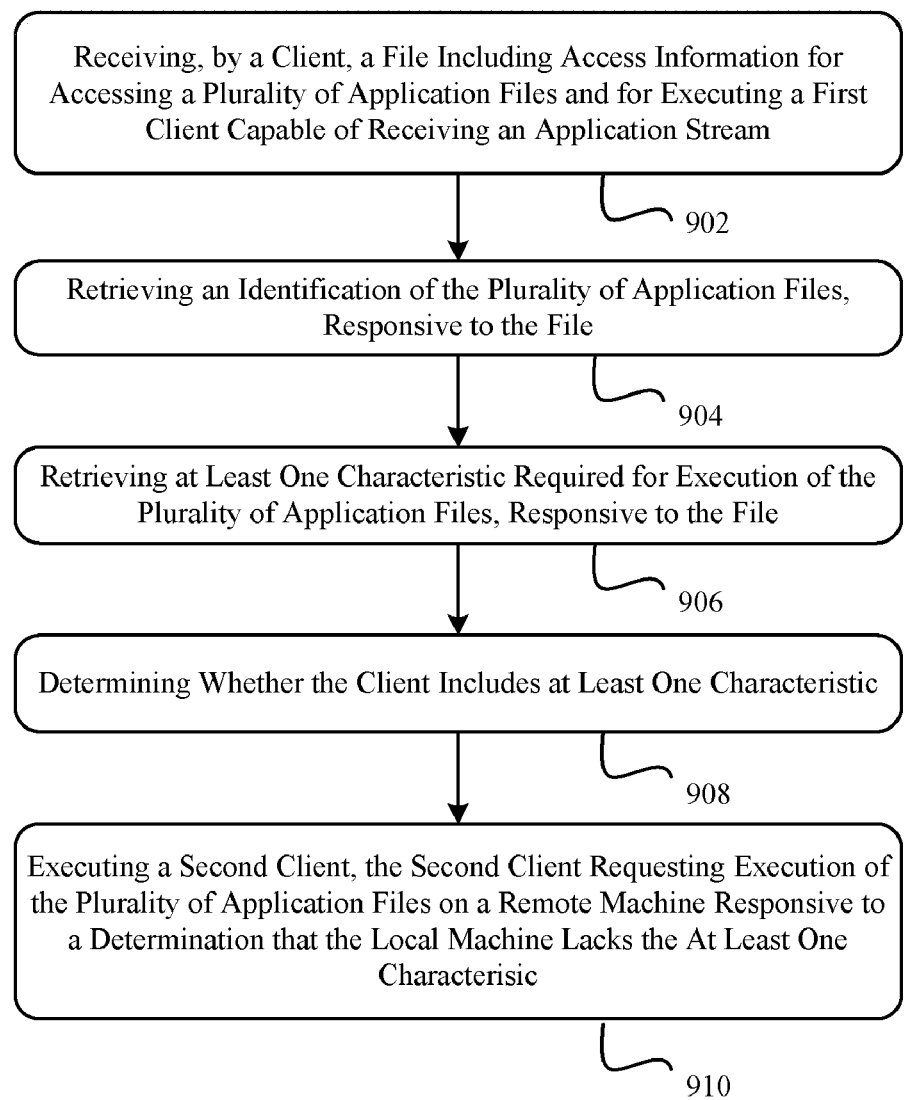
FIG. 9 is a flow diagram depicting one embodiment of steps taken in a method for executing an application program.

Referring now to FIG. 9, a flow diagram depicts one embodiment of steps taken in a method for executing an application. As described above in FIG. 7, regarding step 214, a client 102 receives and executes the plurality of application files. In brief overview, the client 102 receives a file including access information for accessing a plurality of application files and for executing a first client capable of receiving an application stream (step 902). The client 102 retrieves an identification of the plurality of application files, responsive to the file (step 904). The client 102 retrieves at least one characteristic required for execution of the plurality of application files, responsive to the file (step 906). The client 102 determines whether the client 102 includes the at least one characteristic (step 908). The client 102 executes a second client, the second client requesting execution of the plurality of application files on a server, responsive to a determination that the client 102 lacks the at least one characteristic (step 910).

Referring to FIG. 9, and in greater detail, the client 102 receives a file including access information for accessing a plurality of application files and for executing a first client capable of receiving an application stream (step 902). In one embodiment, the client 102 receives access information including an identification of a location of a plurality of application files comprising an application program. In another embodiment, the client 102 receives the file responsive to requesting execution of the application program. In still another embodiment, the access information includes an indication that the plurality of application files reside on a server 106' such as an application server or a file server. In yet another embodiment, the access information indicates that the client 102 may retrieve the plurality of application files from the server 106 over an application streaming session.

The client 102 retrieves an identification of the plurality of application files, responsive to the file (step 904). In one embodiment, the client 102 identifies a server on which the plurality of application files reside, responsive to the file including access information. In another embodiment, the client 102 retrieves from the server 106 a file identifying the plurality of application files. In some embodiments, the plurality of application files comprise an application program. In other embodiments, the plurality of application files comprise multiple application programs. In still other embodiments, the plurality of application files comprise multiple versions of a single application program.

Figure 10:
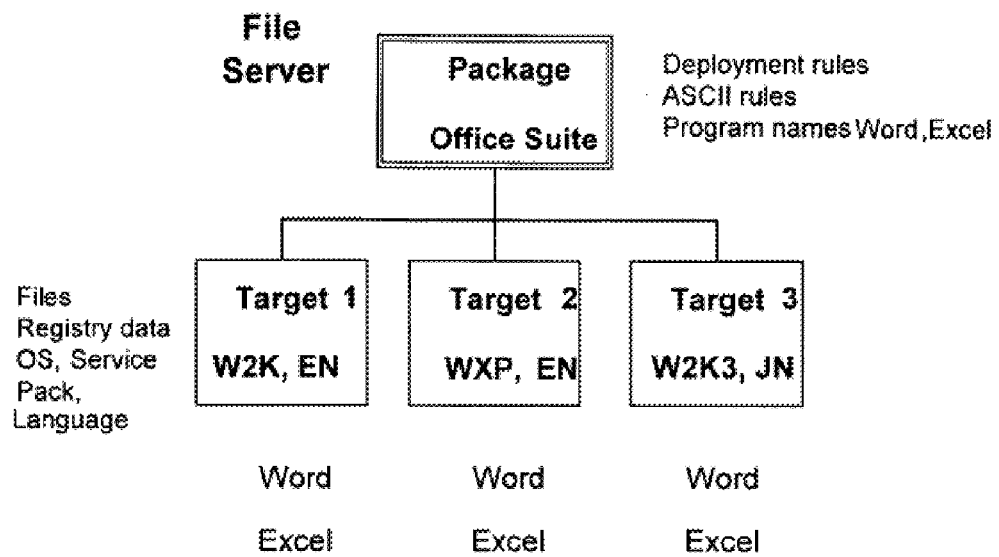
FIG. 10 is a flow diagram depicting one embodiment of a plurality of application files residing on a server.
Figure 11:
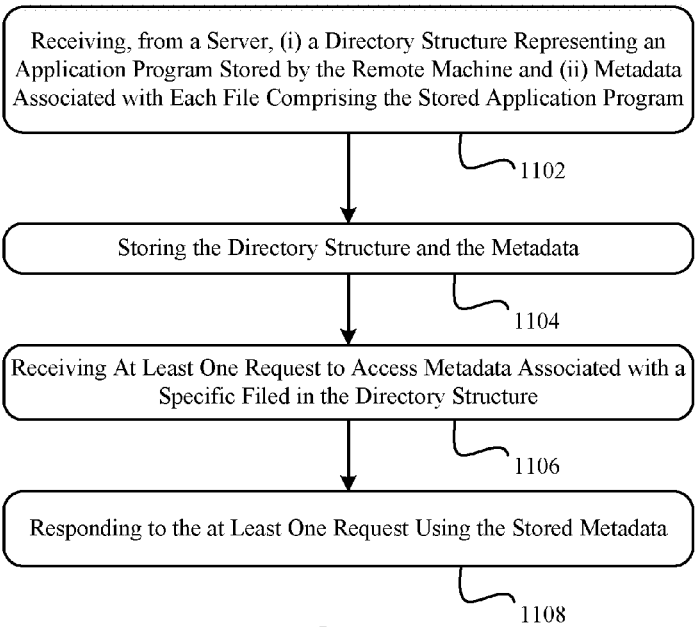
FIG. 11 is a flow diagram depicting one embodiment of the steps taken in a method for responding locally to requests for file metadata associated with files stored remotely.

Referring ahead to FIG. 10, a flow diagram depicts one embodiment of a plurality of application files residing on a server 106', such as file server 540. In FIG. 10, a plurality of application files, referred to as a package, includes application files comprising three different versions of one or more application programs.

In one embodiment, each subset of application files comprising a version of one or more application programs and stored within the package is referred to as a target. Target 1, for example, includes a version of a word processing application program and of a spreadsheet program, the version compatible with the English language version of the Microsoft Windows 2000 operating system. Target 2 includes a version of a word processing application program and of a spreadsheet program, the version compatible with the English language version of the Microsoft XP operating system. Target 3 a version of a word processing application program and of a spreadsheet program, the version compatible with the Japanese language version of the Microsoft Windows 2000 operating system with service pack 3.

Returning now to FIG. 9, in some embodiments, the file retrieved from the server 106 hosting the plurality of application files includes a description of the package and the targets included in the plurality of application files. In other embodiments, the file retrieved from the server 106 identifies the plurality of application files comprising an application program requested for execution by the client 102.

The client 102 retrieves at least one characteristic required for execution of the plurality of application files, responsive to the file (step 906). In some embodiments, the client 102 may not execute an application program unless the client includes certain characteristics. In one of these embodiments, different application programs require clients 10 to include different characteristics from the characteristics required by other application programs. In another of these embodiments, the client 102 receives an identification of the at least one characteristic required for execution of the plurality of application files comprising the application program requested by the client 102.

The client determines whether the client 102 includes the at least one characteristic (step 908). In one embodiment, the client 102 evaluates an operating system on the client 102 to determine whether the client 102 includes the at least one characteristic. In another embodiment, the client 102 identifies a language used by an operating system on the client 102 to determine whether the client 102 includes the at least one characteristic. In still another embodiment, the client 102 identifies a revision level of an operating system on the client 102 to determine whether the client 102 includes the at least one characteristic. In yet another embodiment, the client 102 identifies an application version of an application program residing on the client 102 to determine whether the client 102 includes the at least one characteristic. In some embodiments, the client 102 determines whether the client 102 includes a device driver to determine whether the client 102 includes the at least one characteristic. In other embodiments, the client 102 determines whether the client 102 includes an operating system to determine whether the client 102 includes the at least one characteristic. In still other embodiments, the client 102 determines whether the client 102 includes a license to execute the plurality of application files to determine whether the client 102 includes the at least one characteristic.

The client 102 executes a second client, the second client requesting execution of the plurality of application files on a server 106, responsive to a determination that the client 102 lacks the at least one characteristic (step 910). In one embodiment, when the client 102 determines that the client 102 lacks the at least one characteristic, the client 102 does not execute the first client capable of receiving an application stream. In another embodiment, a policy prohibits the client 102 from receiving the plurality of application files over an application stream when the client 102 lacks the at least one characteristic. In some embodiments, the client 102 determines that the client 102 does include the at least one characteristic. In one of these embodiments, the client 102 executes the first client, the first client receiving an application stream comprising the plurality of application files from a server 106 for execution on the client.

In some embodiments, the client 102 executes the second client requesting execution of the plurality of application files on a server upon determining that the client 102 lacks the at least one characteristic. In one of these embodiments, the second client transmits the request to a server 106 hosting the plurality of application files. In another of these embodiments, the server 106 executes the plurality of application files comprising the application program and generates application-output data. In still another of these embodiments, the second client receives application-output data generated by execution of the plurality of application files on the server. In some embodiments, the second client receives the application-output data via an Independent Computing Architecture presentation level protocol or a Remote Desktop Windows presentation level protocol or an X-Windows presentation level protocol. In yet another of these embodiments, the second client displays the application-output on the client 102.

In some embodiments, the second client transmits the request to a server 106 that does not host the plurality of application files. In one of these embodiments, the server 106 may request the plurality of application files from a second server 106 hosting the plurality of application files. In another of these embodiments, the server 106 may receive the plurality of application files from the second server 106 across an application streaming session. In still another of these embodiments, the server 106 stores the received plurality of application files in an isolation environment and executes the application program within the isolation environment. In yet another of these embodiments, the server transmits the generated application-output data to the second client on the client.

Referring back to FIG. 5, in one embodiment, the first client, capable of receiving the application stream, is an application streaming client 552. The application streaming client 552 receiving the file, retrieving an identification of a plurality of application files and at least one characteristic required for execution of the plurality of application files, responsive to the file, and determining whether the client 102 includes the at least one characteristic. In another embodiment, the second client is a client agent 560. In some embodiments, the client agent 560 receives the file from the application streaming client 552 responsive to a determination, by the application streaming client 552, that the client 102 lacks the at least one characteristic.

In some embodiments, an application 566 executing on the client 102 enumerates files associated with the application 566 using the Win32 FindFirstFile( ) and FindNextFile( ) API calls. In one of these embodiments, a plurality of application files comprise the application 566. In another of these embodiments, not all files in the plurality of application files reside on the client 102. In still another of these embodiments, the streaming service 554 retrieved the plurality of application file in an archived files but extracted only a subset of the plurality of application files. In yet another of these embodiments, the streaming service 554 and the file system filter driver 564 provide functionality for satisfying the enumeration request, even when the requested file does not reside on the client 102.

In one embodiment, the functionality is provided by intercepting the enumeration requests and providing the data as if all files in the plurality of application files reside on the client 102. In another embodiment, the functionality is provided by intercepting, by the file system filter driver 564, an enumeration request transmitted as an IOCTL command, such as IRP_MJ_DIRECTORY_CONTROL IOCTL. When the file system filter driver 564 intercepts the call, the file system filter driver 564 redirects the request to the streaming service 554. In one embodiment, the file system filter driver 564 determines that the requested enumeration resides in an isolation environment on the client 102 prior to redirecting the request to the streaming service 554. In another embodiment, the streaming service 554 fulfills the request using a file in the plurality of application files, the file including an enumeration of a directory structure associated with the plurality of application files. In still another embodiment, the streaming service 554 provides the response to the request to the file system filter driver 564 for satisfaction of the enumeration request.

Figure 12:
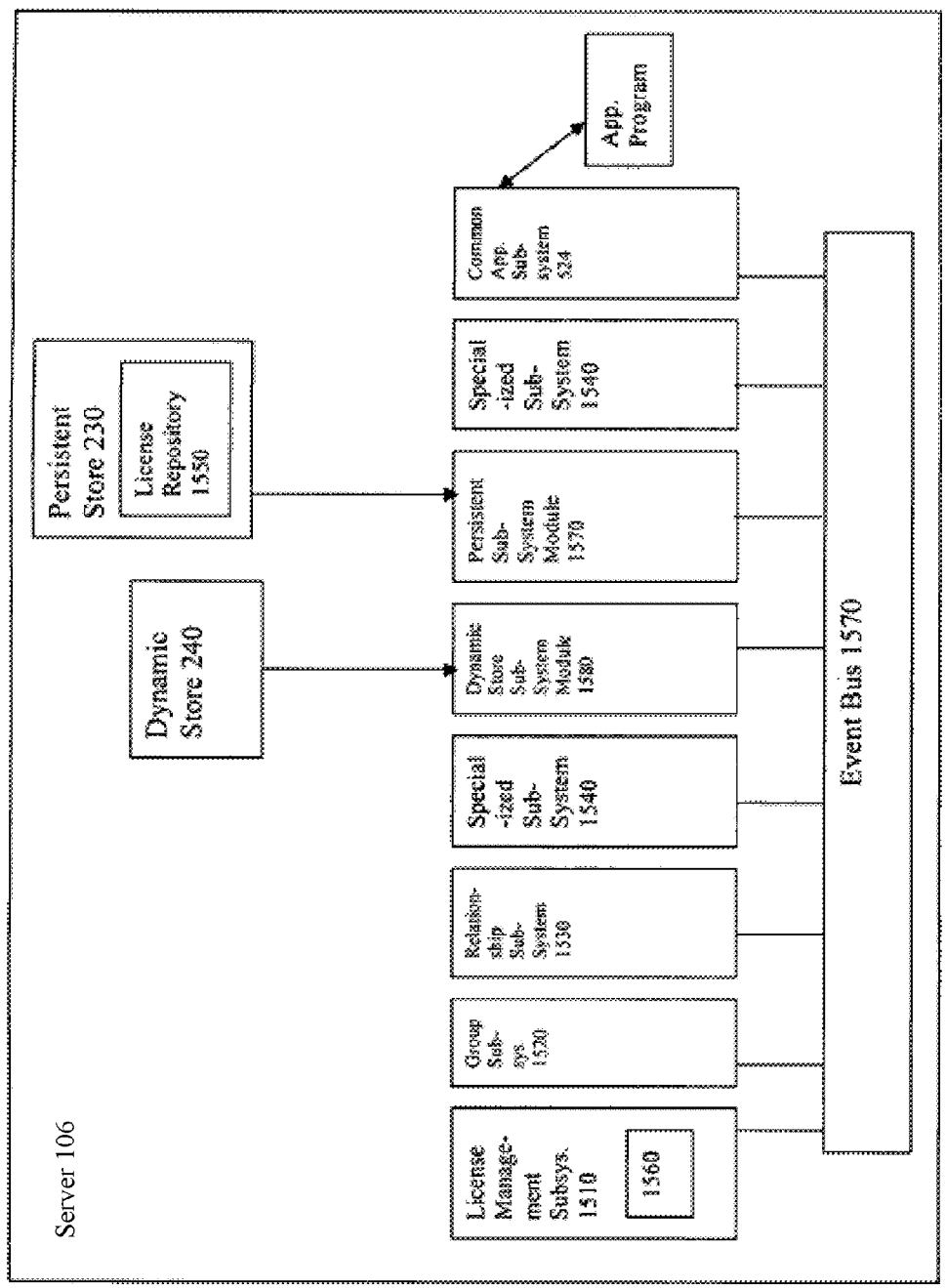
FIG. 12 is a block diagram of one embodiment of a server including a license management subsystem.

FIG. 12 shows one embodiment of the server 106 in the farm 38 in which the server 106 includes a license management subsystem 1510, a group subsystem 1520, a persistent store system service module 1570, a dynamic store system service module 1580, a relationship subsystem 1530, a specialized server subsystem 1540, and a common access point subsystem 524 in communication with an event bus 1570. Those subsystems shown in FIG. 12 are for purposes of describing the behavior of the license management subsystem 1510. The server 106 can include other types of subsystems.

The license management subsystem 1510 communicates with the group subsystem 1520 over an event bus to form and maintain a logical grouping of licenses (hereafter, "license groups") to facilitate license pools, assignments, and groups. A license group includes a collection of license strings, described below, and/or other license groups. License groups collect licenses of similar features and consequently enable pooling of licenses. A pooled license is a license that is available for use by any server 106 in the farm 38. Each license group holds the collective capabilities of the licenses in the license group and the other license subgroups (i.e. other license groups within a license group). Information relating to license pools is, in one embodiment, maintained in the dynamic store 240. In this embodiment, each license management subsystem 1610 stores locally the total number of licenses and the number of license assigned to a server 106 in the farm 38. Upon granting a pooled license, the granting license management subsystem 1510 makes an entry in the dynamic store 240 indicating that a pooled license is "in use." Every other license management subsystem 1510 recognizes that such pooled license is unavailable for granting. In one particular embodiment, the dynamic store 240 store server ID/client ID pairs associated with each license group to identify pooled licenses that are in use.

The relationship subsystem 1530 maintains associations between licenses and servers 106 and between license groups and servers 106. The associations define the number of licenses for each license and license group that only the associated server 106 may obtain (i.e., "local licenses"). A local license is a license that is assigned to one server in the farm 38 and is not shared by other servers 38. The license management subsystem 1510 communicates with the relationship subsystem 1530 to create, delete, query, and update such associations. The common access point subsystem 524 provides remote procedure calls (RPCs) for use by software products residing on the server 106. These RPC interfaces enable such software products to communicate through the common access subsystem 524 to access licensing information.

Figure 15:
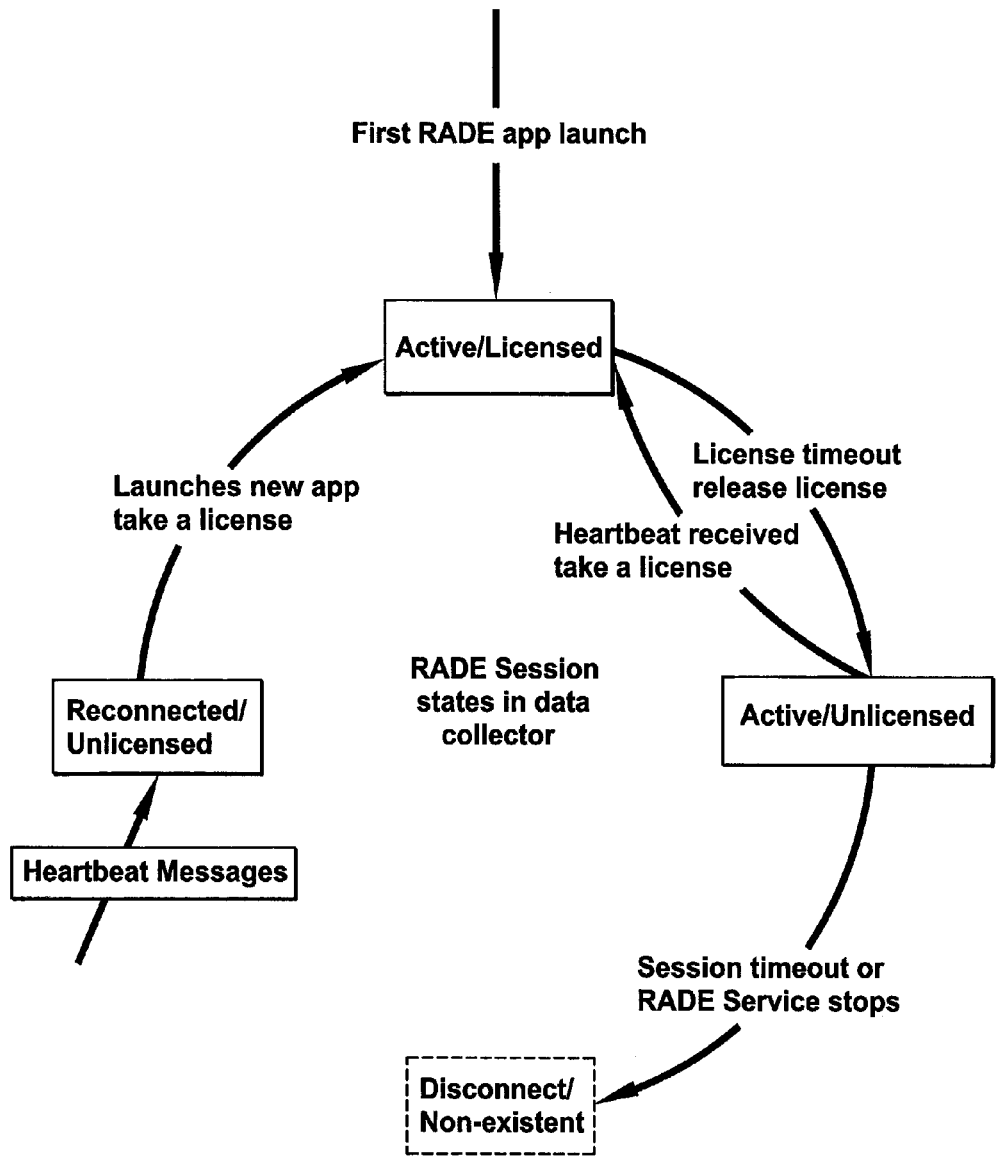
FIG. 15 is a block diagram depicting one embodiment of states that may be associated with a session monitored by a management service.

Still referring to FIG. 15, the specialized server subsystem 1540 communicates with the license management subsystem 1510 to obtain a feature license for each capability of the specialized server subsystem 1540 for which a license is required. This occurs at initialization of specialized server subsystem 1540 and after any license event. If unable to obtain the feature license, the specialized server subsystem 1540 restricts the functionality that the subsystem would provide with a license. Also, the specialized server subsystem 1540 uses the license management subsystem 1510 to obtain client connection licenses whenever a client session is initiated with the server 106.

The license management subsystem 1510 communicates with the persistent store system service module 352 to store feature and connection licenses in a license repository 1550 as license strings formed in accordance with a naming convention. The license repository 1550 resides in the persistent store 230. Cyclical redundancy checks (CRC) prevent tampering of the licenses while such licenses are stored in the license repository 1550. The license management subsystem 1510 also stores information related to the license strings in the license repository 1550. For example, the information may indicate which licenses are assigned to which servers 106 of the farm 38 and, in some embodiments, the activation status of each license. In one embodiment, a connection license table 1560 stores identifiers of those clients that have obtained a connection license.

In one embodiment, the license management subsystem 1510 supports events from subsystems requesting use of a licensed capability, such as a request for an available pooled license. The event includes the UID of the subsystem requesting the license and the UID of the server 106 upon which that subsystem resides. The event also contains the license type requested (i.e., feature or connection license) in the form of a license group ID. The actual license group ID stored in the persistent store 230 is arbitrary, but adherence to the naming convention provides flexibility for the future addition of new software products (i.e., subsystems) to the server 106.

The event sent by a requesting subsystem seeking a license includes (1) an indication of the license group type, the identity of the client and server requesting the license, and a "force acquire" flag. An indication of license group type may include identification of a feature license, such as a load management, or a connection type license, such as a software application product. The field identifying the client and server seeking the license may include the unique identifier associated with the server and the client. The force acquire flag may be used, for example, to reacquire connection licenses after a license change event. A license change event indicates that licensing information in the persistent store 230 has changed; for example, a license has been deleted, added, or assigned. Upon a license change event, each server 106 attempts to reacquire all connection licenses that it possessed before the license change event because the particular cause of the license change event is unknown to that server. This flag, if set, indicates that a connection license must be acquired even if doing so increases the number of connections to the server 106 in excess of the predetermined maximum number of allowable connections. No new connection licenses are subsequently granted until the number of connection licenses in use drops below this predetermined maximum number. In this manner, a client connection will not be terminated in mid-session due to a license change event.

Figure 13:
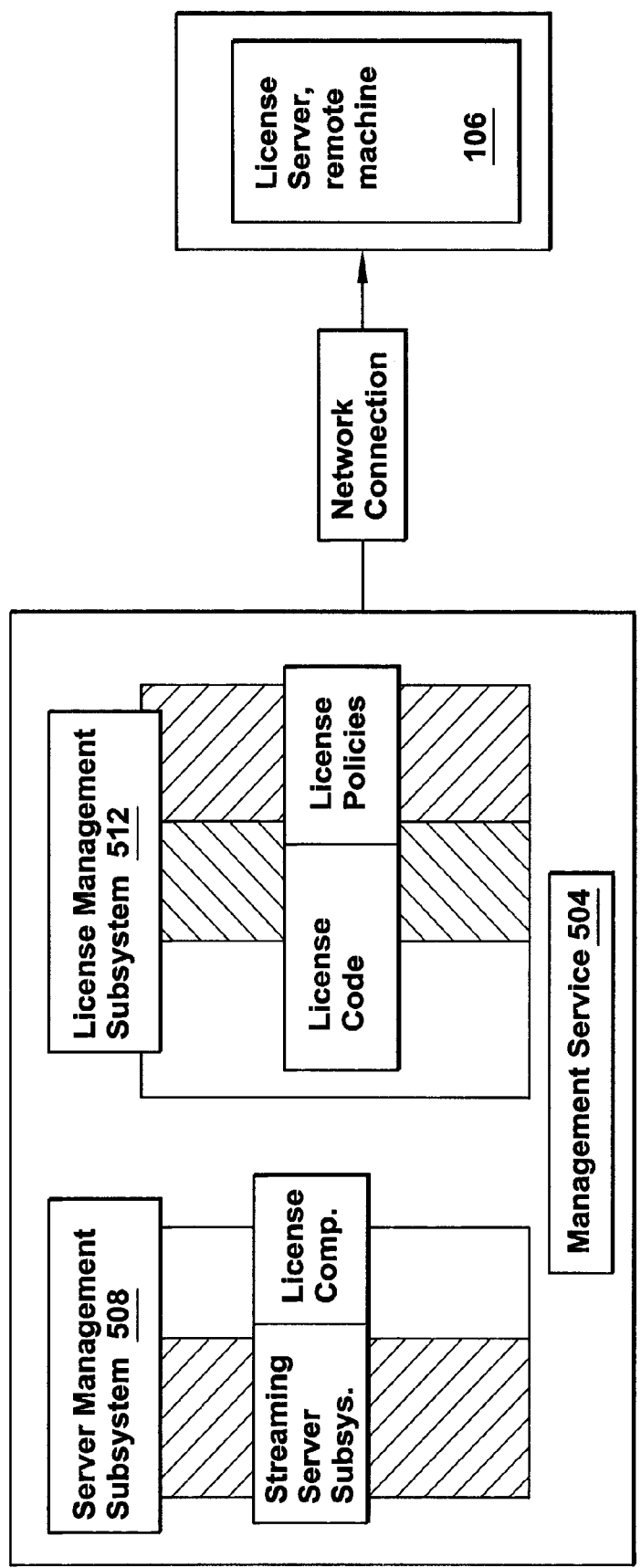
FIG. 13 is a block diagram depicting one embodiment of components in a management service on a server.

Referring now to FIG. 13, a block diagram depicts one embodiment of the components involved in licensing enforcement. A server 106 includes a server management subsystem 508 and a license management subsystem 512. In some embodiments, the server management subsystem 508 and the license management subsystem 512 provide the functionality of the license management subsystem 1510 described above. In other embodiments, an application management subsystem 506 and a session management subsystem 510 provide the functionality of the license management subsystem 1510 described above. In still other embodiments, other subsystems provide the functionality of the license management subsystem 1510 described above.

In one embodiment, the server management subsystem 508 may include a licensing component used to request issuance and revocation of licenses. In another embodiment, the license management subsystem 512 may apply a policy to a request for issuance or revocation of a license received from the server management subsystem 508. In still another embodiment, the license management subsystem 512 may transmit the request to a server 106 providing license enforcement functionality. In some embodiments, the management service 504 may maintain a connection with a second server 106 providing license enforcement functionality. In other embodiments, the server 106 provides the license enforcement functionality.

In some embodiments, a license expires and ceases to be valid upon a failure of the client 102 to transmit a predetermined number of heartbeat messages to the server. In one of these embodiments, expiration of the license revokes authorization for execution of an application program by the client 102.

In other embodiments, a session times out upon the expiration of a predetermined period of time. In one embodiment, the management service 504 maintains session-related data after the expiration of a license until an expiration of a session. In some embodiments, the session-related data may include information such as session name, session id, client id, client name, session start time, server name (UNC Path of File Server), application name (Unique name generated by client, based on browser name), alias name, session state (active/licensed, active/unlicensed, reconnected/unlicensed). In another embodiment, the client 102 ceases transmission of heartbeat messages and restarts transmission of heartbeat messages at a later point in time. In still another embodiment, the management service 504 may reissue a license and make the maintained session-related data available to the client 102 if the client 102 restarts transmission of heartbeat messages prior to the expiration of the session.

Figure 14:
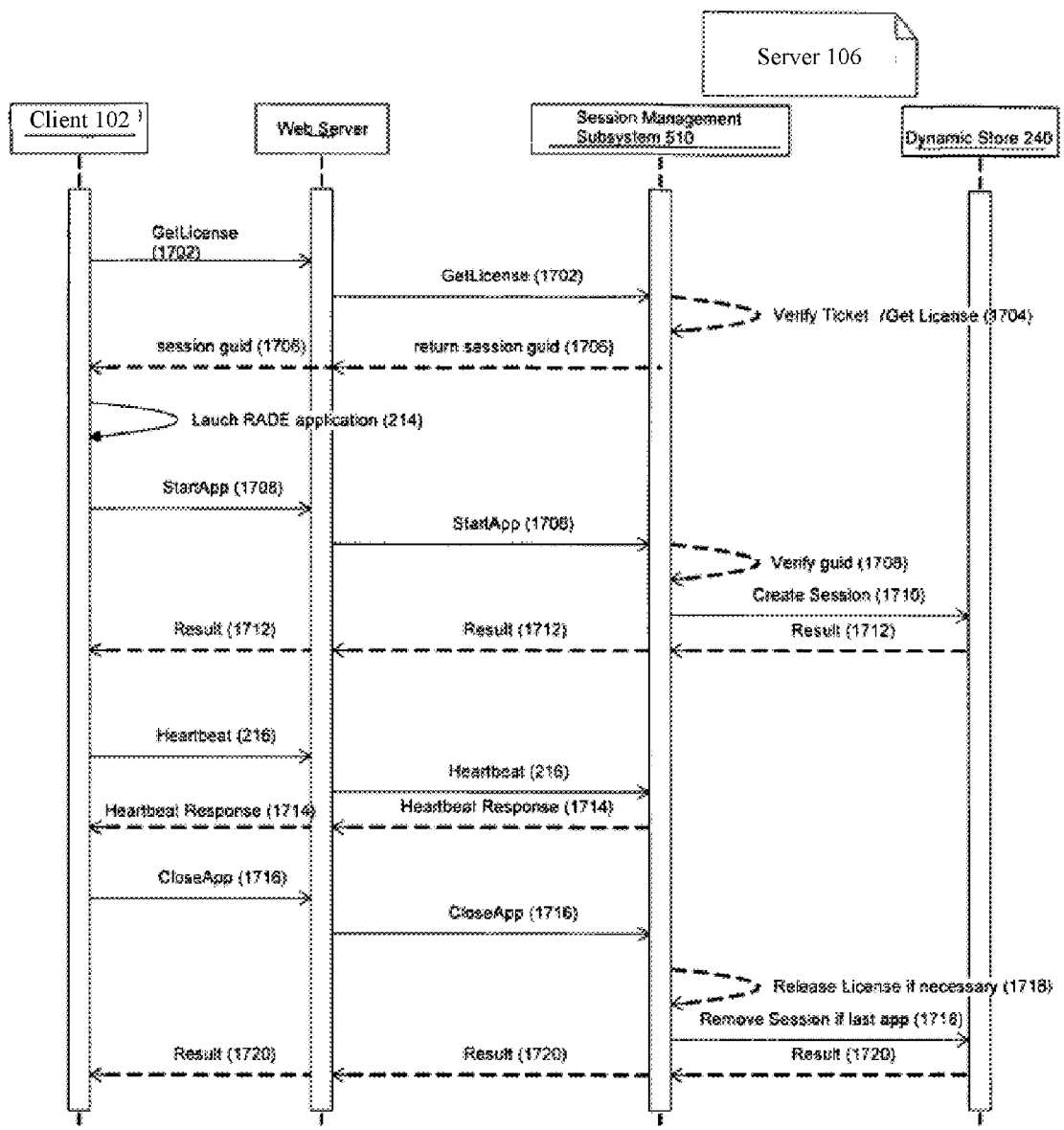
FIG. 14 is a flow diagram depicting one embodiment of the steps taken to request and maintain a license from a server.

Referring now to FIG. 14, a flow diagram depicts one embodiment of the steps taken to request and maintain a license from a server 106 for the duration of a session on a client 102. In brief overview, an application streaming client requests a license (step 1702). A server 106 receives the request for the license, verifies a ticket associated with the request, and generates a license (step 1704). The server 106 provides the license and information associated with the license to the client 102 (step 1706). The client 102 executes the application as described above in connection to step 214 in FIG. 7. The client transmits a heartbeat message indicating that the client has executed an application (step 1708). The server 106 receives the heartbeat message and verifies identifying information transmitted with the heartbeat message (step 1708). The server 106 creates a session associated with the executed application and with the client 102 (step 1710). A result of creating the session is transmitted to the client 102 (step 1712). The client transmits heartbeat messages throughout the execution of the application, as described above in connection with step 216 of FIG. 7. The client receives a response to a transmitted heartbeat message (step 1714). The client transmits a heartbeat message indicating a termination of an execution of the application (step 1716). The server 106 receives the heartbeat message and determines whether to remove session related data and whether to release the license associated with the client 102 and the terminated application (step 1718). A result of the determination made by the server 106 is transmitted to the client 102 (step 1720).

Referring now to FIG. 14, and in greater detail, an application streaming client on a client 102 requests a license (step 1702). In some embodiments, the client 102 requests the license upon receiving access information associated with an application program. In one of these embodiments, the client requests a license from the server 106 granting authorization for execution of the application program by the client 102. In some embodiments, the request for the license includes a launch ticket received from the server 106 with the access information. In other embodiments, an application streaming client 552 on the client 102 transmits the request to a web interface 558 and the web interface 558 transmits the request to the server 106. In still other embodiments, a session management subsystem 510 on the server receives and processes the request for the license.

A server 106 receives the request for the license, verifies a ticket associated with the request, and generates a license (step 1704). In one embodiment, the server 106 verifies that the client 102 is authorized to execute the application. In another embodiment, the server 106 determines whether the client 102 is already associated with an existing license. In still another embodiment, the server 106 determines that the client 102 is associated with an existing license and provides the client 102 with an identifier for a session management server 562 managing the existing license. In yet another embodiment, the server 106 generates and provides to the client 102 a new license, a session identifier, and an identification of a session management server 562 managing the new license.

In some embodiments, the server 106 uses a license management subsystem 1510 to respond to a license request in an embodiment in which. The license management subsystem 1510 receives a license request. The request can be for a feature license or for a connection license. The license management subsystem 1510 determines if the license has already been granted, i.e., the feature has already been started or a connection for a client already exists. If the license is already granted, the license management subsystem 1510 sends a "grant" event to the license requester. If the license has not been previously granted, the license management subsystem 1510 determines if a local license, i.e., a license that has been permanently assigned to the server 106, is available. In some embodiments, the license management subsystem 1510 performs this determination by checking local memory. If a local license is available, i.e., the server 106 has more licenses permanently assigned than currently granted, the license management subsystem 1510 sends a "grant" event to the license requestor.

The server 106 provides the license and information associated with the license to the client 102 (step 1706). In one embodiment, upon receiving the license, the session identifier, and the identification of the session management server 562 from the server 106, the client 102 executes the application. The client 102 may execute the application as described above in connection to step 214 in FIG. 7. The client transmits a heartbeat message indicating that the client has executed an application (step 1708). In one embodiment, the client transmits the heartbeat message to the server 106 for transmission of the heartbeat message to a session management server 562. In another embodiment, the client 102 transmits a heartbeat message directly to a session management server 562, responsive to an identifier of the session management server 562 received from the server 106.

The server 106 receives the heartbeat message and verifies identifying information transmitted with the heartbeat message (step 1708). In one embodiment, a server 106' is the session management server 562. In another embodiment, the session management server 562 verifies a server identifier provided with the heartbeat message by the client 102. In still another embodiment, the server identifier is the identifier provided to the client 102 by a server 106.

The server 106 creates a session associated with the executed application and with the client 102 (step 1710). In one embodiment, the session management server 562 creates a new session associated with the executing application upon receiving the heartbeat message. In another embodiment, a third server 106 creates the new session. In some embodiments, the session management server 562 stores session-related information upon the creation of the new session.

A result of creating the session is transmitted to the client 102 (step 1712). In some embodiments, the result confirms the creation of the session. In other embodiments, the result identifies the application or applications associated with the session. The client transmits heartbeat messages throughout the execution of the application, as described above in connection with step 216 of FIG. 7. In one embodiment, the client 102 continues to transmit heartbeat messages at regular intervals to the session management server 562 at periodic intervals throughout the execution of the application program. The client receives a response to a transmitted heartbeat message (step 1714). In one embodiment, the client 102 receives a confirmation of receipt of the heartbeat messages from the session management server 562. In another embodiment, the client 102 receives a command for execution from the session management server 562, responsive to the receipt of a heartbeat message by the session management server 562.

The client transmits a heartbeat message indicating a termination of an execution of the application (step 1716). The server 106 receives the heartbeat message and determines whether to remove session related data and whether to release the license associated with the client 102 and the terminated application (step 1718). A result of the determination made by the server 106 is transmitted to the client 102 (step 1720).

Referring now to FIG. 15, a block diagram depicts one embodiment of states that may be associated with a session monitored by a management service 504. In one embodiment, a session maintenance subsystem 510 on the management service 504 monitors a session of a client 102 and assigns a state to the session. In another embodiment, the session maintenance subsystem 510 maintains a list of license-related data, which may include an identifier associated with the client, an identifier associated with the session, a session state, and a timestamp indicating the last time the server 106 received a message from the client 102. In some embodiments, the session maintenance subsystem 510 includes a session monitoring thread. In one of these embodiments, the session monitoring thread awakens at a periodic license timeout interval to scan the list of license-related data and update the session status of a session.

A first state that a session may be in is an active and licensed state. In one embodiment, when in this state, the client 102 has maintained a valid license authorizing execution of an application. In another embodiment, a session management server 562 maintains session-related data. In some embodiments, the session management server 562 stores the session-related data on a second server. In one embodiment, when a client 102 initially executes an application, the session for the client is in the active and licensed state.

A second state that a session may be in is an active and unlicensed state. In one embodiment, a session is in this state when the client 102 fails to transmit heartbeat messages and a license to the client 102 has expired. In another embodiment, if a session is in this state then, while the license has expired, insufficient time has elapsed for the session to expire, and the session is considered active. In some embodiments, while a session is in this state, a server 106 or a session management server 562 may store session-related data on behalf of the client 102. In other embodiments, if a client 102 transmits a heartbeat message prior to the expiration of the session, session-related data is transmitted to the client 102 with a new license and the session returns to the active and licensed state. In one embodiment, a server 106 uses session identifiers and identifiers associated with the client to verify that the session has not expired and to provide the client with the appropriate session-related data.

A third state that a session may be in is a disconnected and non-existent state. When a session expires, session-related data is deleted.

A fourth state that a session may be in is a reconnected and unlicensed state. In one embodiment, when a session on a client 102 expires, session-related data is deleted. In another embodiment, when the client 102 transmits a new heartbeat message, a new session identifier and client identifier are generated for the client 102. In some embodiments, the client 102 re-authenticates to the server 106, receives a new license, and enters the active and licensed state.

Table 3 summarizes the states that may be associated with a session.

TABLE 3

| Session Status | Description |
| --- | --- |
| Active\Licensed | Normal mode of operation |
| Active\Unlicensed | Duration of missing heartbeats > License Timeout AND Duration of missing heartbeats < Session Timeout |
| Reconnected\Unlicensed | Duration of missing heartbeats > Session Timeout OR CPS/RADE hosting the session is down and back online |

In some embodiments, a packaging mechanism enables creation of a plurality of application files associated with an application program. In one of these embodiments, the packaging mechanism enables identification of a plurality of application files. In another of these embodiments, the packaging mechanism enables grouping of individual application files into the plurality of application files. In still another of these embodiments, the packaging mechanism enables hosting of the plurality of application files on a server, such as a file server or application server.

In one embodiment, the packaging mechanism executes on a server described as a "staging machine." In another embodiment, the packaging mechanism executes on a "clean machine." A clean machine may be a server having only an operating system installed on it, without additional software, drivers, registry entries, or other files. In still another embodiment, the packaging machine executes on a server, the server resembling a client on which an application program may execute. In some embodiments, the server on which the packaging mechanism executes includes an isolation environment providing a clean machine environment into which an application may be installed, even where the server is not itself a clean machine.

In one embodiment, the plurality of application files is referred to as a "package." In another embodiment, the package may be an archive file storing the plurality of application files. In still another embodiment, the package may be an archive file storing the plurality of application files and a file including metadata associated with at least one file in the plurality of application files. In some embodiments, a package includes a plurality of application files comprising an application program. In other embodiments, a package includes a plurality of application files comprising a suite of application programs. In yet other embodiments, a package includes a plurality of application files comprising an application program and a prerequisite required for execution of the application program.

In one embodiment, the packaging mechanism initiates execution of an installation program in an isolation environment. In another embodiment, the packaging mechanism monitors a change to the isolation environment generated by the installation program. In still another embodiment, the packaging mechanism monitors a creation by the installation program of a file in the isolation environment. In yet another embodiment, the packaging mechanism monitors a modification by the installation program of a file in the isolation environment. In some embodiments, the plurality of application files includes a file created or modified by the installation program. In other embodiments, the packaging mechanism implements a file system filter driver 564 to monitor the isolation environment.

In some embodiments, a packaging mechanism may generate multiple pluralities of application files, each comprising a different version of an application program configured for execution in a different target environment. In one of these embodiments, a plurality of application files is configured to execute on a client having a particular operating system, revision level, language configurations and master drive (e.g., one plurality of application files may be configured to execute on a client having the Windows XP Professional operating system with revision level SP2 and above, using English and having a master Drive C:). In another of these embodiments, more than one plurality of application files may be combined in a single archive file. In still another of these embodiments, each plurality of application files may be referred to as a "target." In yet another of these embodiments, an archive file containing one or more pluralities of application files may be referred to as a "package."

Figure 16:
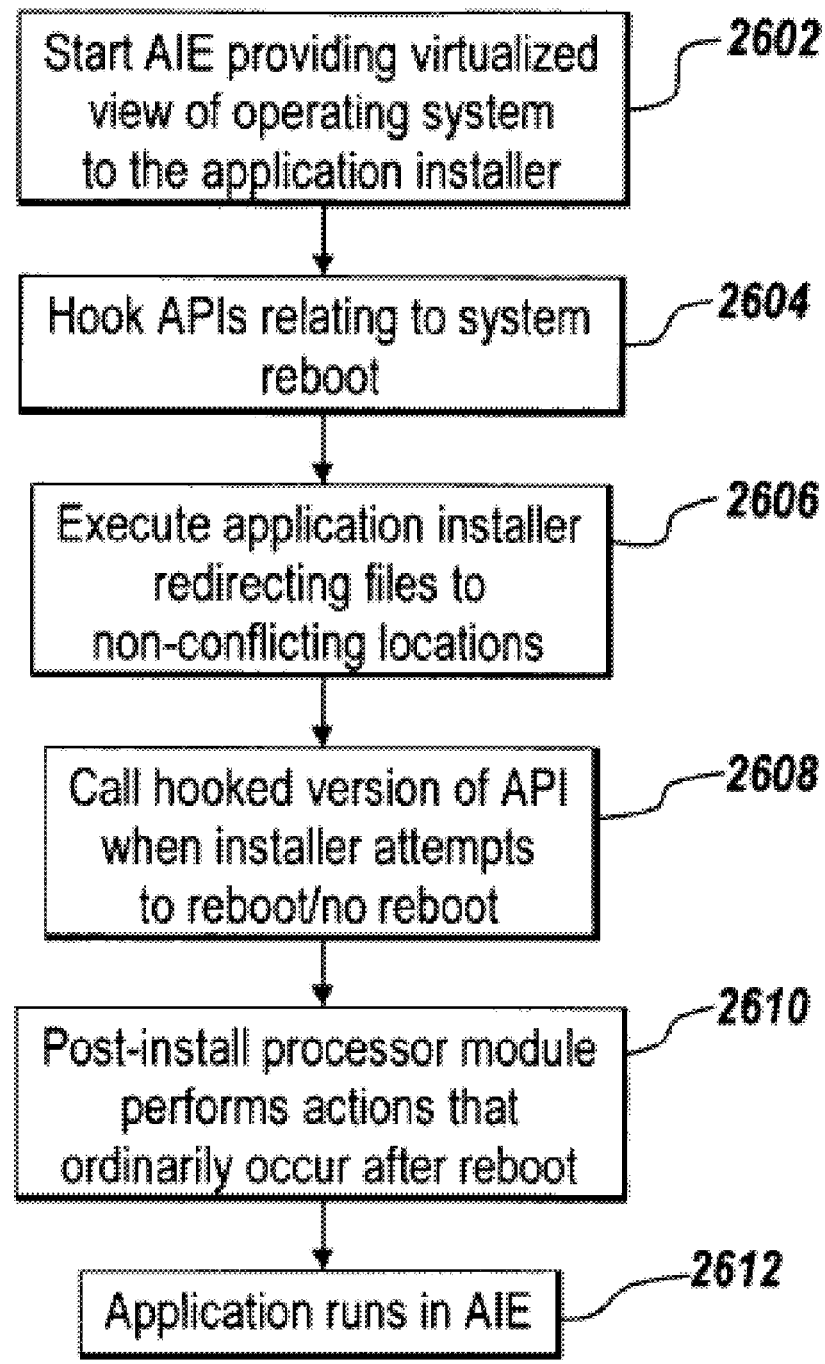
FIG. 16 is a flow diagram depicting one embodiment of the steps taken to install an application in an application isolation environment.

Referring now to FIG. 16, a flow diagram depicts one embodiment of the steps followed to install an application in an application isolation environment 2512. The application isolation environment 2512 provides a virtualized view of the server operating system to the application installer (step 2602). The APIs on the server relating to system reboots and shutdowns are hooked (step 2604) to prevent the application installer 2506 from causing a reboot. The application installer 2506 requests file-copying operations to locked files, the request being intercepted and redirected to non-conflicting locations (step 2606). When the application installer 2506 attempts to reboot by calling a system API, the request is intercepted and the reboot is prevented (step 2608). The post-install processor module 2510 performs actions that ordinarily occur after reboot (step 2610) and the application may then be executed in the application isolation environment 2512 without reboot of a server 106 (step 2612).

In some embodiments, following installation of the application program into the application isolation environment 2512, a packaging mechanism identifies a plurality of application files created or modified during installation of an application program. In one of these embodiments, the plurality of application files are stored on a server. In another of these embodiments, a client retrieving the plurality of application files may execute the application program.

In some embodiments, the packaging mechanism 530 executes on a server including an isolation environment 532 and a file system filter driver 534 and installs an application program into the isolation environment 532. In one of these embodiments, the server is referred to as a "clean machine" or a "staging machine." In another of these embodiments, the isolation environment 532 includes an application isolation scope providing a modifiable, virtualized instance of a native resource provided by an operating system on the clean machine. In still another of these embodiments, the isolation environment 532 includes a system isolation scope providing a read-only view of the native resource. In yet another of these embodiments, the read-only view of the native resource comprises a snapshot of a file system and registry residing on the clean machine.

In one embodiment, a redirector intercepts a request for a change to the native resource. In some embodiments, the redirector is a file system filter driver 534. In another embodiment, an installer program executed by the packaging mechanism 530 makes the request for the change. In still another embodiment, the change to the native resource is required to install an application program on to the clean machine. In yet another embodiment, the redirector redirects the request to the isolation environment 532.

In some embodiments, redirecting requests to change native resources to the isolation environment 532 results in isolation of changes associated with installation of an application program. In other embodiments, the requests to change native resources are recorded and stored in a storage element. In one of these embodiments, all changes associated with installation of an application program reside in the storage element. In another of these embodiments, a client 552 retrieving the contents of the storage element and implementing the changes to native resources residing in an isolation environment 556 on the client 552 result in installation of the application program on the client 552.

In some embodiments, a pre-launch analysis of the client 102 may be required. In one of these embodiments, the client 102 verifies that at least one characteristic is included in the client 102. In another of these embodiments, the at least one characteristic is added to the client 102 after the pre-launch analysis determines that the client 102 lacks the at least one characteristic. In still another of these embodiments, the at least one characteristic is included in a server hosting an application program and failure of the client to include the at least one characteristic will prevent execution of the application program. In yet another embodiment, the application program requires existence of the at least one characteristic on the client for execution.

In some embodiments, the packaging mechanism enables identification of at least one characteristic for use in a pre-launch analysis on the client. In other embodiments, the packaging mechanism enables association of at least one characteristic with an application program available for execution on the client. In still other embodiments, the packaging mechanism enables association of an executable script with an application program, the client executing the executable script to complete the pre-launch analysis. In yet other embodiments, the at least one characteristic is required to exist on the client after the execution of the application program.

The packaging mechanism may provide functionality for signing a plurality of application files. In one embodiment, signing the plurality of application files enables a client to verify integrity of the plurality of application files. In another embodiment, signing the plurality of application files prevents a client from executing a corrupted application program. In some embodiments, a cryptographic checksum, such as an MD4 hash, an MD5 hash, or a SHA-1 hash, of a file in the plurality of application files is computed.

In other embodiments, a cryptographic checksum of every file in the plurality of application files is computed. In one of these embodiments, the cryptographic checksum is stored in a second file. In another of these embodiments, the second file is associated with the plurality of application files. In some embodiments, the second file is added to the plurality of application files. In other embodiments, the second file is signed using a certificate, such as an X.509 certificate. In still other embodiments, a client retrieving the plurality of application files verifies the signature using a public portion of the certificate. In yet other embodiments, the client receives the public portion of the certificate and an identification of a certificate trust list for verification of the signature. In one of these embodiments, client receives a registry key containing the identification of a certificate trust list.

In one embodiment, the packaging mechanism provides functionality for customizing an isolation environment. In another embodiment, the packaging mechanism provides functionality for generating a file storing a definition of an isolation environment. In still another embodiment, the packaging mechanism includes the file with the plurality of application files comprising an application program. In yet another embodiment, a client receives the file with access information from a server.

In some embodiments, a plurality of application files are stored in an archive file. In one of these embodiments, the archive file is in a CAB file format. In another of these embodiments, the archive file format does not provide support for specification by an application program of a short file names of a file. In still another of these embodiments, an operating system, such as WINDOWS 2000 may not provide support for specification by an application program of a short file names of a file. In other embodiments, an operating system, such as WINDOWS XP, provides support for specification by an application program of a short file name of a file. In one of these embodiments, a request to execute the file must include the correct short file name of the file.

In one embodiment, a mapping may be generated to associate a long file name of a file in the plurality of application files with a short name of the file. In another embodiment, the mapping is stored in a file in the plurality of application files. In still another embodiment, a file has a short file name only if the long file name of the file is longer than twelve characters. In some embodiments, the short file name is a virtual file name associated with the file. In one of these embodiments, the file is transmitted to a client 102 for execution where it is stored with a long file name. In another of these embodiments, an application file on the client 102 requests execution of the file using the short file name. In still another of these embodiments, the mapping enables execution of the file although the request for execution of the file did not use the name of the file on the client (the long file name).

In some embodiments, the packager mechanism 530 generates the mapping. In one of these embodiments, the packager mechanism 530 selects a short file name for a file having a long file name. In another of these embodiments, an operating system on the server 106' on which the packager mechanism 530 is executing selects a short file name for a file having a long file name. In still another of these embodiments, a unique short file name is selected that does not conflict with a second short file name on the server 106'. In yet another of these embodiments, the installer program executed by the packager mechanism 530 generates a file including a mapping between a long file name with a short file name. In other embodiments, the mapping is transmitted to a client 102 retrieving the file. In one of these embodiments, the client 102 refers to the file when executing the file.

Figure 17:
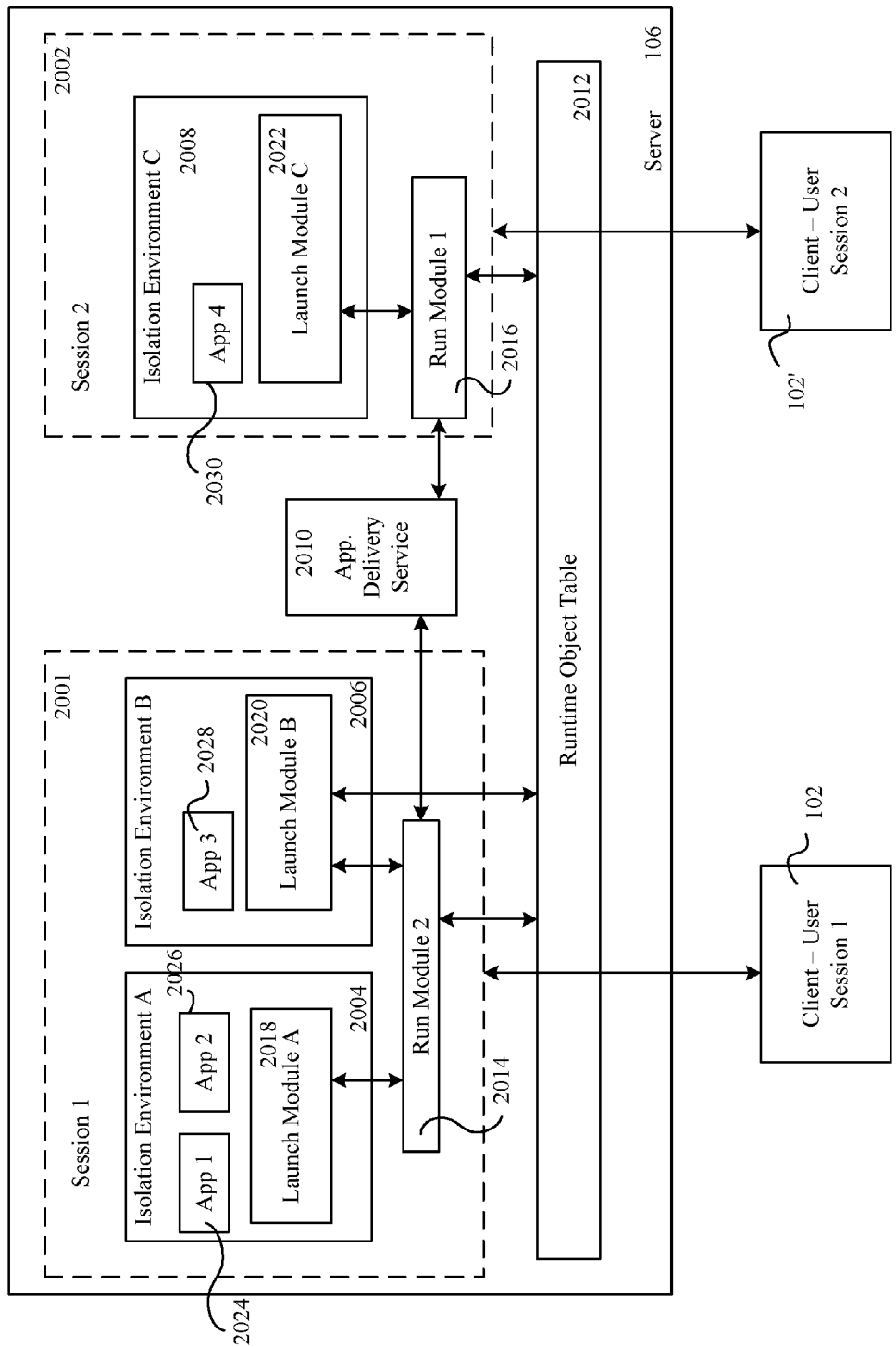
FIG. 17 is a block diagram depicting one embodiment of a system for launching applications into an isolation environment.

Illustrated in FIG. 17 is an embodiment of a system able to launch applications into existing isolation environments. Clients 102, 102' executing either a first or second user session, communicate with a server 106 hosting the first user session 2001 and the second user session 2002, where the first user session 2001 corresponds to the user session hosted by the first client 102 and the second user session 2002 corresponds to the user session hosted by the second client 102'. A runtime object table 2012 on the server 106 tracks each runtime object on the server 106 and communicates with a first run module 2014 executing in the first user session 2001 and a second run module 2016 executing in the second user session 2002. The run modules 2014, 2016 each communicate with an application delivery service 2010 executing on the server 106 and launch modules 2018, 2020, 2022 executing within isolation environments, within a user session and on the server 106. Executing within the first user session 2001 is isolation environment A 2004 and isolation environment B 2006. Launch module A 2018, a first application 2024 and a second application 2026 execute within isolation environment A 2004 which executes within the first user session 2001 and on the server 106. Launch module B 2020 and a third application 2028 execute within isolation environment B 2006 which executes within the first user session 2001 and on the server 106. Launch module C 2022 and a fourth application 2030 execute within isolation environment C 2008 which executes within the second user session 2002 and on the server 106. Each run module can communicate with the application delivery service 2010, and each launch module can communicate with the run module(s).

Further referring to FIG. 17, and in more detail, in one embodiment the system includes clients 102, 102' able to communicate with the server 106. The clients 102, 102' can be any client computing machine described herein. Further, the clients 102, 102' can in some embodiments communicate with the server 106 using any of the communication methods described herein. In one embodiment, the clients 102, 102' can communicate with the server 106 over a communication channel and via a network 104. In other embodiments, the clients 102, 102' can communicate with the server 106 using a presentation layer protocol such as the Citrix ICA protocol. While two clients 102, 102' are depicted, any number of client computing machines may communicate with the server 106. A user of the client 102, 102' can, in some embodiments, communicate with the server 106 through a user session. Such embodiments include clients 102, 102' hosting a communication client able to establish the user session with a client or module executing on the server 106.

The server 106 can in many embodiments comprise any of the computing elements described herein. Further, the server 106 can be any of the servers 106 described herein. While a single server 106 is depicted, the user sessions 2001, 2002 or any of the modules executing on the server 106 can be executed on any number of servers 106 within a farm 38.

In one embodiment, the server 106 includes a runtime object table 2012 that stores information about the runtime objects on the server 106. While a runtime object table 2012 is depicted, alternative embodiments can include a runtime object list, a runtime object group, a runtime object database, or any other listing or storage method able to record information about the runtime objects on the server 106. In one embodiment, the runtime object table 2021 stores information about the runtime objects, and in one particular embodiment, the runtime object table 2021 stores information about the isolation environments 2004, 2006, 2008 or the launch modules 2018, 2020, 2022. When the application delivery service 2010, the run module 2014, 2016 or any other process or application instantiates or otherwise causes a launch module or an instance of a launch module to execute within an isolation environment, that launch module can register in the runtime object table 2012. During registration, a dynamically generated identifier associated with the launch module is inserted into the runtime object table 2012. This identifier is representative in part of the location of the launch module and can be used by other objects, applications or processes executing on the server 106 to locate and access the launch module. In some embodiments, the run module 2014, 2016 generates an instance of a launch module within a created isolation environment, and sends requests to the launch module to execute applications. The runtime object table 2012, in some embodiments, can be searched by objects, applications or processes executing on the server 106. In response to query requests by the objects, applications or processes, the runtime object table 2012 can return: information about an object, process or application executing on the server 106; location information about an object, process or application executing on the server 106; configuration information about an object, process or application executing on the server 106; or any other runtime information or other information associated with objects, processes or applications executing on the server 106. Thus in many embodiments, each of the applications, objects or processes on the server 106 can communicate with the runtime object table 2012 and can receive responses and data from the runtime object table 2012.

The runtime object table 2012 can in most embodiments communicate with the application delivery service 2010 executing on the server 106. While the application delivery service 2010 is depicted as executing on the same machine as the user sessions 2001, 2002, in some embodiments the application delivery service 2010 may execute on a second server 106 located remotely from the first server 106, and in communication with the first server 106 via a network 104 or other communication link. The application delivery service 2010 can comprise any of the application delivery methods and systems described herein. In some embodiments, the application delivery service 2010 can be included within the management service 504, while in other embodiments the application delivery service 2010 can be included within the application management subsystem 506. In other embodiments, the application delivery service 2010 can execute on the content server 106, on an application server 106", or within the policy engine 406. The application delivery service 2010 can in some embodiments expose remote procedure call interfaces of isolation environments so that the isolation environments can return an identifier when the name of the isolation environment is known. Exposing a remote procedure call interface can be accomplished during the creation of an isolation environment. In one embodiment, the application delivery service 2010 can generate isolation environments and assign them an identifier or a process identifier. Once the isolation environment is generated, the isolation environment can register with the operating system of the computing machine on which the isolation environment executes, as a server. Thus, substantially immediately after generating the isolation environment, a server begins executing within the isolation environment such that the server can expose a communication interface. The application delivery service 2010 can in some embodiments store a list, table or other enumeration of isolation environments executing or active on the server 106. In some embodiments this enumeration can include the names of the active, inactive or suspended isolation environments, in other embodiments this enumeration can include the names of the active inactive or suspended isolation environments as well as an identifier associated with each environment. In still other embodiments, the enumeration can include the location of each isolation environment, or can include a path associated with each isolation environment. In some embodiments the application delivery service 2010 can be referred to as the RADE service, while in other embodiments the application delivery service 2010 can be referred to as a rapid application delivery service.

In one embodiment, the application delivery service 2010 communicates with run module 2014, 2016 such that the application delivery service 2010 receives requests for information regarding an application profile. Once a request is received, the application delivery service 2010 can query a table, list or database to identify isolation environments associated with the profile request. Upon identifying the isolation environments, the application delivery service 2010 can transmit a response to the run module 2014, 2016 that includes an enumeration of isolation environments associated with the profile. In embodiments where a single isolation environment is associated with the requested profile, the application delivery service 2010 can return a response that includes the name of the isolation environment associated with the requested profile. When the request is made while the server 106 is not connected to a network or cannot access a network, the application delivery service 2010 can facilitate the identification of the profile and by proxy the applications by determining whether the requested profile was previously downloaded. If the profile exists, then the application delivery service 2010 can make an entry into the server's 106 registry indicating that the applications associated with the profile are offline or otherwise unavailable to the run module or user. When no isolation environment exists for a particular profile, the application delivery service 2010 can facilitate the creation of an isolation environment by responding to isolation requests by creating an isolation environment encompassing the requested application.

Both the runtime object table 2012 and the application delivery service 2010 can communicate with one or more, or a plurality of run modules 2014, 2016. In one embodiment, each run module is an instance of a run module that executes within a user session 2001, 2002. The run module can be referred as a RADE run module, a run client, a run component, a run object, or a run application. The run modules 2014, 2016, in most embodiments can communicate with any one of: a launch module 2018, 2020, 2022; an application 2024, 2026, 2028, 2030; an application delivery service 2010; or a runtime object table 2012. Each time a user via a client computing machine 102 requests execution of an application, the run module associated with that user launches and intercepts the request. For example, a user inputs commands into client 102 which translates to a request for an application. The request is transmitted to the server 106 where it is intercepted by the run module executing in that user's user session. Once a run module 2014, 2016 intercepts the application execution request, the run module 2014, 2016 queries the application delivery service 2010 to determine whether an isolation environment exists that corresponds to a profile associated with the requested application. The run module 2014, 2016 then uses the application delivery service's 2010 response to determine whether to instruct the application to launch into a pre-existing isolation environment or to create a new isolation environment for the requested application.

In embodiments where the run module 2014, 2016 determines that an existing isolation environment exists for a particular profile, the run module 2014, 2016 identifies the isolation environment by obtaining the path or address of the isolation environment and makes a call to the launch module inside the isolation environment. This call can in some embodiments include a request to launch or execute an application requested by the user. In other embodiments, the call can include a request to generate an additional instance of an application already executing within the isolation environment. Still other embodiments include a request to launch or execute the application that includes an address or virtual path of the application such that the launch module can use the address or path to access and launch or execute the application. In most embodiments, the run module 2014, 2016 can access only those launch modules 2018, 2020, 2022 within their user session. For example, a first run module 2014 executes within a first user session 2001, therefore the first run module 2014 can only access the launch modules 2018, 2020 within the first user session 2001. In other embodiments, the run module can access any launch module on the server 106.

In embodiments where the run module 2014, 2016 determines that no isolation environment exists for a particular profile, the run module 2014, 2016 launches a launch module in a suspended mode and then issues a call to the application delivery service 2010. This call can include a request to isolate the suspended launch module by creating an isolation environment for the launch module and for the requested application. In one embodiment, the resulting isolation environment is associated with the profile further associated with the requested application. Once the isolation environment is created, the run module can in some embodiments insert a hook dynamic link library into the launch module and then permit the launch module to become active such that the launch module or launch module instance executes on the server 106. The hook dynamic link library can in some embodiments hook any calls made to the launch module or can intercept any requests made to the launch module and any responses issued by the launch module.

Within each isolation environment, instances of a launch module or launch modules 2018, 2020, 2022 can exist. Each launch module can interact with the applications executing in an isolation environment and can respond to requests or calls issued or generated by a run module executing within the same user session within which the launch module(s) executes. The launch modules 2018, 2020, 2022 can be referred to as launchers, launching applications, launch clients, launch module instances or by any other label descriptive of the launch modules 2018, 2020, 2022 functionality. When an isolation environment is created, a launch module or launch module instance can be created within that isolation environment. Following creation of the isolation environment, the launch module can register with the runtime object table 2012 as a runtime object and can register with a dynamic GUID or identifier that comprises an identifier associated with the isolation environment within which the launch module executes. In some embodiments, the dynamic identifier used by the launch module to register with the runtime object table 2012 can include an identifier that comprises a unique combination of the isolation environment identifier, an identifier associated with the launch module and an identifier associated with the user session. When a run module or other object or process requests a launch module to execute an application or application instance, that run module or object can identify the launch module instance within the runtime object table 2012, and use the dynamic identifier associated with the launch module to transmit a request to the launch module instance to launch or execute a particular application(s). In other embodiments, the launch module includes a communication interface that can receive application paths, addresses or other application location data, and uses the location data to execute the application's executable file. In some embodiments, one isolation environment may be able to execute an application in another isolation environment by issuing an execution request to a communication interface on a launch module. The isolation environments in this embodiments can either be within the same user session or can be in a first and second user session.

In addition to exposing a communication interface through which application execution requests can be serviced, the launch modules 2018, 2020, 2022 can in some embodiments execute pre-launch and post-exit scripts. These pre-launch and post-exit scripts may be executed within or outside of an isolation environment. In some embodiments, a pre-launch script may be any application or set of instructions executing on a communication machine prior to the launch of an application, while a post-exit script can be any application or set of instructions executing on a communication machine after an application exits. In one embodiment, a pre-launch script can be any script used to map to a remote share, or to install software components unable to be isolated (e.g. PDF soft printer.) Post-exit scripts, in some embodiments, can be used to cleanup tasks executed by the pre-launch scripts.

In some embodiments the launch modules 2018, 2020, 2022 may execute a post-exit once the launch module 2018, 2020, 2022 detects or determines that the number of processes executing within the isolation environment has dropped to one process. The launch modules 2018, 2020, 2022 in other embodiments register with an isolation environment monitoring module that tracks the number of processes running within an isolation environment. When the isolation environment monitoring module informs the launch module 2018, 2020, 2022 that there is only one process running within the isolation environment, the launch module responsively executes an post-exit scripts associated with either the isolation environment, a profile associated with the isolation environment, the launch module or the run module. The launch module 2018, 2020, 2022, in some embodiments, may wait a predetermined period of time after detecting that the number of processes has dropped to one before executing the post-exit script(s). Other embodiments include launch modules 2018, 2020, 2022 that wait a predetermined period of time after executing a post-exit script or after determining that the number of processes within an isolation environment dropped to one, before deconstructing, destroying or otherwise causing the isolation environment to die. Should the launch module(s) 2018, 2020, 2022 receive a request to launch an application after the execution of post-exit scripts but before the destruction of the isolation environment, the launch module(s) 2018, 2020, 2022 can execute any pre-launch scripts and launch the requested application. In this embodiment, the isolation environment remains alive and intact and does not die or otherwise deconstruct.

In one embodiment, the launch module(s) 2018, 2020, 2022 can function substantially similar to a server such that each launch module can expose a communication interface able to receive application launch requests. Thus, in one example a launch module can receive a request or command issued by a run module, where the request or command can in some embodiments be a command to launch an application. Exposing a communication interface can in some embodiments be facilitated by inter-process mechanisms executing on the server 106. In one embodiment, the inter-process mechanisms can be any mechanism that uses remote procedure calls or that creates communication interfaces that can receive and transmit information via remote procedure calls. The inter-process mechanisms can in some embodiments be inter-process mechanisms associated with an operating system executing on the computing machine. Inter-process mechanisms can in some embodiments create communication interfaces by generating a communication interface within the launch module such that the launch module can receive remote procedure calls from other objects executing on the server 106. In one embodiment, the launch module shares the address of the isolation environment within which the launch module executes such that objects can communicate with the launch module using the isolation environment address. For example, if a run module wishes to transmit a command to a launch module to launch an application at a particular address, the run module can transmit the application's address along with a launch command to an address of an isolation environment within which the launch module executes.

In one embodiment, the applications 2024, 2026, 2028, 2030 can be any application described herein or any application able to execute within an isolation environment.

The user sessions 2001, 2002 can be any user session described herein. In one embodiment a user session 2001, 2002 is created when a user of a client 102, 102' establishes a connection with a server 106. The user may access a profile associated with that user. The user session 2001, 2002 can in some embodiments describe the period of time during which a user connects the server 106. In other embodiments, the user session 2001, 2002 can be defined by the period of time during which a client computer 102, 102' accesses a user profile. User sessions 2001, 2002 can in some embodiments encompass, comprise or include isolation environments or run modules. In other embodiments, user sessions 2001, 2002 can include isolation environments and communicate with run modules located outside of the user session.

In one embodiment, isolation environments 2004, 2006, 2008 are included within user sessions. In other embodiments isolation environments 2004, 2006, 2008 can exist outside of user sessions. The isolation environments 2004, 2006, 2008 can be any of the isolation environments described herein. In one embodiment launching or launch modules 2018, 2020, 2022 execute within the isolation environments 2004, 2006, 2008; while in other embodiments applications execute within the isolation environments 2004, 2006, 2008 such that the applications are isolated. In some embodiments, a simplified label of the isolation environments 2004, 2006, 2008 can comprise sandbox.

Figure 18:
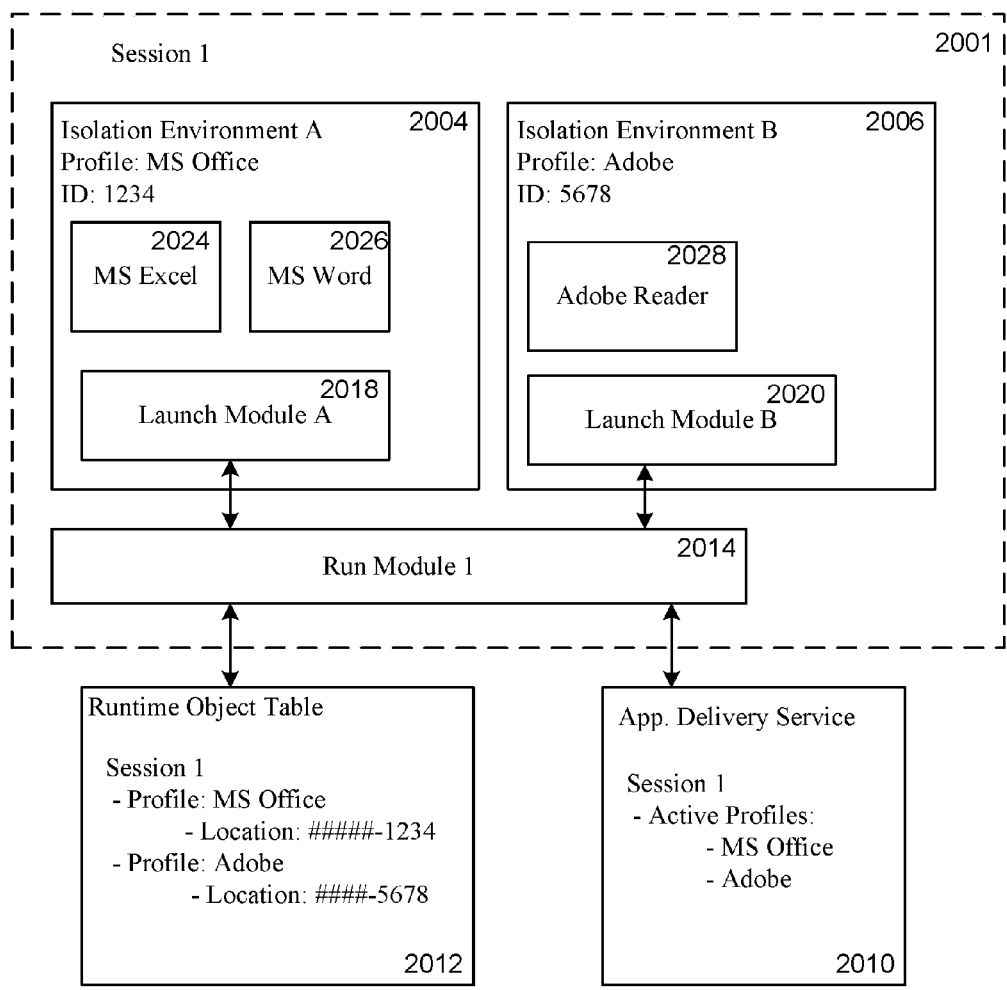
FIG. 18 is a block diagram depicting one embodiment of a system for launching applications into an existing isolation environment.

Illustrated in FIG. 18 is a detailed view of the system described in FIG. 17. A user session 2001 on a server 106 includes two isolation environments 2004, 2006 and a run module 2014. Isolation environment A can include an instance of a first application 2024 and a second application 2026 and a launch module instance 2018. Isolation environment B can include an instance of a third application 2028 and a launch module instance 2020. In one embodiment, a runtime object table 2012 and an application delivery service 2010 communicate with the run module 2014.

Further referring to FIG. 18, and in more detail, in one embodiment the user session 2001 can comprise any of the user session components or functionalities described herein. In another embodiment, the launch modules 2018, 2020 can be any of the launch modules described herein and can comprise any of the launch module components or functionalities described herein.

Executing within the user session 2001 is isolation environment A 2004 that can encompass or isolate a first application 2024 and a second application 2026. Isolation environment A 2004 can in some embodiments be associated with a particular profile or a particular identifier. For example, FIG. 18 depicts isolation environment A 2004 associated with the MICROSOFT OFFICE profile and having the identifier "1234." While isolation environment A 2004 is depicted as having the above-mentioned profile and identifier, isolation environment A 2004 can be associated with any profile or identifier according to the methods and systems described herein. Similar to isolation environment A 2004, isolation environment B 2006 can be associated with the ADOBE profile and can have the identifier "5678." A profile can include any set of native resources, services, files or other configuration or environmental settings required for an application, a group of applications or an application suite. For example, the MICROSOFT OFFICE profile may include the native resources, files, settings or other configuration or application information specific to a MICROSOFT OFFICE application. Similarly, the ADOBE profile may include the native resources, files, settings or other configuration or application information specific to an ADOBE application. While FIG. 18 depicts isolation environments associated with a MICROSOFT OFFICE or ADOBE profile, isolation environments may be associated with any number of different profiles.

In one embodiment, an isolation environment 2004, 2006 can be associated with an identifier. This identifier can be in any number of embodiments: an ID; a tag; identifying metadata; an identifying file; or any other identification means by which an application, system or service can identify the isolation environment 2004, 2006. In some embodiments the identifier can be numeric while in other embodiments the identifier can be alphabetic or alpha-numeric. The identifier can also comprise a series of symbols, hieroglyphs, markings, pictures, numeric combinations or any other identifying mark able to identify an isolation environment. In one embodiment the identifier is stored in a registry setting associated with the isolation environment, while in another embodiment the identifier is stored in the runtime object table 2012 or application delivery service 2010 and associated with a particular memory address. In some embodiments, the identifier associated with an isolation environment 2004, 2006 can comprise any combination of an identifier associated with the isolation environment 2004, 2006 and an identifier associated with the user session 2001. The identifier can comprise, in other embodiments, any combination of the following: an identifier associated with the server 106; an identifier associated with the user of the client 102; and identifier associated with the applications executing within the isolation environment; an identifier associated with the run module; or any other identifier able to uniquely distinguish one isolation environment from another. In other embodiments, the identifier associated with the isolation environment can be a path indicating the location of the isolation environment. In still other embodiments, each isolation environment can be uniquely named using any of the following: a randomly generated name; a name comprising the isolation environment ID; a name comprising a name of a profile associated with the isolation environment; a name comprising the location of the isolation environment; a name comprising an identifier or name associated with the user session within which the isolation environment executes or is located; or a name comprising identifying information associated with the server 106.

The runtime object table 2012 can be any runtime object table 2012 described herein. In one embodiment the runtime object table 2012 stores identifying information about the isolation environments on a computer. This identifying information can include an identifier associated with the isolation environments, the isolation environment location, a path of where the isolation environment can be found, a profile associated with the isolation environment, or any other information that can be used to characterize the contents of an isolation environment or the location of an isolation environment. In some embodiments, when a launch module 2018, 2020 initially executes within an isolation environment, that launch module 2018, 2020 can register with the runtime object table 2012 and either insert an entry into the runtime object table 2012 or cause the runtime object table 2012 to generate an entry that includes identification information associated with the isolation environment and that includes information about the profile associated with the isolation environment. The runtime object table 2012 can store isolation environment information in a repository, a list, a table, a database or in any other storage mechanism able to be searched and sorted. When queried, the runtime object table 2012 can return information about a profile, an isolation environment or about any information stored in the runtime object table 2012.

In some embodiments, the application delivery service 2010 can be any application delivery service 2010 described herein. Like the runtime object table 2012, the application delivery service 2010 can also store information about isolation environments. In one embodiment, the application delivery service 2010 tracks the name of each active isolation environment. In another embodiment, the application delivery service 2010 or an isolation environment management module or manager (Not Shown) tracks the name of each active, suspended, inactive or dead isolation environment. The application delivery service 2010 or the isolation environment management module can track an identifier or location of each isolation environment. In still other embodiments, the application delivery service 2010 or the isolation environment management module can track a profile associated with each isolation environment. For example, the application delivery service 2010 can in one embodiment contain a table, list or other tracking mechanism that lists the profiles active in each user session. Thus, searching for the profiles active in a particular user session can produce a listing of the profiles and therefore the isolation environments active within a particular user session. The information returned by the application delivery service 2010 can be any identifier associated with either the profile or the isolation environment and can be used to determine the location of the isolation environment.

In one embodiment, the run module 2014 can be any run module 2014 described herein. The run module 2014 can respond to user requests for applications by querying the application delivery service 2010 to determine if a profile associated with the requested application exists or is active within the requesting user's session. The application delivery service 2010 returns to the run module 2014 information regarding the name of the isolation environment encompassing or isolating the profile associated with the requested application. The run module 2014 can use this information to query the runtime object table 2012 to determine the location or the path of the isolation environment isolating the profile associated with the requested application. In one embodiment, the run module 2014 can further communicate with the launch modules 2018, 2020 to return to the appropriate launch module 2018, 2020 a request to launch the application requested by the user. For example, if the user were to request to launch MICROSOFT ACCESS, an application that is part of the MICROSOFT OFFICE profile, the run module 2014 would query the application delivery service 2010 to determine if a MICROSOFT OFFICE profile exists in the first user session 2001. The application delivery service 2010 would process the request and return to the run module 2014 information associated with isolation environment A 2004. The run module 2014 would then use the information transmitted by the application delivery service 2010 to query the runtime object table 2012 for information regarding the location of isolation environment A 2004, and in some embodiments for information regarding launch module A 2018. The runtime object table 2012 can in some embodiments return the location of isolation environment A 2004, and in some embodiments can return information regarding launch module A 2018. The run module 2014 can use the information returned by the runtime object table 2012 to send a request to launch module A 2018 to launch MICROSOFT ACCESS into isolation environment A 2004.

The applications executing within the isolation environments 2004, 2006 can belong to a profile such that the isolation environments 2004, 2006 are associated with that particular profile. In one embodiment the first application 2024 is MICROSOFT EXCEL, while the second application 2026 is MICROSOFT WORD. This embodiment is merely illustrative of how two MICROSOFT OFFICE applications can be isolated within an isolation environment 2004 associated with a MICROSOFT OFFICE profile. Similarly, a third application 2028 can be ADOBE READER which illustrates how an ADOBE application can be isolated within an isolation environment 2006 associated with an ADOBE profile.

Figure 19:
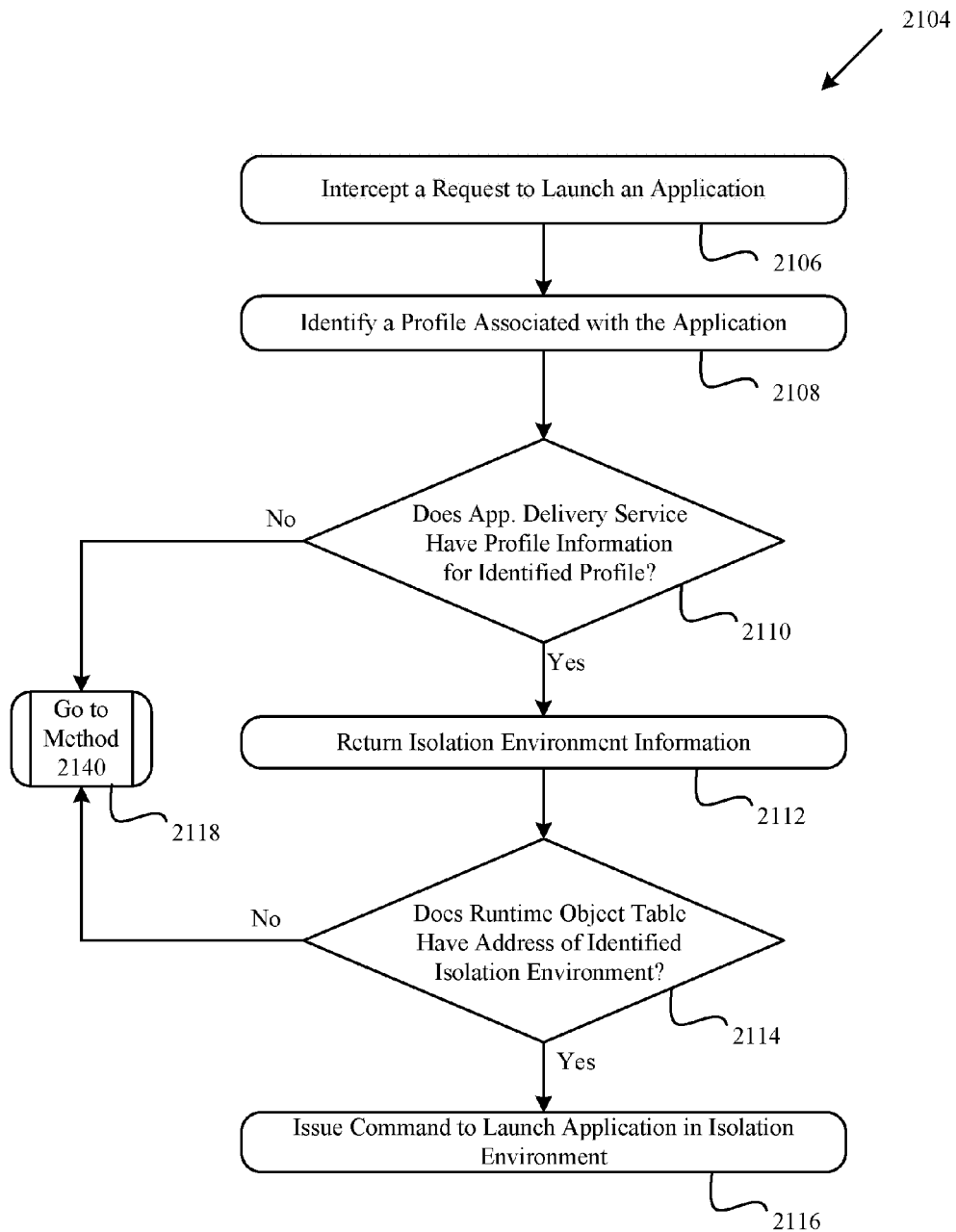
FIG. 19 is a flow diagram depicting one embodiment of a method for launching applications into an isolation environment.

Illustrated in FIG. 19 is one embodiment of a method 2104 for launching applications into existing isolation environments. In one embodiment, a run module or other module or component intercepts a request to launch an application (Step 2106). The run module identifies a profile associated with the requested application (Step 2108) and determines whether an application delivery service has profile information associated with the identified profile (Step 2110). If it is determined that the application delivery service has profile information associated with the identified profile (Step 2110) then the application delivery service returns information associated with the isolation environment further associated with the profile (Step 2112). Once the run module receives the isolation environment information, the run module queries the runtime object table to determine the address of the identified isolation environment (Step 2114). If the runtime object table has address information associated with the identified isolation environment, then the runtime object table returns the address information to the run module which uses the address information to instruct a launch module to launch the application into the identified isolation environment (Step 2116). When it is determined that the application delivery service does not have profile information for the determined profile (Step 2110), the run module may then implement the method 2140 described in FIG. 20 (Step 2118). Similarly, when it is determined that the runtime object table does not contain an address for the isolation environment (Step 2114), the run module may then implement the method 2140 described in FIG. 20 (Step 2118).

Referring to FIG. 19 and in more detail, in one embodiment the method 2104 is carried out by a run module 2014, 2016 executing on a computing machine. In another embodiment, the method 2104 is carried out by an isolation environment manager executing on a computing machine. The run module 2014, 2016 can in one embodiment carry out the method 2104 within a user session and in another embodiment can carry out the method 2104 outside of the user session. In some embodiments, the run module 2014, 2016 and the user session may execute on a first computing machine, while in other embodiments the run module 2014, 2016 may execute on a second computing machine remotely located from the first computing machine on which the user session executes.

The run module, in some embodiments, intercepts requests generated by a client 102 to launch a first application (Step 2106). In one embodiment, the run module can intercept any number of client 102 generated requests to launch any number of different or substantially similar applications. Thus, in one embodiment the run module can intercept a request to launch or execute a first application and can intercept a second request to launch or execute a second application; while in another embodiment, the run module can intercept a first request to launch or execute a first application and a second request to launch or execute the first application. In an embodiment where more than one request to execute the same application is intercepted, the run module can either instantiate multiple instances of the application or can ignore subsequent requests to execute the same application. In some embodiments another client or module executing within the user session can intercept client generated requests to launch applications and further forward these intercepted requests to the run module. The client generated requests can, in most embodiments, be generated by the client 102 responsive to input from a user of the client. This input can indicate a command to execute a selected application.

Once the run module intercepts and/or receives the request to execute an application, the run module can use information about the application to identify a profile associated with the application (Step 2108). In one embodiment, the run module can use the application name to lookup in a table the name or identifier of a profile associated with the requested application. In another embodiment, the client request can include metadata identifying a profile associated with the requested application. Still other embodiments can include identifying a profile having the same name as the application, while in another embodiment identifying the profile can include querying an application delivery service 2010 to determine the name of a profile associated with the requested application. In some embodiments, the run module may forward the application executing request to another client or module or to the application delivery service 2010 and request that the module, client or service return to the run module the name of a profile associated with the requested application.

The run module can, in most embodiments, use the name of the profile associated with the requested application to query the application delivery service for profile information. In one embodiment the run module can request an enumeration of all the active profiles within a particular user session, while in another embodiment the run module can request an enumeration of all the active profiles within a particular user session and compatible with the requested application. The run module can in some embodiments request the application delivery service to return the name of an isolation environment within the user session and associated with the identified profile. In such an embodiment, the application delivery service can query an internal list, table or database using the identified profile and user session information contained in the run module's request, and can in some embodiments return to the run module a name of a profile associated with the requested application.

The application delivery service can receive a query from the run module to determine whether an active profile associated with the requested application exists within the user session (Step 2110). In one embodiment, the application delivery service makes a determination as to whether a profile or profile information exists by further querying an internal list of active profiles as described above. Other embodiments include an application delivery service that determines whether an active profile exists within the user session by enumerating a list of each active profile within the user session, and searching through the enumeration to identify a profile matching the description of the profile included in the run module's request or query. When it is determined that an active profile exists in the user session or that the application delivery service has information pertaining to a profile associated with the requested application, the application delivery service can return isolation environment information (Step 2112). However, when it is determined that an active profile does not exist or that the application delivery service does not have information pertaining to a profile associated with the requested application, the application delivery service can then call up method 2140 described in FIG. 20 (Step 2118).

When it is determined that the profile exists, the application delivery service can in some embodiments return to the run module isolation environment information (Step 2112). In one embodiment, the isolation environment information returned to the run module relates to an active profile associated with the requested application such that the isolation environment isolates applications belonging to that active profile. Thus, the isolation environment information relates to an isolation environment that isolates applications substantially similar to the requested application. The application delivery service can in some embodiments return the name of the isolation environment, while in other embodiments the application delivery service can return an address or path associated with the isolation environment. In other embodiments, the application delivery service can return the name of the profile or the location of the profile rather than return the name or address of the isolation environment. In still other embodiments, the application delivery service can return information about launch modules within the isolation environment.

Once the run module receives the information regarding the isolation environment, the run module can then query the runtime object table to determine whether the runtime object table has an address associated with the identified isolation environment (Step 2114). In one embodiment, the method 2104 may not include this step as the application delivery service may provide the run module with information regarding the location of the isolation environment. In embodiments where the run module seeks information from the runtime object table, the run module may construct a query including the name of the isolation environment identified by the application delivery service and may issue this query to the runtime object table. In response, the runtime object table may locate an address or path associated with the isolation environment and forward this information to the run module. In other embodiments, the runtime object table may respond to a query for isolation environment location information with information regarding an executable or function within a launch module executing within the isolation environment. The run module may then use this path information to pass an argument to the executable or function indicating the path of the requested application. The launch module may then use the application path information to launch the requested application within the isolation environment.

Once the run module receives the address or path information for either the isolation environment or for a launch module within the isolation environment, the run module then issues a command to the launch module to launch the requested application in the isolation environment (Step 2116). In response the launch module identifies an executable associated with the requested application and executes the application within the isolation environment.

Figure 20:
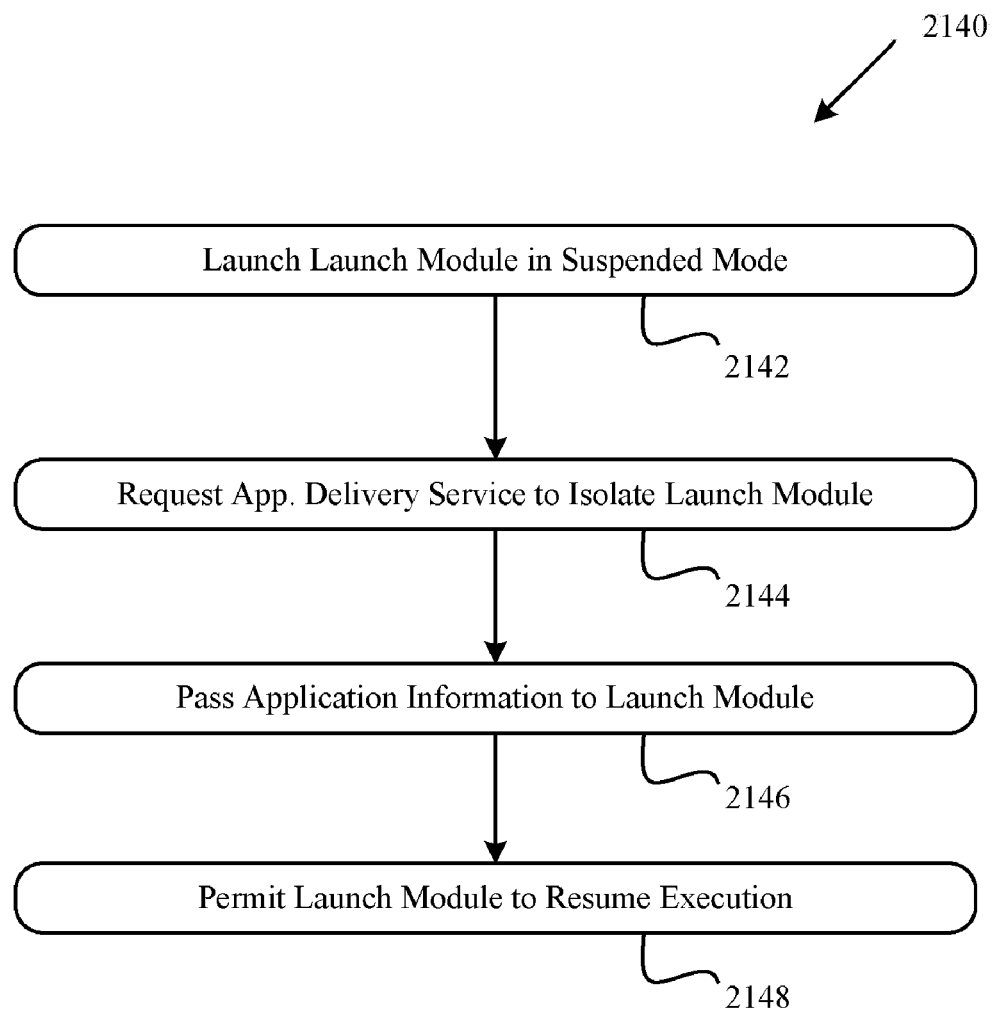
FIG. 20 is a flow diagram depicting one embodiment of a method for launching applications into an isolation environment.

When either the profile information cannot be found within the application delivery service, or the isolation environment location information cannot be found within the runtime object table, the run module may then call the method 2140 illustrated in FIG. 20. This method 2140 describes a process for creating an isolation environment and can be used by the run module to create an isolation environment with it appears that no isolation environment exists for a particular profile. In other embodiments, the run module may either return an error message or otherwise stop executing whether it is determined that either the runtime object table does not include location information associated with the profile or the application delivery service cannot identify a profile associated with the requested application.

Illustrated in FIG. 20 is an embodiment of a method 2140 for generating an isolation environment. In response to a determination that an isolation environment should be created for a particular profile or application, a run module launches a launch module associated with the particular profile or application in a suspended mode (Step 2142). The run module can then request an application delivery service to isolate the launch module (Step 2144) and once the launch module is isolated, the run module can pass the application information to the launch module (Step 2146). Once the launch module is isolated and has the application information, the run module can permit the launch module to resume execution (Step 2148).

Further referring to FIG. 20, and in more detail, in one embodiment the run module launches the launch module in a suspended mode (Step 2142). In some embodiments, the run module can launch and instance of a launch module in a suspended mode. The launch module instance can in some embodiments have characteristics or attributes associated with a particular profile or application. Launching the launch module in a suspended mode can comprise creating an instance of a launch module and directing the launch module instance to execute a timer mechanism that prevents all processes from executing until a particular command is received or state is achieved. In other embodiments, launching a launch module instance in a suspended mode could comprise designing a launch module instance but failing to execute the launch module instance.

The run module can then request that an application delivery service isolate the launch module (Step 2144). Isolating a launch module can comprise generating one or more isolation scopes having a set of native resources directed towards a particular profile. For instance, a particular profile may require a particular set of dynamic link library (dll) files. In such a situation, isolating the launch module may include generating an isolation scope that comprises a set of native resources including the required set of dll files. In other embodiments, isolating the launch module may include generating an application and user isolation layer having attributes specific to a particular user and a particular profile or application. Generating the application and user isolation layer can further include generating a user isolation scope and an application isolation scope having native resources that are specifically used by the particular user and the particular profile or application. In still other embodiments, isolating the launch module can include creating an isolation environment within which the launch module can execute.

Once the launch module is isolated by the application delivery service, the run module can then pass application information to the launch module (Step 2146). In one embodiment, passing application information to the launch module can comprise passing one of either an application executable file path, an application executable file network address, application executable file stub, application executable file or other application information able to be used by the launch module to launch the application. In still other embodiments, the run module may pass the launch module a memory address storing the path or location of an application. In still other embodiments, the run module may pass the launch module an argument having a path, location or address of the application.

In one embodiment, the run module permits the launch module to resume execution once the run module has passed the application information to the launch module (Step 2148). Permitting the launch module to resume execution can comprise sending a command to the launch module to execute. In other embodiments, permitting the launch module to resume execution can comprise sending a command to the launch module to cease executing delay modules within the launch module and resume ordinary execution of the launch module functions.

The methods and systems described herein may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the present disclosure has described multiple embodiments of systems and methods for launching an application into an existing isolation environment, it should be understood by those skilled in the art that various changes in form and detail may be made therein without departing from the spirit and scope of the invention as defined by the following claims.

What is claimed is:

1. A method for launching applications into existing isolation environments, the method comprising:
   receiving, by a run module executing on a computing machine, a request by a user to execute an application on the computing machine;
   identifying, by the run module, a profile associated with the application;
   querying, by the run module, an application delivery service executing on the computing machine to identify at least one isolation environment corresponding to the profile;
   determining that no isolation environment on the computing machine corresponds to the profile;
   launching, by the run module, a launch module in a suspended mode responsive to determining that no isolation environment corresponds to the profile;
   issuing, by the run module, a command to the application delivery service to isolate the launch module;
   sending, by the run module, application information to the launch module; and
   issuing, by the run module, a command to the launch module to resume execution.

2. The method of claim 1, wherein sending application information comprises transmitting a location of the application.

3. The method of claim 1, wherein isolating the launch module comprises creating an isolation environment.

4. The method of claim 3, wherein an address for the isolation environment is identified.

5. The method of claim 1, wherein isolating the launch module comprises generating one or more isolation scopes having a set of native resources corresponding to the profile.

6. The method of claim 5, wherein isolating the launch module further comprises generating a user isolation scope and an application isolation scope having native resources corresponding to the profile.

7. The method of claim 1, wherein isolating the launch module comprises generating an application isolation layer and a user isolation layer having attributes corresponding to the profile.

8. The method of claim 1, wherein issuing a command to the launch module to resume execution comprises sending a command to the launch module to cease executing delay modules within the launch module.

9. A system for launching applications into existing isolation environments, the system comprising:
   a computing machine communicating with a client generating a request to execute an application on the computing machine, the application associated with a profile;
   an application delivery service executing on the computing machine;
   a launch module executing on the computing machine; and
   a run module executing on the computing machine, the run module:
      receiving the client request,
      querying the application delivery service to identify at least one isolation environment corresponding to the profile,
      determining that no isolation environment on the computing machine corresponds to the profile;
      launching a launch module in a suspended mode responsive to determining that no isolation environment corresponds to the profile;
      issuing a command to the application delivery service to isolate the launch module;
   sending application information to the launch module; and
   issuing a command to the launch module to resume execution.

10. The system of claim 9, wherein sending application information comprises transmitting a location of the application.

11. The system of claim 9, wherein isolating the launch module comprises creating an isolation environment.

12. The system of claim 11, wherein an address for the isolation environment is identified.

13. The system of claim 9, wherein isolating the launch module comprises generating one or more isolation scopes having a set of native resources corresponding to the profile.

14. The system of claim 13, wherein isolating the launch module further comprises generating a user isolation scope and an application isolation scope having native resources corresponding to the profile.

15. The system of claim 9, wherein isolating the launch module comprises generating an application isolation layer and a user isolation layer having attributes corresponding to the profile.

16. The system of claim 9, wherein issuing a command to the launch module to resume execution comprises sending a command to the launch module to cease executing delay modules within the launch module.

* * * * *